US012217702B2

(12) United States Patent
Lu et al.

(10) Patent No.: US 12,217,702 B2
(45) Date of Patent: Feb. 4, 2025

(54) DISPLAY SUBSTRATE AND DISPLAY APPARATUS

(71) Applicant: BOE Technology Group Co., Ltd., Beijing (CN)

(72) Inventors: Jiangnan Lu, Beijing (CN); Ke Feng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/016,361

(22) PCT Filed: Feb. 28, 2022

(86) PCT No.: PCT/CN2022/078237

§ 371 (c)(1),
(2) Date: Jan. 16, 2023

(87) PCT Pub. No.: WO2023/159555

PCT Pub. Date: Aug. 31, 2023

(65) Prior Publication Data

US 2024/0249687 A1 Jul. 25, 2024

(51) Int. Cl.
*G09G 3/3266* (2016.01)
*G09G 3/3275* (2016.01)

(52) U.S. Cl.
CPC ......... *G09G 3/3275* (2013.01); *G09G 3/3266* (2013.01); *G09G 2310/0286* (2013.01)

(58) Field of Classification Search
CPC ............... G09G 3/3275; G09G 3/3266; G09G 2310/0286; G09G 3/3233; G09G 3/3208
See application file for complete search history.

(56) References Cited

U.S. PATENT DOCUMENTS

| | | | | |
|---|---|---|---|---|
| 11,361,713 B1 * | 6/2022 | Fu | G09G 3/3241 |
| 12,004,384 B2 * | 6/2024 | Park | G09G 3/3233 |
| 2010/0238888 A1 | 9/2010 | Sampath et al. | |

(Continued)

FOREIGN PATENT DOCUMENTS

| | | |
|---|---|---|
| CN | 101859764 A | 10/2010 |
| CN | 205452280 U | 8/2016 |

(Continued)

*Primary Examiner* — Jose R Soto Lopez
(74) *Attorney, Agent, or Firm* — Ling Wu; Stephen Yang; Ling and Yang Intellectual Property

(57) ABSTRACT

A display substrate and a display apparatus are disclosed, the display substrate includes multiple light emitting output lines connected with a light emitting drive circuit and multiple scan output lines connected with a scan drive circuit; at least one light emitting output line includes at least two light emitting output parts connected with each other, a scan output line has an integrally formed structure, or, a light emitting output line has an integrally formed structure, at least one scan output line includes at least two scan output parts connected with each other, or at least one light emitting output line includes at least two light emitting output parts connected with each other, at least one scan output line includes at least two scan output parts connected with each other; at least two light emitting output parts located on a same light emitting output line are arranged in different layers.

18 Claims, 16 Drawing Sheets

(56) References Cited

U.S. PATENT DOCUMENTS

| | | | | |
|---|---|---|---|---|
| 2012/0249606 | A1* | 10/2012 | Teranishi | G09G 3/2074 345/690 |
| 2014/0197744 | A1* | 7/2014 | Choi | G09G 3/3233 315/130 |
| 2015/0199932 | A1* | 7/2015 | Ohara | G09G 3/3258 345/212 |
| 2016/0035305 | A1* | 2/2016 | Jin | G09G 3/3406 345/205 |
| 2016/0124550 | A1 | 5/2016 | Tada et al. | |
| 2017/0160607 | A1 | 6/2017 | Zhao et al. | |
| 2017/0352685 | A1 | 12/2017 | Ma | |
| 2018/0005573 | A1* | 1/2018 | Kim | G09G 3/3266 |
| 2018/0096956 | A1 | 4/2018 | Li et al. | |
| 2019/0280013 | A1 | 9/2019 | Fujikawa | |
| 2019/0325845 | A1* | 10/2019 | Zhu | G09G 3/2074 |
| 2019/0341440 | A1* | 11/2019 | Cha | H01L 33/06 |
| 2020/0175912 | A1* | 6/2020 | Lee | G09G 3/3225 |
| 2020/0410924 | A1 | 12/2020 | Xiong et al. | |
| 2021/0125546 | A1* | 4/2021 | Fei | G09G 3/20 |
| 2021/0366408 | A1* | 11/2021 | In | G09G 3/3266 |
| 2021/0375198 | A1 | 12/2021 | Zhang et al. | |
| 2021/0384289 | A1* | 12/2021 | Li | G09G 3/3233 |
| 2021/0391403 | A1* | 12/2021 | Yang | H10K 71/166 |
| 2022/0068202 | A1* | 3/2022 | Kim | G09G 5/14 |
| 2022/0068221 | A1* | 3/2022 | Ha | G09G 3/3291 |
| 2022/0077265 | A1* | 3/2022 | Ma | H10K 59/1213 |
| 2022/0230581 | A1* | 7/2022 | Cho | G09G 3/32 |
| 2022/0358872 | A1* | 11/2022 | Lim | G09G 3/2092 |
| 2023/0154411 | A1* | 5/2023 | Lee | G06V 40/1306 345/204 |
| 2023/0209936 | A1* | 6/2023 | Woo | G09G 3/3266 345/204 |
| 2023/0215314 | A1* | 7/2023 | Ke | G09G 3/32 345/443 |
| 2024/0134486 | A1* | 4/2024 | An | H10K 50/8445 |

FOREIGN PATENT DOCUMENTS

| | | | |
|---|---|---|---|
| CN | 105954899 | A | 9/2016 |
| CN | 106094373 | A | 11/2016 |
| CN | 107065339 | A | 8/2017 |
| CN | 110231741 | A | 9/2019 |
| CN | 209729474 | U | 12/2019 |
| CN | 111489700 | A | 8/2020 |
| CN | 111489701 | A | 8/2020 |
| CN | 112614871 | A | 4/2021 |
| JP | H06-202157 | A | 7/1994 |
| JP | 2015-18494 | A | 1/2015 |
| KR | 10-2011-0130497 | A | 12/2011 |
| KR | 10-2022-0015620 | A | 2/2022 |

* cited by examiner

DISPLAY SUBSTRATE AND DISPLAY APPARATUS

CROSS-REFERENCE TO RELATED APPLICATION

The present application is a U.S. National Phase Entry of International Application PCT/CN2022/078237 having an international filing date of Feb. 28, 2022, and the contents disclosed in the above-mentioned application are hereby incorporated as a part of this application.

TECHNICAL FIELD

The present disclosure relates to, but is not limited to, the field of display technologies, in particular to a display substrate and a display apparatus.

BACKGROUND

An Organic Light Emitting Diode (OLED for short) and a Quantum-dot Light Emitting Diode (QLED for short) are active light emitting display devices and have advantages such as self-luminescence, wide viewing angle, high contrast ratio, low power consumption, very high response speed, lightness and thinness, flexibility, and low costs. With the continuous development of display technologies, flexible displays that use OLEDs or QLEDs as light emitting elements and control signals by thin film transistors (TFTs) have become mainstream products in the field of display at present.

SUMMARY

The following is a summary of subject matter described herein in detail. The summary is not intended to limit the protection scope of claims.

In a first aspect, the present disclosure provides a display substrate, including a display region and a non-display region, wherein the display substrate includes a base substrate and a circuit structure layer disposed on the base substrate, the circuit structure layer includes multiple pixel drive circuits arranged in an array and located in the display region, and a light emitting drive circuit, a scan drive circuit, and a control drive circuit that are located in the non-display region; the light emitting drive circuit and the scan drive circuit are located on a side of the control drive circuit away from the display region, at least one pixel drive circuit includes: a writing transistor, a compensation reset transistor, and a light emitting transistor, the scan drive circuit is configured to provide a drive signal to the compensation reset transistor, the control drive circuit is configured to provide a drive signal to the writing transistor, the light emitting drive circuit is configured to provide a drive signal to the light emitting transistor; the display substrate further includes multiple light emitting output lines connected with the light emitting drive circuit and multiple scan output lines connected with the scan drive circuit; at least one of the light emitting output lines includes at least two light emitting output parts connected with each other, a scan output line has an integrally formed structure, or, a light emitting output line has an integrally formed structure, and at least one of the scan output lines includes at least two scan output parts connected with each other, or at least one of the light emitting output lines includes at least two light emitting output parts connected with each other, and at least one of the scan output lines includes at least two scan output parts connected with each other; wherein at least two light emitting output parts located on a same light emitting output line are arranged in different layers, and resistivities of the light emitting output parts arranged in the different layers are different, and at least two scan output parts located on a same scan output line are arranged in different layers, and resistivities of the scan output parts arranged in the different layers are different.

In some possible implementation modes, each pixel drive circuit includes: a data signal terminal, a control signal terminal, a scan signal terminal, and a light emitting signal terminal; the display substrate further includes N data signal lines, 2M control signal lines, 2M light emitting signal lines, and 2M scan signal lines; the writing transistor is electrically connected with the control signal terminal and the data signal terminal respectively, the compensation reset transistor is electrically connected with the scan signal terminal, and the light emitting transistor is electrically connected with the light emitting signal terminal; the data signal lines extend along a first direction and the N data signal lines are arranged along a second direction, the 2M control signal lines, the 2M light emitting signal lines, and the 2M scan signal lines extend along the second direction and are arranged along the first direction, wherein the first direction and the second direction intersect; for a pixel drive circuit of an s-th row and a t-th column, the control signal terminal is electrically connected with an s-th control signal line, the light emitting signal terminal is electrically connected with an s-th light emitting signal line, the scan signal terminal is electrically connected with an s-th scan signal line, the data signal terminal is electrically connected with a t-th data signal line, $1 \leq s \leq 2M$, $1 \leq t \leq N$; the light emitting drive circuit includes: M cascaded light emitting shift registers, a light emitting shift register of at least one stage is electrically connected with two light emitting signal lines, the scan drive circuit includes M cascaded scan shift registers, a scan shift register of at least one stage is electrically connected with two scan signal lines, the control drive circuit includes 2M cascaded control shift registers, a control shift register of at least one stage is electrically connected with one control signal line, $1 \leq i \leq M$; a light emitting shift register, a scan shift register, and a control shift register each include an input terminal and an output terminal; an output terminal of an i-th stage light emitting shift register is electrically connected with a (2i−1)-th light emitting signal line to a 2i-th light emitting signal line respectively through an i-th light emitting output line; an output terminal of an i-th stage scan shift register is electrically connected with a (2i−1)-th scan signal line to a 2i-th scan signal line respectively through an i-th scan output line; an output terminal of an s-th stage control shift register is electrically connected with an s-th control signal line respectively.

In some possible implementation modes, the circuit structure layer includes: a semiconductor layer, a first insulation layer, a first conductive layer, a second insulation layer, a second conductive layer, a third insulation layer, a third conductive layer, a fourth insulation layer, a first planarization layer, and a fourth conductive layer that are sequentially stacked on the base substrate; when at least one of the light emitting output lines includes at least two light emitting output parts connected with each other, at least two light emitting output parts located on a same light emitting output line are located in one film layer of the first conductive layer and the second conductive layer and one film layer of the third conductive layer and the fourth conductive layer; when at least one of the scan output lines includes at least two scan output parts connected with each other, at least two scan output parts located on a same scan output line are located in one film layer of the first conductive layer and the second conductive layer and one film layer of the third conductive layer and the fourth conductive layer; when a light emitting output line has an integrally formed structure, the light emitting output line is located in the fourth conductive layer; when a scan output line has an integrally formed structure, the scan output line is located in the second conductive layer; a resistivity of the first conductive layer and a resistivity of the second conductive layer are both greater than each of a resistivity of the third conductive layer and a resistivity of the fourth conductive layer.

In some possible implementation modes, the circuit structure layer includes: a semiconductor layer, a first insulation layer, a first conductive layer, a second insulation layer, a second conductive layer, a third insulation layer, a fifth conductive layer, a sixth insulation layer, a third conductive layer, a fourth insulation layer, a first planarization layer, a fourth conductive layer, a seventh insulation layer, and a sixth conductive layer that are sequentially stacked on the base substrate; when at least one of the light emitting output lines includes at least two light emitting output parts connected with each other, at least two light emitting output parts located on a same light emitting output line are located in one film layer of the first conductive layer, the second conductive layer, and the fifth conductive layer and one film layer of the third conductive layer, the fourth conductive layer, and the sixth conductive layer; when at least one of the scan output lines includes at least two scan output parts connected with each other, at least two scan output parts located on a same scan output line are located in one film layer of the first conductive layer, the second conductive layer, and the fifth conductive layer and one film layer of the third conductive layer, the fourth conductive layer, and the sixth conductive layer; when a light emitting output line has an integrally formed structure, the light emitting output line is located in the fourth conductive layer; when a scan output line has an integrally formed structure, the scan output line is located in the second conductive layer; a resistivity of the first conductive layer, a resistivity of the second conductive layer, and a resistivity of the third conductive layer are all greater than each of a resistivity of the third conductive layer, a resistivity of the fourth conductive layer, and a resistivity of the sixth conductive layer.

In some possible implementation modes, when at least one of the scan output lines includes at least two scan output parts connected with each other, a scan output line includes: a first scan output part, a second scan output part, a third scan output part, and a fourth scan output part which extend along the second direction; the first scan output part and the second scan output part are arranged in a same layer, the third scan output part and the fourth scan output part are arranged in a same layer, and the third scan output part is located on a side of the first scan output part away from the base substrate; the third scan output part is located on a side of the first scan output part away from the display region, the fourth scan output part is located on a side of the first scan output part close to the display region, the second scan output part is located on a side of the fourth scan output part close to the display region, the first scan output part is connected with the third scan output part and the fourth scan output part respectively, and the fourth scan output part is connected with the second scan output part; a first scan output part of an i-th scan output line is connected with an output terminal of an i-th stage scan shift register, a second scan output part of the i-th scan output line is connected with a (2i−1)-th scan signal line and a 2i-th scan signal line, and a third scan output part of the i-th scan output line is connected with an input terminal of an (i+1)-th stage scan shift register.

In some possible implementation modes, the i-th scan output line is located between the i-th stage scan shift register and the (i+1)-th stage scan shift register.

In some possible implementation modes, when at least one of the light emitting output lines includes at least two light emitting output parts connected with each other, a light emitting output line includes: a first light emitting output part, a second light emitting output part, and a third light emitting output part which extend along the second direction; the second light emitting output part and the third light emitting output part are arranged in a same layer, and the third light emitting output part is located on a side of the first light emitting output part away from the base substrate; the second light emitting output part is located on a side of the first light emitting output part away from the display region, the third light emitting output part is located on a side of the first light emitting output part close to the display region, and the first light emitting output part is respectively connected with the second light emitting output part and the third light emitting output part; a second light emitting output part of an i-th light emitting output line is connected with an output terminal of an i-th stage light emitting shift register, and a third light emitting output part of the i-th light emitting output line is connected with a (2i−1)-th light emitting signal line and a 2i-th light emitting signal line.

In some possible implementation modes, a first light emitting output part and the third light emitting output part of the i-th light emitting output line are located between a (2i+1)-th stage control shift register and a (2i+2)-th stage control shift register; the second light emitting output part of the i-th light emitting output line includes a first output connection part, a second output connection part, and a third output connection part; the first output connection part and the third output connection part extend along the second direction, and the second output connection part extends along the first direction; the first output connection part is located between an i-th stage scan shift register and an (i+1)-th stage scan shift register, and is connected with the second output connection part and the output terminal of the i-th stage light emitting shift register; the second output connection part is located between the i-th stage scan shift register and a (2i−1)-th stage control shift register and is connected with the third output connection part; the third output connection part is located between the (2i+1)-th stage control shift register and the (2i+2)-th stage control shift register, and is connected with the (2i−1)-th light emitting signal line and the 2i-th light emitting signal line.

In some possible implementation modes, further including: a light emitting initial signal line, a first light emitting clock signal line to a third light emitting clock signal line, a first high-level power supply line, first low-level power supply lines, a scan initial signal line, first scan clock signal lines to third scan clock signal lines, a second high-level power supply line, second low-level power supply lines, a control initial signal line, a first control clock signal line, a second control clock signal line, a third high-level power supply line, and a third low-level power supply line which extend along the first direction and are located in the non-display region; wherein two first low-level power supply lines, two second low-level power supply lines, two first scan clock signal lines, and two third scan clock signal lines are provided; wherein an input terminal of a light emitting shift register of a first stage is electrically connected with the light emitting initial signal line, and the output terminal of the i-th stage light emitting shift register is electrically connected with an input terminal of an (i+1)-th stage light emitting shift register; the i-th stage light emitting shift register has a first clock signal terminal electrically connected with the first light emitting clock signal line, a second clock signal terminal electrically connected with the second light emitting clock signal line, and a third clock signal terminal electrically connected with the third light emitting clock signal line, the (i+1)-th stage light emitting shift register has a first clock signal terminal electrically connected with the third light emitting clock signal line, a second clock signal terminal electrically connected with the second light emitting clock signal line, a third clock signal terminal electrically connected with the first light emitting clock signal line, a first power supply terminal of the i-th stage light emitting shift register is electrically connected with the first high-level power supply line, and a second power supply terminal of the i-th stage light emitting shift register is electrically connected with a first low-level power supply line; an input terminal of a scan shift register of a first stage is electrically connected with the scan initial signal line, an output terminal of the i-th stage scan shift register is electrically connected with an input terminal of the (i+1)-th stage scan shift register, the i-th stage scan shift register has a first clock signal terminal electrically connected with a first scan clock signal line, a second clock signal terminal electrically connected with the second scan clock signal line, and a third clock signal terminal electrically connected with a third scan clock signal line, a first power supply terminal of the i-th stage scan shift register is electrically connected with the second high-level power supply line, and a second power supply terminal of the i-th stage scan shift register is electrically connected with a second low-level power supply line; an input terminal of a control shift register of a first stage is electrically connected with the control initial signal line, and an output terminal of an s-th stage control shift register is electrically connected with an input terminal of an (s+1)-th stage control shift register; the s-th stage control shift register has a first clock signal terminal electrically connected with the first control clock signal line, and a second clock signal terminal electrically connected with the second control clock signal line, the (s+1)-th stage control shift register has a first clock signal terminal electrically connected with the second control clock signal line, and a second clock signal terminal electrically connected with the first control clock signal line, a first power supply terminal of an i-th stage control shift register is electrically connected with the third high-level power supply line, and a second power supply terminal of the s-th stage control shift register is electrically connected with the third low-level power supply line.

In some possible implementation modes, the display substrate further includes: a light emitting structure layer located on a side of the circuit structure layer away from the base substrate, wherein the light emitting structure layer includes: light emitting elements located in the display region and arranged in an array, a light emitting element includes an anode, an organic emitting layer, and a cathode, the anode is located on a side of the organic emitting layer close to the base substrate, and the cathode is located on a side of the organic emitting layer away from the base substrate; the circuit structure layer further includes a second power supply line located in the non-display region, and the second power supply line is electrically connected with the cathode of the light emitting element.

In some possible implementation modes, a light emitting shift register includes: multiple light emitting transistors and multiple light emitting capacitors, and the scan shift register includes multiple scan transistors and multiple scan capacitors; a control shift register includes multiple control transistors and multiple control capacitors; a light emitting capacitor, a scan capacitor, and a control capacitor each include a first plate and a second plate; the semiconductor layer includes: active layers of the multiple light emitting transistors, active layers of the multiple scan transistors, and active layers of the multiple control transistors; the first conductive layer includes: control electrodes of the multiple light emitting transistors, first plates of the multiple light emitting capacitors, control electrodes of the multiple scan transistors, first plates of the multiple scan capacitors, control electrodes of the multiple control transistors, first plates of the multiple first control capacitors, a first connection electrode, and a second connection electrode; the second conductive layer includes: second plates of multiple first light emitting capacitors, second plates of multiple scan capacitors, second plates of multiple control capacitors, and a third connection electrode to a fifth connection electrode; the third conductive layer includes: the light emitting initial signal line, the first high-level power supply line, the first low-level power supply lines, the first light emitting clock signal line to the third light emitting clock signal line, first electrodes and second electrodes of the multiple light emitting transistors, the scan initial signal line, the second high-level power supply line, the second low-level power supply lines, the first scan clock signal lines to the third scan clock signal lines, first electrodes and second electrodes of the multiple scan transistors, the control initial signal line, the third high-level power supply line, the third low-level power supply line, the first control clock signal line, the second control clock signal line, first electrodes and second electrodes of the multiple control transistors, and a sixth connection electrode; the fourth conductive layer includes a second power supply line.

In some possible implementation modes, the light emitting shift register includes: thirteen light emitting transistors and three light emitting capacitors, and the scan shift register includes: fourteen scan transistors and three scan capacitors; the control shift register includes: eight control transistors and two control capacitors; a second electrode of a tenth light emitting transistor is multiplexed as an output terminal of the light emitting shift register, and a second electrode of a tenth scan transistor is multiplexed as an output terminal of the scan shift register; a control electrode of a first light emitting transistor to a control electrode of an eighth light emitting transistor and a control electrode of an eleventh light emitting transistor to a control electrode of a thirteenth light emitting transistor are located on a side of a control electrode of a ninth light emitting transistor and a control electrode of the tenth light emitting transistor away from the display region; the control electrode of the ninth light emitting transistor and the control electrode of the tenth light emitting transistor are arranged along the first direction; a control electrode of a first scan transistor to a control electrode of an eighth scan transistor and a control electrode of an eleventh scan transistor to a control electrode of a fourteenth scan transistor are located on a side of a control electrode of a ninth scan transistor and a control electrode of the tenth scan transistor away from the display region; the control electrode of the ninth scan transistor and the control electrode of the tenth scan transistor are arranged along the first direction; a control electrode of a first control transistor to a control electrode of a third control transistor and a control electrode of a sixth control transistor to a control electrode of an eighth control transistor are located on a side of a control electrode of a fourth control transistor and a control electrode of a fifth control transistor away from the display region; the control electrode of the fourth control transistor and the control electrode of the fifth control transistor are arranged along the first direction; the first connection electrode is located on the side of the control electrode of the ninth scan transistor and the control electrode of the tenth scan transistor away from the display region and extends along the second direction, and the second connection electrode is connected with a first electrode of the fourth scan transistor; the second connection electrode is located on a side of the control electrode of the fourth control transistor away from the control electrode of the fifth control transistor and extends along the second direction; and the second connection electrode is connected with a second electrode of a fifth control transistor of a light emitting shift register of a previous stage.

In some possible implementation modes, a second plate of a first light emitting capacitor and a second plate of a second light emitting capacitor are arranged along the second direction, the second plate of the first light emitting capacitor is located on a side of the second plate of the second light emitting capacitor away from the display region, and the second plate of the second light emitting capacitor and a second plate of a third light emitting capacitor are arranged along the first direction; a second plate of a first scan capacitor and a second plate of a second scan capacitor are arranged along the second direction, and the second plate of the first scan capacitor is located on a side of the second plate of the second scan capacitor away from the display region, and the second plate of the second scan capacitor and a second plate of a third scan capacitor are arranged along the first direction; a second plate of a first control capacitor and a second plate of a second control capacitor are arranged along the first direction; the third connection electrode is located on a side of the second plate of the third light emitting capacitor away from the second plate of the second light emitting capacitor and extends along the second direction, and the third connection electrode is respectively connected with a second electrode of the tenth light emitting transistor and a first electrode of a first light emitting transistor of a light emitting shift register of a next stage; the fourth connection electrode is located on a side of the second plate of the third scan capacitor away from the second plate of the second scan capacitor and extends along the second direction, and the fourth connection electrode is connected with a first electrode of a first scan transistor of a scan shift register of a next stage; the fifth connection electrode and the second plate of the first control capacitor are arranged along the first direction, and the fifth connection electrode is located on a side of the second plate of the first control capacitor away from the display region, and the fifth connection electrode is respectively connected with a second electrode of a second control transistor.

In some possible implementation modes, the light emitting initial signal line, the third scan clock signal lines, the first scan clock signal lines, and a first one of the first low-level power supply lines are sequentially arranged along a direction close to the display region, a first electrode and a second electrode of the first light emitting transistor to a first electrode and a second electrode of the eighth light emitting transistor and a first electrode and a second electrode of the eleventh light emitting transistor to a first electrode and a second electrode of the thirteenth light emitting transistor are located between the first one of the first low-level power supply lines and the second scan clock signal line, and the second scan clock signal line is located on a side of the first one of the first low-level power supply lines close to the display region, the first high-level power supply line is located on a side of the second scan clock signal line close to the display region, a first electrode and a second electrode of the ninth light emitting transistor to a first electrode and a second electrode of the tenth light emitting transistor are located between the first high-level power supply line and a second one of the first low-level power supply lines, and the second one of the first low-level power supply lines is located on a side of the first high-level power supply line close to the display region; the scan initial signal line, a first one of the third scan clock signal lines, a first one of the first scan clock signal lines, a second third scan clock signal line, a second one of the first scan clock signal lines, and a first one of the second low-level power supply lines are sequentially arranged along a side of the second one of the first low-level power supply lines close to the display region, a first electrode and a second electrode of the first scan transistor to a first electrode and a second electrode of the eighth scan transistor, a first electrode and a second electrode of the tenth scan transistor to a first electrode and a second electrode of the fourteenth scan transistor, and a third scan output part are located between the first one of the second low-level power supply lines and the second scan clock signal line, and the second scan clock signal line is located on a side of the first one of the second low-level power supply lines close to the display region, the second high-level power supply line is located on the side of the second scan clock signal line close to the display region, a first electrode and a second electrode of the ninth scan transistor to a first electrode and a second electrode of the tenth scan transistor are located between the second high-level power supply line and a second one of the second low-level power supply lines, and the second one of the second low-level power supply lines is located on a side of the second high-level power supply line close to the display region; the control initial signal line, the first control clock signal line, the second control clock signal line, and the third low-level power supply line are sequentially arranged along a direction of the second one of the second low-level power supply lines close to the display region, a first electrode and a second electrode of the first control transistor to a first electrode and a second electrode of the eighth control transistor and the sixth connection electrode are located between the third low-level power supply line and the third high-level power supply line, the third high-level power supply line is located on a side of the third low-level power supply line close to the display region; the sixth connection electrode is connected with the fifth connection electrode and the control electrode of the fourth control transistor, respectively.

In some possible implementation modes, an orthographic projection of the second power supply line on the base substrate is at least partially overlapped with an orthographic projection of the light emitting drive circuit on the base substrate; the orthographic projection of the second power supply line on the base substrate covers orthographic projections of the light emitting initial signal line, the first high-level power supply line, a first one of the first low-level power supply lines, and the first light emitting clock signal line to the third light emitting clock signal line on the base substrate, and is not overlapped with an orthographic projection of a second one of the first low-level power supply lines on the base substrate.

In some possible implementation modes, the second conductive layer further includes a first scan output part and a second scan output part.

In some possible implementation modes, the third conductive layer further includes a third scan output part and a fourth scan output part.

In some possible implementation modes, the first conductive layer further includes the first light emitting output part.

In some possible implementation modes, the fourth conductive layer includes the second light emitting output part and the third light emitting output part.

In some possible implementation modes, the third conductive layer may further include a seventh connection electrode and an eighth connection electrode; the seventh connection electrode is respectively connected with the first light emitting output part and the second light emitting output part, and the eighth connection electrode is respectively connected with the first light emitting output part and the third light emitting output part.

In a second aspect, the present disclosure further provides a display apparatus, including the above-described display substrate.

Other aspects may be understood upon reading and understanding the drawings and the detailed description.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of various components in the drawings do not reflect actual scales, but are only intended to schematically illustrate contents of the present disclosure.

DETAILED DESCRIPTION

Figure 1:
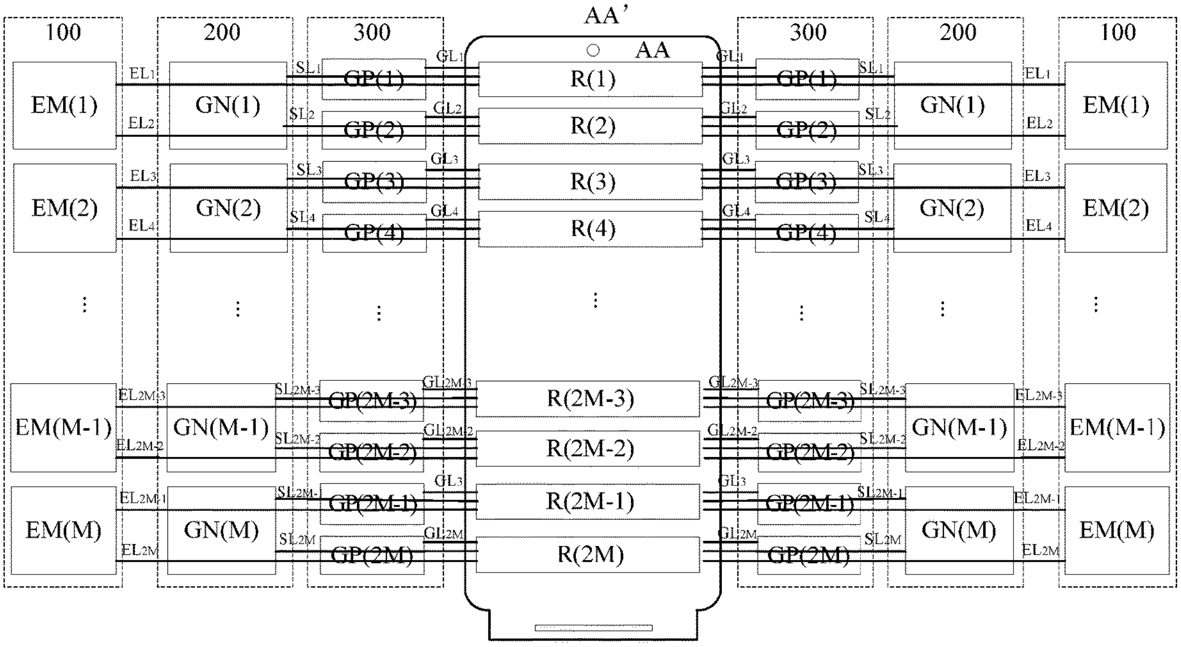
FIG. 1 is a schematic diagram of a structure of a display substrate.

To make objectives, technical solutions, and advantages of the present disclosure clearer, the embodiments of the present disclosure will be described in detail with reference to the accompanying drawings. It is to be noted that implementation modes may be implemented in multiple different forms. Those of ordinary skills in the art may easily understand such a fact that implementation modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

In the drawings, a size of each constituent element, a thickness of a layer, or a region is exaggerated sometimes for clarity. Therefore, one implementation mode of the present disclosure is not necessarily limited to the sizes, and shapes and sizes of various components in the drawings do not reflect actual scales. In addition, the drawings schematically illustrate ideal examples, and one implementation mode of the present disclosure is not limited to the shapes, numerical values, or the like shown in the drawings.

Ordinal numerals such as "first", "second", and "third" in the specification are set to avoid confusion between constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions according to which the various constituent elements are described. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand specific meanings of these terms in the present disclosure according to specific situations.

In the specification, a transistor refers to a component which includes at least three terminals, i.e., a gate electrode, a drain electrode and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be the source electrode, and the second electrode may be the drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switch elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulation film" may be replaced with an "insulation layer" sometimes.

In the present disclosure, "about" refers to that a boundary is defined not so strictly and numerical values within process and measurement error ranges are allowed.

Low Temperature Poly-Silicon (LTPS for short) technology is used in a display substrate. The LTPS technology has advantages such as high resolution, a high response speed, high brightness, and a high aperture ratio. Although it is welcomed by the market, the LTPS technology also has some defects, such as a relatively high production cost and relatively large power consumption. At this time, a technology solution of Low Temperature Polycrystalline Oxide (LTPO for short) came into being. Compared with the LTPS technology, in the LTPO technology a leakage current is smaller, pixel point response is faster, and an additional layer of oxide is added to a display substrate, which reduces energy consumption required for exciting pixel points, thus reducing power consumption during displaying of a screen. However, compared with a display product using the LTPS technology, a group of drive circuits should be added to a display product using the LTPO technology to control a metal oxide transistor in the display product, so that a bezel of the display product of the LTPO technology is larger, and an output line of a drive circuit which is located in bezel frame and provides a drive signal to a display region is longer, which leads to static electricity near the output line, and an output step problem occurs when a load of the output line is larger, thus reducing a display effect of the display product.

Figure 2A:
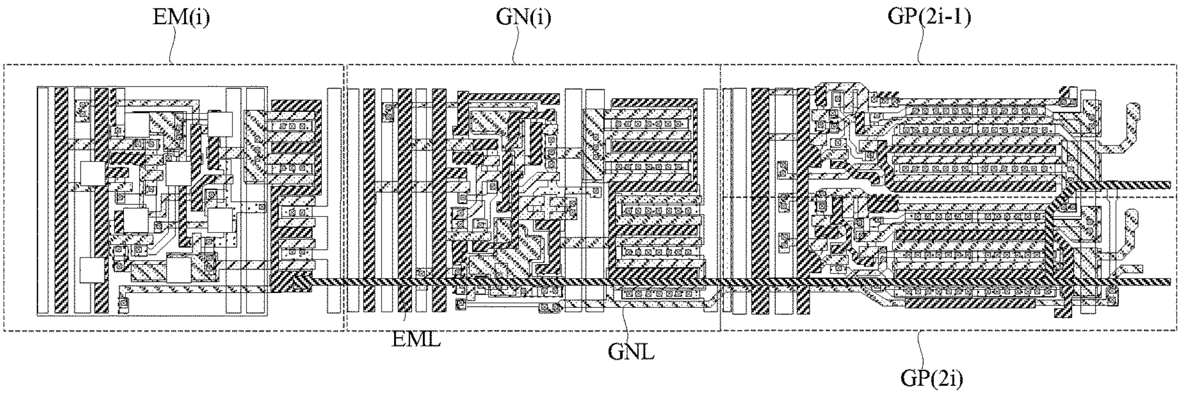
FIG. 2A is a first schematic diagram of a display substrate according to an embodiment of the present disclosure.
Figure 2B:
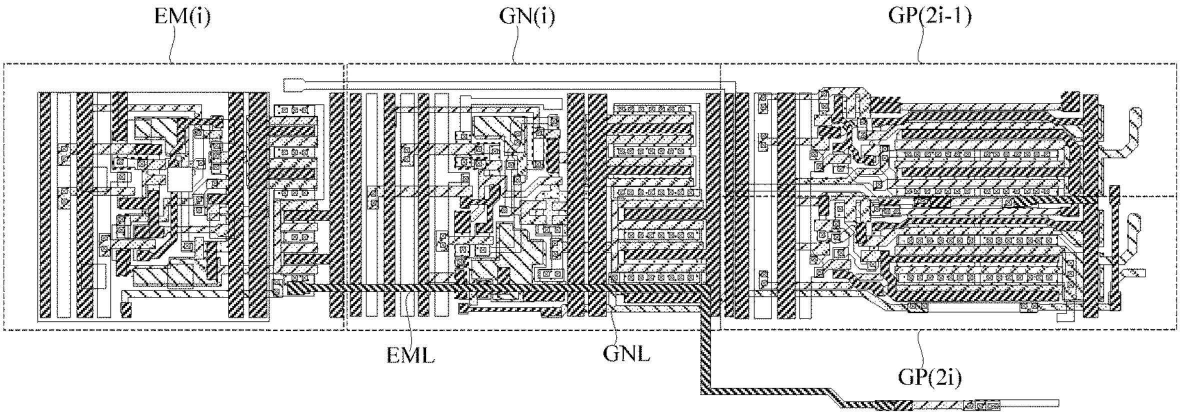
FIG. 2B is a second schematic diagram of a display substrate according to an embodiment of the present disclosure.
Figure 3:
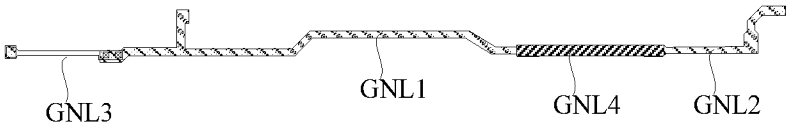
FIG. 3 is a schematic diagram of a scan output line.
Figure 4:
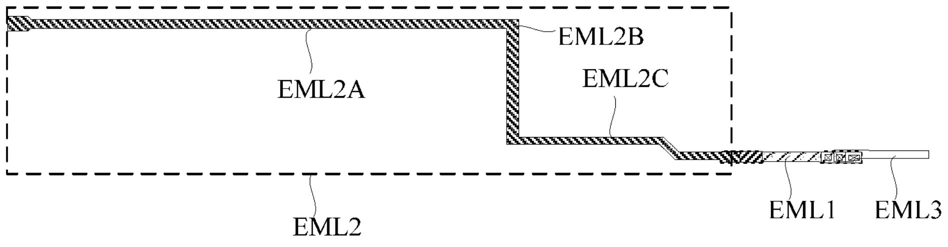
FIG. 4 is a schematic diagram of a light emitting output line.

FIG. 1 is a schematic diagram of a structure of a display substrate, FIG. 2A is a first schematic diagram of a display substrate according to an embodiment of the present disclosure, FIG. 2B is a second schematic diagram of the display substrate according to the embodiment of the present disclosure, FIG. 3 is a schematic diagram of a scan output line, and FIG. 4 is a schematic diagram of a light emitting output line. As shown in FIGS. 1 to 4, the display substrate according to the embodiment of the present disclosure includes: a display region AA and a non-display region AA', the display substrate includes a base substrate and a circuit structure layer disposed on the base substrate. The circuit structure layer includes multiple pixel drive circuits arranged in an array and located in the display region and a light emitting drive circuit 100, a scan drive circuit 200, and a control drive circuit 300 that are located in the non-display region. The light emitting drive circuit 100 and the scan drive circuit 200 are located on a side of the control drive circuit 300 away from the display region. At least one pixel drive circuit includes a writing transistor, a compensation reset transistor, and a light emitting transistor. The scan drive circuit is configured to provide a drive signal to the compensation reset transistor, the control drive circuit is configured to provide a drive signal to the writing transistor, and the light emitting drive circuit is configured to provide a drive signal to the light emitting transistor. The display substrate further includes: multiple light emitting output lines EML connected with the light emitting drive circuit 100 and multiple scan output lines GNL connected with the scan drive circuit.

In the present disclosure, at least one light emitting output line includes at least two light emitting output parts connected with each other, the scan output line has an integrally formed structure. Or, the light emitting output line has an integrally formed structure, and at least one scan output line includes at least two scan output parts connected with each other. Or, at least one light emitting output line includes at least two light emitting output parts connected with each other, and at least one scan output line includes at least two scan output parts connected with each other. FIG. 2 is illustrated by taking a case where a light emitting output line has an integrally formed structure and at least one scan output line includes at least two scan output parts connected with each other as an example. FIG. 3 is illustrated by taking a case where at least one light emitting output line includes at least two light emitting output parts connected with each other and at least one scan output line includes at least two scan output parts connected with each other as an example.

In the present disclosure, at least two light emitting output parts located on a same light emitting output line are arranged in different layers, and resistivities of the light emitting output parts arranged in different layers are different, and at least two scan output parts located on a same scan output line are arranged in different layers, and resistivities of the scan output parts arranged in different layers are different. FIG. 2A, FIG. 2B, and FIG. 3 are illustrated by taking at least one scan output line including four scan output parts as an example, and FIG. 2B and FIG. 4 are illustrated by taking at least one light emitting output line including three light emitting output parts as an example.

In an exemplary embodiment, the display substrate may be a LTPO display substrate or a LTPS display substrate.

In an exemplary embodiment, the base substrate may be a rigid base substrate or a flexible base substrate, wherein the rigid base substrate may be, but is not limited to, one or more of glass and metal foil, the flexible base substrate may be, but is not limited to, one or more of polyethylene glycol terephthalate, ethylene terephthalate, polyether ether ketone, polystyrene, polycarbonate, polyarylate, polyarylester, polyimide, polyvinyl chloride, polyethylene, and textile fibers.

In an exemplary embodiment, the pixel drive circuit may include 2M rows and N columns, and R (s) in FIG. 1 denotes an s-th row pixel drive circuit.

In an exemplary embodiment, as shown in FIG. 1, a positional relationship between a control drive circuit, a scan drive circuit, and a light emitting circuit may be determined according to a structure and functions of the display substrate. For example the control drive circuit may be located on a side of the scan drive circuit close to the display region and the light emitting drive circuit may be located on a side of the scan drive circuit away from the display region, which is not limited in the present disclosure.

The light emitting drive circuit 100 may be located on a side of the scan drive circuit 200 away from the display region.

In an exemplary embodiment, the display region includes a first side and a second side that are oppositely disposed. The light emitting drive circuit 100 may be located on the first side and/or the second side of the display region, the scan drive circuit 200 may be located on the first side and/or the second side of the display region, and the control drive circuit 300 may be located on the first side and/or the second side of the display region. FIG. 1 is illustrated by taking a case where the light emitting drive circuit 100, the scan drive circuit 200, and the control drive circuit 300 are located on the first side and the second side of the display region as an example.

The display substrate according to the embodiment of the present disclosure includes: a display region and a non-display region. The display substrate includes a base substrate and a circuit structure layer arranged on the base substrate, wherein the circuit structure layer includes multiple pixel drive circuits arranged in an array and located in the display region and a light emitting drive circuit, a scan drive circuit, and a control drive circuit located in the non-display region. The light emitting drive circuit and the scan drive circuit are located on a side of the control drive circuit away from the display region. At least one pixel drive circuit includes a writing transistor, a compensation reset transistor, and a light emitting transistor. The scan drive circuit is configured to provide a drive signal to the compensation reset transistor, the control drive circuit is configured to provide a drive signal to the writing transistor, and the light emitting drive circuit is configured to provide a drive signal to the light emitting transistor. The display substrate further includes: multiple light emitting output lines connected with the light emitting drive circuit and multiple scan output lines connected with the scan drive circuit. At least one light emitting output line includes at least two light emitting output parts connected with each other, and the scan output line has an integrally formed structure. Or, a light emitting output line has an integrally formed structure, and at least one scan output line includes at least two scan output parts connected with each other. Or, at least one light emitting output line includes at least two light emitting output parts connected with each other, and at least one scan output line includes at least two scan output parts connected with each other. At least two light emitting output parts located on a same light emitting output line are arranged in different layers, and resistivities of the light emitting output parts arranged in different layers are different, and at least two scan output parts located on a same scan output line are arranged in different layers, and resistivities of the scan output parts arranged in different layers are different. In the present disclosure, resistances of the scan output lines and/or the light emitting output lines may be reduced and lengths of scan output lines and/or light emitting output lines in a same film layer may be reduced by arranging the scan output lines and/or the light emitting output lines as multiple segments located in different film layers, thus improving a static electricity problem and improving a display effect of a display product.

In an exemplary embodiment, the display substrate may further include: a light emitting structure layer located on a side of the circuit structure layer away from the base substrate. The light emitting structure layer includes light emitting elements arranged in an array and located in the display region. A light emitting element includes a first electrode (anode), an organic emitting layer, and a second electrode (cathode). The anode is located on a side of the organic emitting layer close to the base substrate and the cathode is located on a side of the organic emitting layer away from the base substrate. The light emitting element is electrically connected with a pixel drive circuit.

In an exemplary embodiment, the circuit structure layer may further include a second power supply line located in the non-display region, and the second power supply line is electrically connected with the cathode of the light emitting element.

In an exemplary embodiment, the light emitting element may be an Organic Light Emitting Diode (OLED) or a Quantum dot Light Emitting Diode (QLED). Among them, the OLED may include a first electrode (anode), an organic emitting layer, and a second electrode (cathode) that are stacked.

In an exemplary embodiment, the organic emitting layer may include a Hole Injection Layer (HIL for short), a Hole Transport Layer (HTL for short), an Electron Block Layer (EBL for short), an Emitting Layer (EML for short), a Hole Block Layer (HBL for short), an Electron Transport Layer (ETL for short), and an Electron Injection Layer (EIL for short) that are stacked. In an exemplary embodiment, hole injection layers of all sub pixels may be connected together to form a common layer, electron injection layers of all the sub pixels may be connected together to form a common layer, hole transport layers of all the sub pixels may be connected together to form a common layer, electron transport layers of all the sub pixels may be connected together to form a common layer, hole block layers of all the sub pixels may be connected together to form a common layer, emitting layers of adjacent sub pixels may be overlapped slightly, or may be isolated from each other, and electron block layers of adjacent sub pixels may be overlapped slightly, or may be isolated from each other.

Figure 5A:
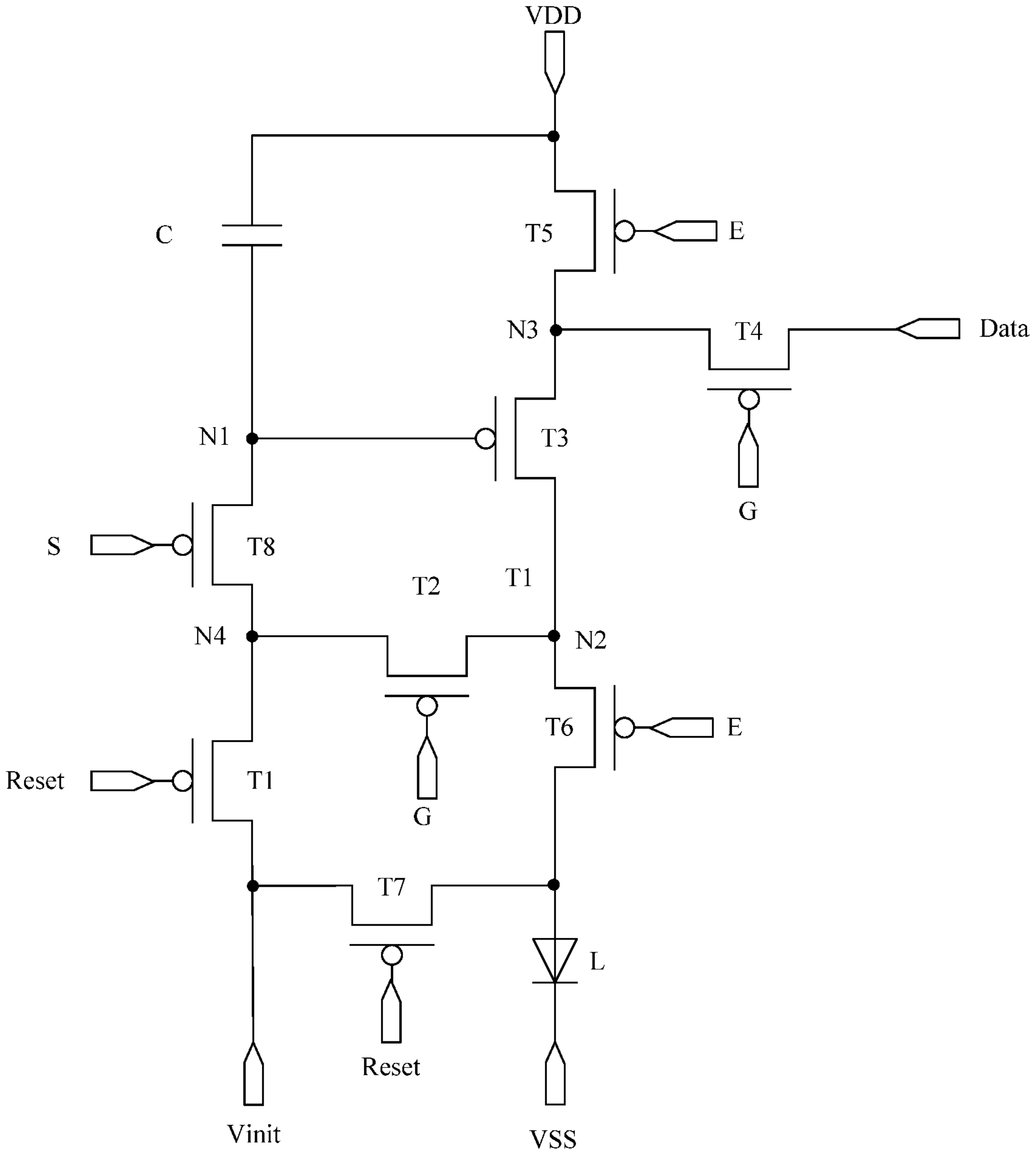
FIG. 5A is an equivalent circuit diagram of a pixel drive circuit.

In an exemplary embodiment, FIG. 5A is an equivalent circuit schematic of a pixel drive circuit. As shown in FIG. 5A, the pixel drive circuit may include eight transistors (a first transistor T1 to an eighth transistor T8), one capacitor C, and eight signal terminals (a data signal terminal Data, a control signal terminal G, a scan signal terminal S, a reset signal terminal Reset, a light emitting signal terminal E, an initial signal terminal VINIT, a first power supply terminal VDD, and a second power supply terminal VSS).

In an exemplary embodiment, a first plate of the capacitor C is connected with the first power supply terminal VDD, and a second plate of the capacitor C is connected with a first node N1. A control electrode of the first transistor T1 is connected with the reset signal terminal Reset, a first electrode of the first transistor T1 is connected with the initial signal terminal Vinit, and a second electrode of the first transistor T1 is connected with a fourth node N4. A control electrode of the second transistor T2 is connected with the control signal terminal G, a first electrode of the second transistor T2 is connected with the fourth node N4, and a second electrode of the second transistor T2 is connected with a second node N2. A control electrode of the third transistor T3 is connected with the first node N1, a first electrode of the third transistor T3 is connected with the second node N2, and a second electrode of the third transistor T3 is connected with a third node N3. A control electrode of the fourth transistor T4 is connected with the control signal terminal G, a first electrode of the fourth transistor T4 is connected with the data signal terminal Data, and a second electrode of the fourth transistor T4 is connected with the third node N3. A control electrode of the fifth transistor T5 is connected with the light emitting signal terminal E, a first electrode of the fifth transistor T5 is connected with the first power supply terminal VDD, and a second electrode of the fifth transistor T5 is connected with the third node N3. A control electrode of the sixth transistor T6 is connected with the light emitting signal terminal E, a first electrode of the sixth transistor T6 is connected with the second node N2, and a second electrode of the sixth transistor T6 is connected with a first electrode of a light emitting element. A control electrode of the seventh transistor T7 is connected with the reset signal terminal Reset, a first electrode of the seventh transistor T7 is connected with the initial signal terminal Vinit, a second electrode of the seventh transistor T7 is connected with a first electrode of a light emitting element, and a second electrode of the light emitting element is connected with the second power supply terminal VSS. A control electrode of the eighth transistor T8 is connected with the scan signal terminal S, a first electrode of the eighth transistor T8 is connected with the first node N1, and a second electrode of the eighth transistor T8 is connected with the fourth node N4.

In an exemplary embodiment, the first transistor T1 may be referred to as a reset transistor, and when an effective level signal is input to the reset signal terminal Reset, the first transistor T1 transmits an initialization voltage to the first node N1 to initialize a charge amount of the first node N1.

In an exemplary embodiment, the eighth transistor T8 may be referred to as a compensation reset transistor, and when an effective level signal is input to the scan signal terminal S, the eighth transistor T8 transmits a signal of the fourth node N4 to the first node N1, not only a charge amount of the first node may be initialized, but also threshold compensation may be performed on the third transistor T3.

In an exemplary embodiment, the third transistor T3 may be referred to as a drive transistor. The third transistor T3 determines a drive current flowing between the first power supply terminal VDD and the second power supply terminal VSS according to a potential difference between the control electrode and the first electrode of the third transistor T3.

In an exemplary embodiment, the fourth transistor T4 may be referred to as a writing transistor, and when an effective level signal is input to the control signal terminal S1, the fourth transistor T4 enables a data voltage of the data signal terminal Data to be input to the pixel drive circuit.

In an exemplary embodiment, the fifth transistor T5 and the sixth transistor T6 may be referred to as light emitting transistors. When an effective level signal is input to the light emitting signal terminal E, the fifth transistor T5 and the sixth transistor T6 enable a light emitting element to emit light by forming a path of drive current between the first power supply line VDD and the second power supply line VSS.

In an exemplary embodiment, a signal of the first power supply terminal VDD is a high-level signal continuously provided, and a signal of the second power supply terminal VSS is a low-level signal.

In an exemplary embodiment, the eighth transistor T8 is a metal oxide transistor and is an N-type transistor, and the first transistor T1 to the seventh transistor T7 are low-temperature poly-silicon transistors and are P-type transistors.

In an exemplary embodiment, the eighth transistor T8 is an oxide transistor and may reduce a leakage current, improve performance of the pixel drive circuit, and may reduce power consumption of the pixel drive circuit.

In an exemplary embodiment, the first power supply terminal VDD is configured to continuously provide a high-level signal, and the second power supply terminal VSS is configured to continuously provide a low-level signal.

Figure 5B:
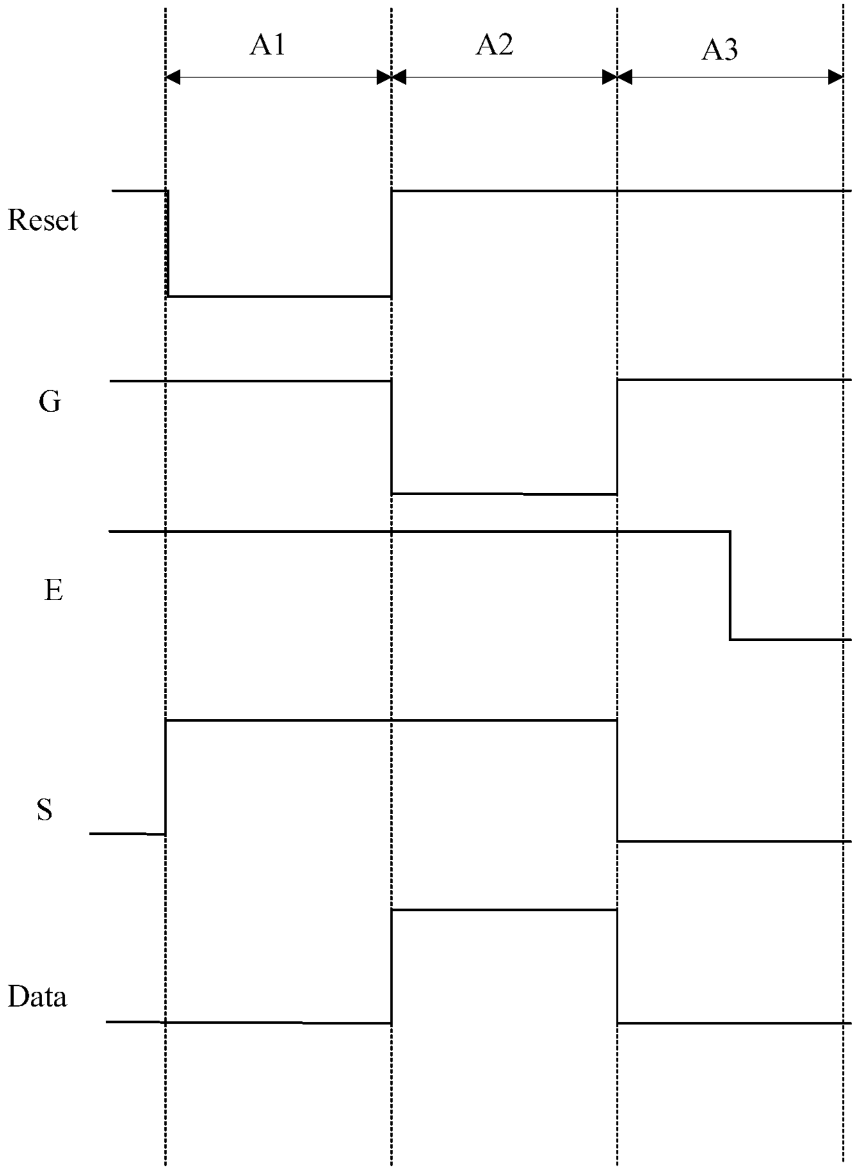
FIG. 5B is an operating timing diagram of a pixel drive circuit.

FIG. 5B is an operating timing diagram of a pixel drive circuit. An exemplary embodiment of the present disclosure will be described below through an operating process of the pixel drive circuit shown in FIG. 5B. The pixel drive circuit in FIG. 5A includes eight transistors (first transistor T1 to eighth transistor T8), one capacitor C, and eight signal terminals (a data signal terminal D, a control signal terminal G, a scan signal terminal S, a reset signal terminal Reset, a light emitting signal terminal E, an initial signal terminal Vinit, a first power supply terminal VDD, and a second power supply terminal VSS).

In an exemplary embodiment, the operating process of the pixel drive circuit may include following stages.

In a first stage A1, which is called a reset stage, signals of the control signal terminal G, the light emitting signal terminal E, and the scan signal terminal S are all high-level signals, and a signal of the reset signal terminal Reset is a low-level signal. The signal of the reset signal terminal Reset is the low-level signal, the first transistor T1 is turned on, a signal of the initial signal terminal Vinit is provided to a fourth node N4, the seventh transistor T7 is turned on, an initial voltage of the initial signal terminal Vinit is provided to a first electrode of a light emitting element L, the first electrode of the light emitting element L is initialized (reset), a pre-stored voltage inside the light emitting element L is cleared up, and initialization is completed to ensure that the light emitting element L does not emit light. A signal of the scan signal terminal S is a high-level signal, the eighth transistor T8 is turned on, and a signal of the fourth node N4 is provided to a first node N1 to initialize the capacitor C and clear an original data voltage in the capacitor C. Signals of the scan signal terminal G and the light emitting signal terminal E are high-level signals, the second transistor T2, the fourth transistor T4, the fifth transistor T5, the sixth transistor T6, and the seventh transistor T7 are turned off. The light emitting element L does not emit light in this stage.

In a second stage A2, which is called a data writing stage or a threshold compensation stage, the signal of the control signal terminal G is a low-level signal, the signals of the reset signal terminal Reset, the light emitting signal terminal E, and the scan signal terminal S are high-level signals, and the data signal terminal Data outputs a data voltage. In this stage, since the signal of the first node N1 is a low-level signal, the third transistor T3 is turned on. The signal of the control signal terminal G is the low-level signal, the second transistor T2 and the fourth transistor T4 are turned on, the signal of the scan signal terminal S is the high-level signal, and the eighth transistor T8 is turned on. The second transistor T2, the fourth transistor T4, and the eighth transistor T8 are turned on so that a data voltage output from the data signal terminal Data is provided to the first node N1 through a third node N3, the turned-on third transistor T3, a second node N2, the turned-on second transistor T2, the fourth node N4, and the turned-on eighth transistor T8. A difference between the data voltage output by the data signal terminal Data and a threshold voltage of the third transistor T3 is charged into the capacitor C until a voltage of the first node N1 is Vd−|Vth|, wherein Vd is the data voltage output by the data signal terminal Data, and Vth is the threshold voltage of the third transistor T3. The signal of the reset signal terminal Reset is the low-level signal, and the first transistor T1 and the seventh transistor T7 are turned off. The signal of the light emitting signal line E is the high-level signal, and the fifth transistor T5 and the sixth transistor T6 are turned off.

In a third stage A3, which is called a light emitting stage, the signals of the scan signal terminal S and the light emitting signal line E are all low-level signals, and the signals of the control signal terminal G and the reset signal terminal Reset are high-level signals. The signal of the reset signal terminal Reset is the low-level signal, and the first transistor T1 and the seventh transistor T7 are turned off. The signal of the scan signal terminal S is the low-level signal, the signals of the control signal terminal G and the reset signal terminal Reset are the high-level signals, and the second transistor T2, the fourth transistor T4, and the eighth transistor T8 are turned off. The signal of the light emitting signal terminal E is the low-level signal, the fifth transistor T5 and the sixth transistor T6 are turned on, and a power supply voltage output by the first power supply terminal VDD provides a drive voltage to the first electrode of the light emitting element L through the turned-on fifth transistor T5, the third transistor T3, and the sixth transistor T6 to drive the light emitting element L to emit light.

In a drive process of the pixel drive circuit, a drive current flowing through the third transistor T3 (drive transistor) is determined by a voltage difference between a control electrode and a first electrode of the third transistor T3. Since the voltage of the first node N1 is Vd−|Vth|, the drive current of the third transistor T3 is as follows:

$$I = K*(Vgs - Vth)^2 = K*[(Vdd - Vd + |Vth|) - Vth]^2 = K*[(Vdd - Vd]^2$$

Among them, I is the drive current flowing through the third transistor T3, that is, the drive current for driving an OLED, K is a constant, Vgs is the voltage difference between the control electrode and the first electrode of the third transistor T3, Vth is the threshold voltage of the third transistor T3, Vd is the data voltage output by the data signal terminal Data, and Vdd is the power supply voltage output by the first power supply terminal VDD.

In an exemplary embodiment, as shown in FIG. 1, the display substrate further includes: N data signal lines, 2M control signal lines $GL_1$ to $GL_{2M}$, 2M scan signal lines $SL_1$ to $SL_{2M}$, and 2M light emitting signal lines $EL_1$ to $EL_{2M}$.

In an exemplary embodiment, the data signal lines extend along a first direction and the N data signals are arranged along a second direction.

In an exemplary embodiment, the control signal lines extend along the second direction, and the 2M control signal lines are arranged along the first direction.

In an exemplary embodiment, the scan signal lines extend along the second direction, and the 2M scan signal lines are arranged along the first direction.

In an exemplary embodiment, the light emitting signal lines extend along the second direction, and the 2M light emitting signal lines are arranged along the first direction.

For a pixel drive circuit of an s-th row and a t-th column, the control signal terminal is electrically connected with an s-th control signal line, the scan signal terminal is electrically connected with an s-th scan signal line, the light emitting signal terminal is connected with an s-th light emitting signal line, the data signal terminal is electrically connected with a t-th data signal line t, where 1≤s≤2M, 1≤t≤N.

In an exemplary embodiment, as shown in FIG. 1, the light emitting drive circuit 100 includes M cascaded light emitting shift registers EM(1) to EM(M), and a light emitting shift register of at least one stage is electrically connected with two light emitting signal lines. A light emitting shift register includes an input terminal and an output terminal. Among them, an output terminal of an i-th stage light emitting shift register EM (i) is electrically connected with a (2i−1)-th light emitting signal line $EL_{2i-1}$ to a 2i-th light emitting signal line $EL_{2i}$ respectively through an i-th light emitting output line, where 1≤i≤M.

In an exemplary embodiment, as shown in FIG. 1, the scan drive circuit 200 includes M cascaded scan shift registers GN(1) to GN(M), a scan shift register of at least one stage is electrically connected with two scan signal lines, and a scan shift register includes an input terminal and an output terminal. An output terminal of an i-th stage scan shift register GN(i) is electrically connected with a (2i−1)-th scan signal line $SL_{2i-1}$ to a 2i-th scan signal line $SL_{2i}$, respectively, through an i-th scan output line.

In an exemplary embodiment, as shown in FIG. 1, the control drive circuit 300 includes 2M cascaded control shift registers GP(1) to GP(2M), and a control shift register of at least one stage is electrically connected with a control signal line. A control shift register includes an input terminal and an output terminal. An output terminal of an s-th stage control shift register GP(s) is electrically connected with an s-th control signal line $GL_s$, respectively.

In an exemplary embodiment, as shown in FIG. 1, the circuit structure layer may include a semiconductor layer, a first insulation layer, a first conductive layer, a second insulation layer, a second conductive layer, a third insulation layer, a third conductive layer, a fourth insulation layer, a first planarization layer, and a fourth conductive layer that are sequentially stacked on the base substrate. Among them, when at least one light emitting output line includes at least two light emitting output parts connected with each other, at least two light emitting output parts located on a same light emitting output line are located in one film layer of the first conductive layer and the second conductive layer and one film layer of the third conductive layer and the fourth conductive layer. When at least one scan output line includes at least two scan output parts connected with each other, at least two scan output parts located on a same scan output line are located in one film layer of the first conductive layer and the second conductive layer and one film layer of the third conductive layer and the fourth conductive layer. When a light emitting output line has an integrally formed structure, the light emitting output line is located in the fourth conductive layer. When a scan output line has an integrally formed structure, the scan output line is located in the second conductive layer. FIG. 2A and FIG. 2B are illustrated by taking a case where the circuit structure layer may include a semiconductor layer, a first insulation layer, a first conductive layer, a second insulation layer, a second conductive layer, a third insulation layer, a third conductive layer, a fourth insulation layer, a first planarization layer, and a fourth conductive layer that are sequentially stacked on the base substrate as an example.

In an exemplary embodiment, a resistivity of the first conductive layer and a resistivity of the second conductive layer are both greater than each of a resistivity of the third conductive layer and a resistivity of the fourth conductive layer. A manufacturing material of the first conductive layer and the second conductive layer may be molybdenum. A manufacturing material of the third conductive layer and the fourth conductive layer may be titanium/aluminum/titanium.

In an exemplary embodiment, when at least one light emitting output line includes at least two light emitting output parts connected with each other, at least two light emitting output parts located on a same light emitting output line may be located in the first conductive layer and the third conductive layer, or may be located in the first conductive layer and the fourth conductive layer, or may be located in the second conductive layer and the third conductive layer, or may be located in the second conductive layer and the fourth conductive layer.

In an exemplary embodiment, when at least one scan output line includes at least two scan output parts connected with each other, at least two scan output parts located on a same scan output line may be located in the first conductive layer and the third conductive layer, or may be located in the first conductive layer and the fourth conductive layer, or may be located in the second conductive layer and the third conductive layer, or may be located in the second conductive layer and the fourth conductive layer.

In an exemplary embodiment, the circuit structure layer may include a semiconductor layer, a first insulation layer, a first conductive layer, a second insulation layer, a second conductive layer, a third insulation layer, a fifth conductive layer, a sixth insulation layer, a third conductive layer, a fourth insulation layer, a first planarization layer, a fourth conductive layer, a seventh insulation layer, and a sixth conductive layer that are sequentially stacked on the base substrate. Among them, when at least one light emitting output line includes at least two light emitting output parts connected with each other, at least two light emitting output parts located on a same light emitting output line are located in one film layer of the first conductive layer, the second conductive layer, and the fifth conductive layer and one film layer of the third conductive layer, the fourth conductive layer, and the sixth conductive layer. When at least one scan output line includes at least two scan output parts connected with each other, at least two scan output parts located on a same scan output line are located in one film layer of the first conductive layer, the second conductive layer, and the fifth conductive layer and one film layer of the third conductive layer, the fourth conductive layer, and the sixth conductive layer. When a light emitting output line has an integrally formed structure, the light emitting output line is located in the fourth conductive layer. When a scan output line has an integrally formed structure, the scan output line is located in the second conductive layer.

In an exemplary embodiment, a resistivity of the first conductive layer, a resistivity of the second conductive layer, and a resistivity of the fifth conductive layer are all greater than each of a resistivity of the third conductive layer, a resistivity of the fourth conductive layer, and a resistivity of the sixth conductive layer. A manufacturing material of the first conductive layer, the second conductive layer, and the fifth conductive layer may be molybdenum. A manufacturing material of the third conductive layer, the fourth conductive layer, and the sixth conductive layer may be titanium/aluminum/titanium.

In an exemplary embodiment, when at least one light emitting output line includes at least two light emitting output parts connected with each other, at least two light emitting output parts located on a same light emitting output line may be located in the first conductive layer and the third conductive layer, or may be located in the first conductive layer and the fourth conductive layer, or may be located in the first conductive layer and the sixth conductive layer, or may be located in the second conductive layer and the third conductive layer, or may be located in the second conductive layer and the fourth conductive layer, or may be located in the second conductive layer and the sixth conductive layer, or may be located in the fifth conductive layer and the third conductive layer, or may be located in the fifth conductive layer and the fourth conductive layer, or may be located in the fifth conductive layer and the sixth conductive layer.

In an exemplary embodiment, when at least one scan output line includes at least two scan output parts connected with each other, at least two scan output parts located on a same scan output line may be located in the first conductive layer and the third conductive layer, or may be located in the first conductive layer and the fourth conductive layer, or may be located in the first conductive layer and the sixth conductive layer, or may be located in the second conductive layer and the third conductive layer, or may be located in the second conductive layer and the fourth conductive layer, or may be located in the second conductive layer and the sixth conductive layer, or may be located in the fifth conductive layer and the third conductive layer, or may be located in the fifth conductive layer and the fourth conductive layer, or may be located in the fifth conductive layer and the sixth conductive layer.

In an exemplary embodiment, as shown in FIGS. 2A, 2B, and 3, when at least one scan output line includes at least two scan output parts connected with each other, a scan output line GNL includes a first scan output part GNL1, a second scan output part GNL2, a third scan output part GNL3, and a fourth scan output part GNL4 which extend along a second direction.

In an exemplary embodiment, the first scan output part GNL1 and the second scan output part GNL2 are arranged in a same layer, the third scan output part GNL3 and the fourth scan output part GNL4 are arranged in a same layer, and the third scan output part GNL3 is located on a side of the first scan output part GNL1 away from the base substrate.

In an exemplary embodiment, the third scan output part GNL3 is located on a side of the first scan output part GNL1 away from the display region, the fourth scan output part GNL4 is located on a side of the first scan output part GNL1 close to the display region, the second scan output part GNL2 is located on a side of the fourth scan output part GNL4 close to the display region, the first scan output part GNL1 is connected with the third scan output part GNL3 and the fourth scan output part GNL4 respectively, and the fourth scan output part GNL4 is connected with the second scan output part GNL2.

In an exemplary embodiment, a first scan output part GNL1 of an i-th scan output line is connected with an output terminal of an i-th stage scan shift register, a second scan output part GNL2 of the i-th scan output line is connected with a (2i−1)-th scan signal line and a 2i-th scan signal line, and a third scan output part GNL3 of the i-th scan output line is connected with an input terminal of an (i+1)-th stage scan shift register.

In an exemplary embodiment, the i-th scan output line is located between the i-th stage scan shift register and the (i+1)-th stage scan shift register.

In an exemplary embodiment, as shown in FIGS. 2A, 2B, and 3, when at least one light emitting output line includes at least two light emitting output parts connected with each other, a light emitting output line EML includes a first light emitting output part EML1, a second light emitting output part EML2, and a third light emitting output part EML3 which extend along the second direction.

In an exemplary embodiment, the second light emitting output part EML2 and the third light emitting output part EML3 are arranged in a same layer, and the third light emitting output part EML3 is located on a side of the first light emitting output part EML1 away from the base substrate.

In an exemplary embodiment, the second light emitting output part EML2 is located on a side of the first light emitting output part EML1 away from the display region, and the third light emitting output part EML3 is located on a side of the first light emitting output part EML1 close to the display region, and the first light emitting output part EML1 is connected with the second light emitting output part EML2 and the third light emitting output part EML3 respectively.

In an exemplary embodiment, a second light emitting output part EML2 of an i-th light emitting output line is connected with an output terminal of an i-th stage light emitting shift register, and a third light emitting output part EML3 of the i-th light emitting output line is connected with a (2i−1)-th light emitting signal line and a 2i-th light emitting signal line.

In an exemplary embodiment, a first light emitting output part EML1 and the third light emitting output part EML3 of the i-th light emitting output line are located between a (2i+1)-th stage control shift register and a (2i+2)-th stage control shift register.

In an exemplary embodiment, a second light emitting output part EML2 of an i-th light emitting output line includes a first output connection part EML2A, a second output connection part EML2B, and a third output connection part EML2C. The first output connection part EML2A and the third output connection part EML2C extend along the second direction, and the second output connection part EML2B extends along a first direction.

In an exemplary embodiment, the first output connection part EML2A is located between the i-th stage scan shift register and the (i+1)-th stage scan shift register, and is connected with the second output connection part EML2B and the output terminal of the i-th stage light emitting shift register.

In an exemplary embodiment, the second output connection part EML2B is located between the i-th stage scan shift register and a (2i−1)-th stage control shift register, and is connected with the third output connection part EML2C.

In an exemplary embodiment, the third output connection part EML2C is located between the (2i+1)-th stage control shift register and the (2i+2)-th stage control shift register, and is connected with the (2i−1)-th light emitting signal line and the 2i-th light emitting signal line.

In an exemplary embodiment, the third conductive layer, the fourth conductive layer, or the sixth conductive layer which has a small resistivity, may be employed in a part where a light emitting output line is input to the display region, and the first conductive layer, the second conductive layer, or the fifth conductive layer may be employed in a part where the light emitting output line is input to a next stage.

In an exemplary embodiment, the third conductive layer, the fourth conductive layer, or the sixth conductive layer which has a small resistivity, may be employed in a part where a scan output line is input to the display region, and the first conductive layer, the second conductive layer, or the fifth conductive layer may be employed in a part where the scan output line is input to a next stage.

In an exemplary implementation, the display substrate may further include: a timing controller and a source drive circuit located in the non-display region.

In an exemplary embodiment, the timing controller may provide the source drive circuit with a gray-scale value and a control signal suitable for specifications of the source drive circuit, provide the scan drive circuit with a clock signal, a scan start signal, and the like suitable for specifications of the scan drive circuit, provide the control drive circuit with a clock signal, a control start signal, and the like suitable for specifications of the control drive circuit, and provide the light emitting drive circuit with a clock signal, a light emitting stop signal, and etc. suitable for specifications of the light emitting drive circuit.

In an exemplary embodiment, the source drive circuit may generate a data voltage to be provided to a data signal line using the gray-scale value and the control signal received from the timing controller. For example, the source drive circuit may sample the gray-scale value using the clock signal, and apply the data voltage corresponding to the gray-scale value to the data signal line by taking a sub-pixel row as a unit.

In an exemplary embodiment, the scan drive circuit may generate a scan signal that is to be provided to scan lines $SL_1$, $SL_2$, $SL_3$, . . . , and $SL_M$ by receiving the clock signal, the scan start signal, and etc. from the timing controller. For example, the scan drive circuit may sequentially provide scan signals with on-level pulses to scan signal lines. For example, the scan drive circuit may be constructed in a form of a shift register and may generate a scan signal by sequentially transmitting the scan start signal provided in a form of an on-level pulse to a next stage circuit under control of the clock signal.

In an exemplary embodiment, the control drive circuit may generate a control signal to be provided to a control signal line by receiving the clock signal, the scan start signal, and the like from the timing controller. For example, the control drive circuit may sequentially provide control signals with on-level pulses to control signal lines. For example, the control drive circuit may be constructed in a form of a shift register, and may generate a control signal by sequentially transmitting a control start signal provided in a form of an on-level pulse to a next stage circuit under control of a clock signal.

In an exemplary embodiment, the light emitting drive circuit may generate a light emitting signal to be provided to a light emitting signal line by receiving the clock signal, the light emitting stop signal, and the like from the timing controller. For example, the light emitting drive circuit may sequentially provide light emitting signals with off-level pulses to light emitting signal lines. For example, the light emitting drive circuit may be constructed in a form of a shift register and may generate a light emitting signal by sequentially transmitting a light emitting stop signal provided in a form of an off-level pulse to a next stage circuit under control of the clock signal.

In an exemplary embodiment, the light emitting shift register may include multiple light emitting transistors and multiple light emitting capacitors. A circuit structure of the light emitting shift register may be 13T3C or 10T3C, which is not limited in the present disclosure.

In an exemplary embodiment, the scan shift register may include multiple scan transistors and multiple scan capacitors. A circuit structure of the scan shift register may be 14T3C, 13T3C, or 10T3C, which is not limited in the present disclosure.

In an exemplary embodiment, the control shift register includes multiple control transistors and multiple control capacitors, and a circuit structure of the control shift register may be 8T2C, which is not limited in the present disclosure.

Figure 6A:
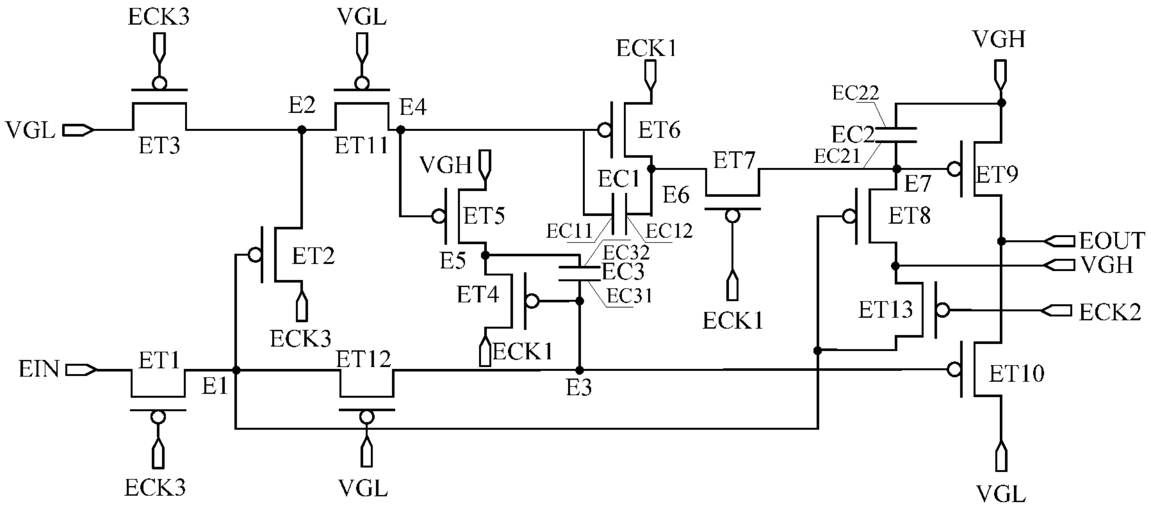
FIG. 6A is an equivalent circuit diagram of a light emitting shift register according to an exemplary embodiment.
Figure 6B:
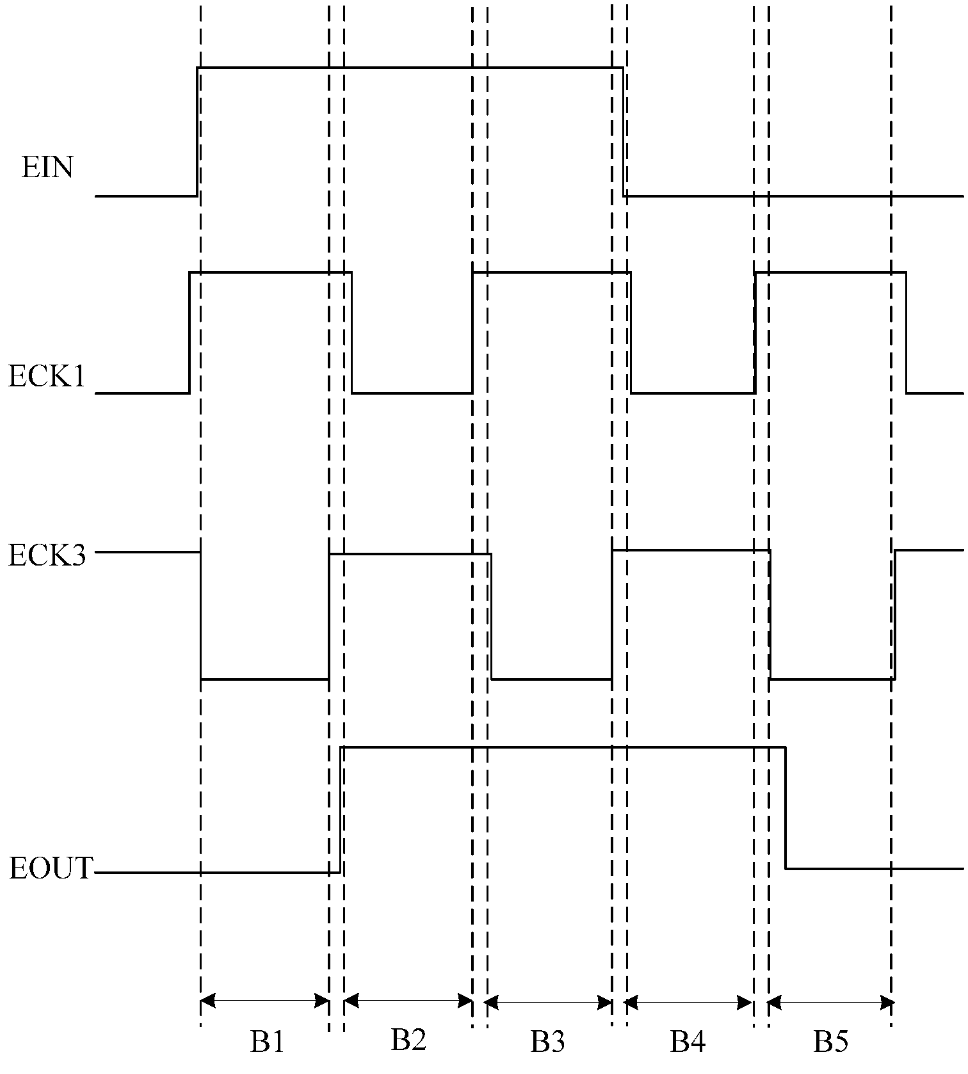
FIG. 6B is a timing diagram of the light emitting shift register according to in FIG. 6A.

FIG. 6A is an equivalent circuit diagram of a light emitting shift register according to an exemplary embodiment, and FIG. 6B is a timing diagram of the light emitting shift register provided in FIG. 6A. As shown in FIG. 6A, in an exemplary embodiment, the light emitting shift register includes a first light emitting transistor ET1 to a thirteenth light emitting transistor ET13 and a first light emitting capacitor EC1 to a third light emitting capacitor EC3.

In an exemplary embodiment, a control electrode of the first light emitting transistor ET1 is electrically connected with a third clock signal terminal ECK3, a first electrode of the first light emitting transistor ET1 is electrically connected with an input terminal EIN, and a second electrode of the first light emitting transistor ET1 is electrically connected with a first node E1. A control electrode of the second light emitting transistor ET2 is electrically connected with the first node E1, a first electrode of the second light emitting transistor ET2 is electrically connected with the third clock signal line ECK3, and a second electrode of the second light emitting transistor ET2 is electrically connected with a second node E2. A control electrode of the third light emitting transistor ET3 is electrically connected with the third clock signal line ECK3, a first electrode of the third light emitting transistor ET3 is electrically connected with a second power supply terminal VGL, and a second electrode of the third light emitting transistor ET3 is electrically connected with the second node E2. A control electrode of the fourth light emitting transistor ET4 is electrically connected with a third node E3, a first electrode of the fourth light emitting transistor ET4 is electrically connected with a first clock signal terminal ECK1, and a second electrode of the fourth light emitting transistor ET4 is electrically connected with a fifth node E5. A control electrode of the fifth light emitting transistor ET5 is electrically connected with a fourth node E4, a first electrode of the fifth light emitting transistor ET5 is electrically connected with the fifth node E5, and a second electrode of the fifth light emitting transistor ET5 is electrically connected with a first power supply terminal VGH. A control electrode of the sixth light emitting transistor ET6 is electrically connected with the fourth node E4, a first electrode of the sixth light emitting transistor ET6 is electrically connected with the first clock signal terminal ECK1, and a second electrode of the sixth light emitting transistor ET6 is electrically connected with a sixth node E6. A control electrode of the seventh light emitting transistor ET7 is electrically connected with the first clock signal terminal ECK1, a first electrode of the seventh light emitting transistor ET7 is electrically connected with the sixth node E6, and a second electrode of the seventh light emitting transistor ET7 is electrically connected with a seventh node E7. A control electrode of the eighth light emitting transistor ET8 is electrically connected with the first node E1, a first electrode of the eighth light emitting transistor ET8 is electrically connected with the first power supply terminal VGH, and a second electrode of the eighth light emitting transistor ET8 is electrically connected with the seventh node E7. A control electrode of the ninth light emitting transistor ET9 is electrically connected with the seventh node E7, a first electrode of the ninth light emitting transistor ET9 is electrically connected with the first power supply terminal VGH, and a second electrode of the ninth light emitting transistor ET9 is electrically connected with an output terminal EOUT. A control electrode of the tenth light emitting transistor ET10 is electrically connected with the third node E3, a first electrode of the tenth light emitting transistor ET10 is electrically connected with the second power supply terminal VGL, and a second electrode of the tenth light emitting transistor ET10 is electrically connected with the output terminal EOUT. A control electrode of the eleventh light emitting transistor ET11 is electrically connected with the second power supply terminal VGL, a first electrode of the eleventh light emitting transistor ET11 is electrically connected with the second node E2, and a second electrode of the eleventh light emitting transistor ET11 is electrically connected with the fourth node E4. A control electrode of the twelfth light emitting transistor ET12 is electrically connected with the second power supply terminal VGL, a first electrode of the twelfth light emitting transistor ET12 is electrically connected with the first node E1, and a second electrode of the twelfth light emitting transistor ET12 is electrically connected with the third node E3. A control electrode of the thirteenth light emitting transistor ET13 is electrically connected with a second clock signal terminal ECK2, a first electrode of the thirteenth light emitting transistor ET13 is electrically connected with the first node E1, and a second electrode of the thirteenth light emitting transistor ET13 is electrically connected with the first power supply terminal VGH. A first plate EC11 of the first light emitting capacitor EC1 is electrically connected with the fourth node E4, and a second plate EC12 of the first light emitting capacitor EC1 is electrically connected with the sixth node E6. A first plate EC21 of the second light emitting capacitor EC2 is connected with the seventh node E7, and a second plate EC22 of the second light emitting capacitor EC2 is connected with the first power supply terminal VGH. A first plate EC31 of the third light emitting capacitor EC3 is connected with the third node E3, and a second plate EC32 of the third light emitting capacitor EC3 is connected with the fifth node E5.

In an exemplary embodiment, the first light emitting transistor ET1 to the thirteenth light emitting transistor ET13 may be P-type transistors or may be N-type transistors.

In an exemplary embodiment, the first power supply terminal VGH continuously provides a high-level signal, and the second power supply terminal VGL continuously provides a low-level signal. Since the second power supply terminal VGL continuously provides the low-level signal, the eleventh light emitting transistor ET11 and the twelfth light emitting transistor ET12 are continuously turned on.

In an exemplary embodiment, a signal of the second clock signal terminal ECK2 is a low-level signal at a startup initialization stage, which prevents a ninth light emitting transistor ET9 and a tenth light emitting transistor ET10 of a last light emitting shift register from simultaneously being turned on due to delay of an output signal, or is a low-level signal at an abnormal shutdown stage, which prevents the ninth light emitting transistor ET9 and the tenth light emitting transistor ET10 from simultaneously being turned on. The second clock signal terminal ECK2 continuously provides a high-level signal during a normal display stage, i.e. the thirteenth light emitting transistor ET13 is continuously turned off during the normal display stage.

Taking the first light emitting transistor ET1 to the thirteenth light emitting transistor ET13 being P-type transistors as an example, as shown in FIG. 6B, an operating process of a light emitting shift register according to an exemplary embodiment includes following stages.

In a first stage B1, a signal of the first clock signal terminal ECK1 is a high-level signal, and a signal of the third clock signal terminal ECK3 is a low-level signal. The signal of the third clock signal terminal ECK3 is the low-level signal, the first light emitting transistor ET1, the third light emitting transistor ET3, and the twelfth light emitting transistor ET12 are turned on, the turned-on first light emitting transistor ET1 transmits a high-level signal of the input terminal EIN to the first node E1, thus, a level of the first node E1 becomes a high level, the turned-on twelfth light emitting transistor ET12 transmits the high-level signal of the first node E1 to the third node E2, and the second light emitting transistor ET2, the fourth light emitting transistor ET4, the eighth light emitting transistor ET8, and the tenth light emitting transistor ET10 are turned off In addition, the turned-on third light emitting transistor ET3 transmits a low-level signal of the third power supply terminal VGL to the second node E2, thus, a level of the second node E2 becomes a low level, the turned-on eleventh light emitting transistor ET11 transmits a low-level signal of the second node E2 to the fourth node E4, so that a level of the fourth node E4 becomes a low level, and the fifth light emitting transistor ET5 and the sixth light emitting transistor ET6 are turned on. The signal of the first clock signal terminal ECK1 is the high-level signal, and the seventh light emitting transistor ET7 is turned off In addition, the ninth light emitting transistor ET9 is turned off under an action of the third light emitting capacitor EC3. In a first stage P1, since both the ninth light emitting transistor ET9 and the tenth light emitting transistor ET10 are turned off, a signal of the output terminal EOUT is kept at a previous low level.

In a second stage B2, the signal of the first clock signal terminal ECK1 is a low-level signal, and the signal of the third clock signal terminal ECK3 is a high-level signal. The signal of the first clock signal terminal ECK1 is the low-level signal, and the seventh light emitting transistor ET7 is turned on. The signal of the third clock signal terminal ECK3 is the high-level signal, and the first light emitting transistor ET1 and the third light emitting transistor ET3 are turned off. Under an action of the third light emitting capacitor EC3, the first node E1 and the third node E3 may continue to maintain the high-level signal of the previous stage, and under an action of the first light emitting capacitor EC1, the fourth node E4 may continue to maintain the low level of the previous stage, so the fifth light emitting transistor ET5 and the sixth light emitting transistor ET6 are turned on. The second light emitting transistor ET2, the fourth light emitting transistor ET4, the eighth light emitting transistor ET8, and the tenth light emitting transistor ET10 are turned off In addition, the low-level signal of the first clock signal terminal ECK1 is transmitted to the seventh node E7 through the turned-on sixth light emitting transistor ET6 and the seventh light emitting transistor ET7, the ninth light emitting transistor ET9 is turned on and the turned-on ninth light emitting transistor ET9 outputs a high-level signal of the first power supply terminal VGH, so the signal of the output terminal EOUT is a high-level signal.

In addition, in a third stage B3, the signal of the third clock signal terminal ECK3 is a low-level signal, and the signal of the first clock signal terminal ECK1 is a high-level signal. The signal of the first clock signal terminal ECK1 is the high-level signal, and the seventh light emitting transistor ET7 is turned off. The second light emitting transistor ET2, the fourth light emitting transistor ET4, the eighth light emitting transistor ET8, and the tenth light emitting transistor ET10 are turned off. The signal of the third clock signal terminal ECK3 is the low-level signal, and the first light emitting transistor ET1 and the third light emitting transistor ET3 are turned on. Under an action of the third light emitting capacitor EC3, the ninth light emitting transistor ET9 maintains a turned-on state, and the turned-on ninth light emitting transistor ET9 outputs a high-level signal of the first power supply terminal VGH, so the signal of the output terminal EOUT is still a high-level signal.

In a fourth stage B4, the signal of the first clock signal terminal ECK1 is a low-level signal, and the signal of the third clock signal terminal ECK3 is a high-level signal. The signal of the third clock signal terminal ECK3 is the high-level signal, and the first light emitting transistor ET1 and the third light emitting transistor ET3 are turned off. The signal of the first clock signal terminal ECK1 is at a low level, and the seventh light emitting transistor ET7 is turned on. Due to a storage effect of the third light emitting capacitor EC3, levels of the first node E1 and the third node E3 are kept at high-levels of the previous stage, so that the second light emitting transistor ET2, the fourth light emitting transistor ET4, the eighth light emitting transistor ET8, and the tenth light emitting transistor ET10 are turned off. Due to a storage effect of the first light emitting capacitor EC1, the fourth node E4 continues to maintain the low level of the previous stage, so that the fifth light emitting transistor ET5 and the sixth light emitting transistor ET6 are turned on. In addition, the low-level signal of the first clock signal terminal ECK1 is transmitted to the seventh node E7 through the turned-on sixth light emitting transistor ET6 and the seventh light emitting transistor ET7, the turned-on ninth light emitting transistor ET9 outputs a high-level signal of the first power supply terminal VGH, so the signal of the output terminal EOUT is still a high-level signal.

In a fifth stage B5, the signal of the first clock signal terminal ECK1 is a high-level signal, and the signal of the third clock signal terminal ECK3 is a low-level signal. The signal of the third clock signal terminal ECK3 is the low-level signal, and the first light emitting transistor ET1 and the third light emitting transistor ET3 are turned on. The signal of the first clock signal terminal ECK1 is the high-level signal, and the seventh light emitting transistor ET7 is turned off. The turned-on first light emitting transistor ET1 transmits a low-level signal of the input terminal EIN to the first node E1, thus, a level of the first node E1 becomes a low level, the turned-on twelfth light emitting transistor ET12 transmits a low-level signal of the first node E1 to the third node E3, so that a level of the third node E3 becomes a low level, and the second light emitting transistor ET2, the fourth light emitting transistor ET4, the eighth light emitting transistor ET8, and the tenth light emitting transistor ET10 are turned on. The turned-on second light emitting transistor ET2 transmits the low-level signal of the third clock signal terminal ECK3 to the second node E2, so that a level of the second node E2 may be further lowered and the second node E2 and the fourth node E4 continue to maintain the low levels of the previous stage, and thus the fifth light emitting transistor ET5 and the sixth light emitting transistor ET6 are turned on. The signal of the first clock signal terminal ECK1 is the high-level signal, and the seventh light emitting transistor ET7 is turned off In addition, the turned-on eighth light emitting transistor ET8 transmits the high-level signal of the first power supply terminal VGH to the seventh node E7, and the ninth light emitting transistor ET9 is turned off. The turned-on tenth light emitting transistor ET10 outputs a low-level signal of the second power supply terminal VGL, so the signal of the output terminal EOUT turns to be at a low level.

In an exemplary embodiment, the display substrate may further include a light emitting initial signal line, a first light emitting clock signal line to a third light emitting clock signal line, a first high-level power supply line, and a first low-level power supply line which extend along a first direction. Among them, an input terminal of a first-stage light emitting shift register is electrically connected with the light emitting initial signal line, and an output terminal of an i-th stage light emitting shift register is electrically connected with an input terminal of an (i+1)-th stage light emitting shift register; the i-th stage light emitting shift register has a first clock signal terminal electrically connected with the first light emitting clock signal line, a second clock signal terminal electrically connected with the second light emitting clock signal line, a third clock signal terminal electrically connected with the third light emitting clock signal line, the (i+1)-th stage light emitting shift register has a first clock signal terminal electrically connected with the third light emitting clock signal line, a second clock signal terminal electrically connected with the second light emitting clock signal line, a third clock signal terminal electrically connected with the first light emitting clock signal line, a first power supply terminal of the i-th stage light emitting shift register is electrically connected with the first high-level power supply line, and a second power supply terminal of the i-th stage light emitting shift register is electrically connected with the first low-level power supply line.

Figure 7A:
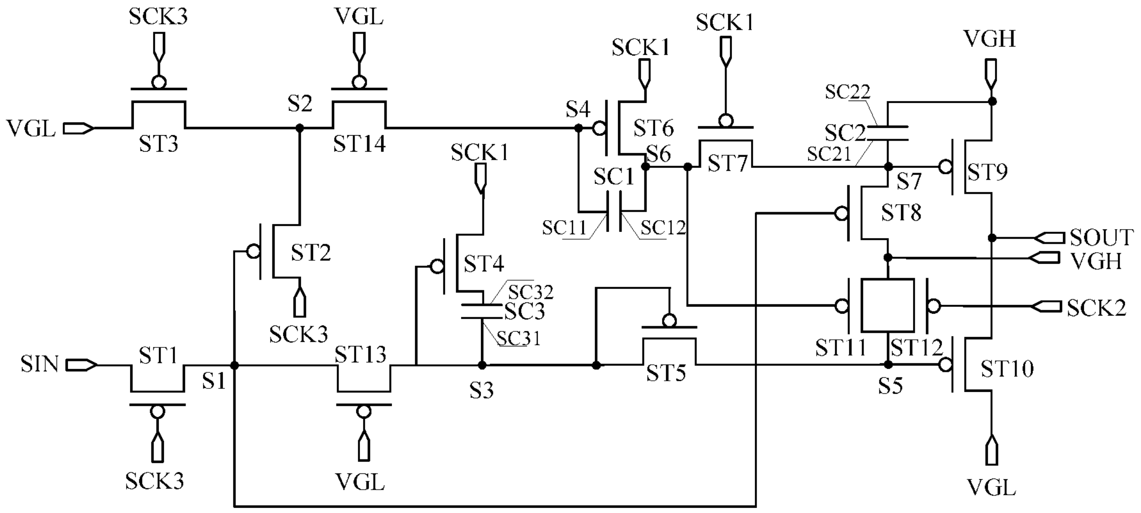
FIG. 7A is an equivalent circuit diagram of a scan shift register according to an exemplary embodiment.
Figure 7B:
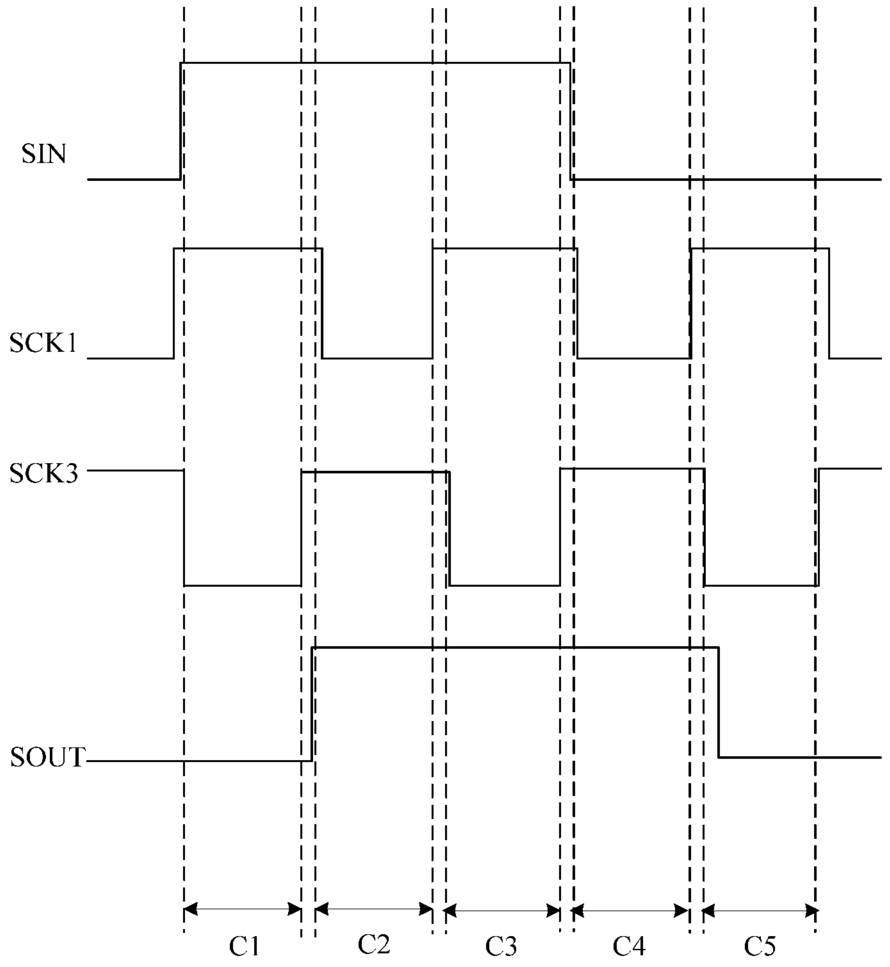
FIG. 7B is a timing diagram of the scan shift register according to in FIG. 7A.

FIG. 7A is an equivalent circuit diagram of a scan shift register according to an exemplary embodiment, and FIG. 7B is a timing diagram of the scan shift register according to FIG. 7A. As shown in FIG. 7A, in an exemplary embodiment, a scan shift register includes a first scan transistor ST1 to a fourteenth scan transistor ST14, and a first scan capacitor SC1 to a third scan capacitor SC3.

In an exemplary embodiment, a control electrode of the first scan transistor ST1 is electrically connected with a third clock signal terminal SCK3, a first electrode of the first scan transistor ST1 is electrically connected with an input terminal SIN, and a second electrode of the first scan transistor ST1 is electrically connected with a first node S1. A control electrode of the second scan transistor ST2 is electrically connected with the first node S1, a first electrode of the second scan transistor ST2 is electrically connected with the third clock signal terminal SCK3, and a second electrode of the second scan transistor ST2 is electrically connected with a second node S2. A control electrode of the third scan transistor ST3 is electrically connected with the third clock signal terminal SCK3, a first electrode of the third scan transistor ST3 is electrically connected with a second power supply terminal VGL, and a second electrode of the third scan transistor ST3 is electrically connected with the second node S2. A control electrode of the fourth scan transistor ST4 is electrically connected with a third node S3, a first electrode of the fourth scan transistor ST4 is electrically connected with a first clock signal terminal SCK1, and a second electrode of the fourth scan transistor ST4 is electrically connected with a second plate SC32 of the third scan capacitor. A control electrode and a first electrode of the fifth scan transistor ST5 are electrically connected with the third node S3, and a second electrode of the fifth scan transistor ST5 is electrically connected with a fifth node S5. A control electrode of the sixth scan transistor ST6 is electrically connected with a fourth node S4, a first electrode of the sixth scan transistor ST6 is electrically connected with the first clock signal terminal SCK1, and a second electrode of the sixth scan transistor ST6 is electrically connected with a sixth node S6. A control electrode of the seventh scan transistor ST7 is electrically connected with the first clock signal terminal SCK1, a first electrode of the seventh scan transistor ST7 is electrically connected with the sixth node S6, and a second electrode of the seventh scan transistor ST7 is electrically connected with a seventh node S7. A control electrode of the eighth scan transistor ST8 is electrically connected with the first node S1, a first electrode of the eighth scan transistor ST8 is electrically connected with a first power supply terminal VGH, and a second electrode of the eighth scan transistor ST8 is electrically connected with the seventh node S7. A control electrode of the ninth scan transistor ST9 is electrically connected with the seventh node S7, a first electrode of the ninth scan transistor ST9 is electrically connected with the first power supply terminal VGH, and a second electrode of the ninth scan transistor ST9 is electrically connected with an output terminal SOUT.

A control electrode of the tenth scan transistor ST10 is electrically connected with the fifth node S5, a first electrode of the tenth scan transistor ST10 is electrically connected with the second power supply terminal VGL, and a second electrode of the tenth scan transistor ST10 is electrically connected with the output terminal SOUT. A control electrode of the eleventh scan transistor ST11 is electrically connected with the second power supply terminal VGL, the control electrode of the eleventh scan transistor ST11 is connected with the sixth node S6, a first electrode of the eleventh scan transistor ST11 is electrically connected with the first power supply terminal VGH, a second electrode of the eleventh scan transistor ST11 is electrically connected with the fifth node S5. A control electrode of the twelfth scan transistor ST12 is connected with a second clock signal terminal SCK2, a first electrode of the twelfth scan transistor ST12 is electrically connected with the first power supply terminal VGH, a second electrode of the twelfth scan transistor ST12 is electrically connected with the fifth node S5. A control electrode of the thirteenth scan transistor ST13 is electrically connected with the second power supply terminal VGL, a first electrode of the thirteenth scan transistor ST13 is electrically connected with the first node S1, and a second electrode of the thirteenth scan transistor ST13 is electrically connected with the third node S3. A control electrode of the fourteenth scan transistor ST14 is electrically connected with the second power supply terminal VGL, a first electrode of the fourteenth scan transistor ST14 is electrically connected with the second node S2, and a second electrode of the fourteenth scan transistor ST14 is electrically connected with the fourth node S4. A first plate SC11 of the first scan capacitor SC1 is electrically connected with the fourth node S4, and a second plate SC12 of the first scan capacitor SC1 is electrically connected with the sixth node S6. A first plate SC21 of the second scan capacitor SC2 is electrically connected with the seventh node S7, and a second plate SC22 of the second scan capacitor SC2 is electrically connected with the first power supply terminal VGH. A first plate SC31 of the third scan capacitor SC3 is electrically connected with the third node S3.

In an exemplary embodiment, the first scan transistor ST1 to the thirteenth scan transistor ST13 may be P-type transistors or may be N-type transistors. The tenth scan transistor ST10 is an output transistor.

In an exemplary embodiment, the first power supply terminal VGH continuously provides a high-level signal, and the second power supply terminal VGL continuously provides a low-level signal. Since the second power supply terminal VGL continuously provides the low-level signal, the thirteenth scan transistor ST13 and the fourteenth scan transistor ST14 are continuously turned on.

In an exemplary embodiment, the second clock signal terminal SCK2 is a low-level signal during a startup initialization stage, which prevents a ninth scan transistor ST9 and a tenth scan transistor ST10 of a scan shift register of the last stage from simultaneously being turned on due to delay of an output signal, or is a low-level signal at an abnormal shutdown stage, which prevents the ninth scan transistor ST9 and the tenth scan transistor ST10 from simultaneously being turned on. The second clock signal terminal SCK2 continuously provides a high-level signal during a normal display stage, i.e. the thirteenth scan transistor ST13 is continuously turned off during the normal display stage.

Taking the first scan transistor ST1 to the fourteenth scan transistor ST14 being P-type transistors as an example, as shown in FIG. 7B, an operating process of a scan shift register according to an exemplary embodiment includes following stages.

In a first stage C1, a signal of the first clock signal terminal SCK1 is a high-level signal, and a signal of the third clock signal terminal SCK3 is a low-level signal. The signal of the third clock signal terminal SCK3 is the low-level signal, the first scan transistor ST1 and the third scan transistor ST3 are turned on, the turned-on first scan transistor ST1 transmits a high-level signal of the input terminal SIN to the first node S1, thus, a level of the first node S1 becomes a high level, the turned-on thirteenth scan transistor ST13 transmits the high-level signal of the first node S1 to the third node S3, and the second scan transistor ST2, the fourth scan transistor ST4, the fifth scan transistor ST5, and the eighth scan transistor ST8 are turned off. In addition, the turned-on third scan transistor ST3 transmits a low-level signal of the second power supply terminal VGL to the second node S2, thus, a level of the second node S2 becomes a low level, the turned-on fourteenth scan transistor ST14 transmits the low-level signal of the second node S2 to the fourth node S4, so that a level of the fourth node S4 becomes a low level, and the sixth scan transistor ST6 is turned on. A signal of the first clock signal terminal SCK1 is the high-level signal, and the seventh scan transistor ST7 and the eleventh scan transistor ST11 are turned off In addition, the ninth scan transistor ST9 is turned off under an action of the second scan capacitor SC2. In the first stage C1, since both the ninth scan transistor ST9 and the tenth scan transistor ST10 are turned off, a signal of the output terminal SOUT is kept at a previous low level.

In a second stage C2, the signal of the first clock signal terminal SCK1 is a low-level signal, and the signal of the third clock signal terminal SCK3 is a high-level signal. The signal of the first clock signal terminal SCK1 is the low-level signal, and the seventh scan transistor ST7 is turned on. The signal of the third clock signal terminal SCK3 is the high-level signal, and the first scan transistor ST1 and the third scan transistor ST3 are turned off. Under an action of the third scan capacitor SC3, the first node S1 and the third node S3 may continue to maintain a high-level signal of the previous stage, and under an action of the first scan capacitor SC1, the fourth node S4 may continue to maintain the low level of the previous stage, and the sixth scan transistor ST6 is turned on. The second scan transistor ST2, the fourth scan transistor ST4, the fifth scan transistor ST5, and the eighth scan transistor ST8 are turned off. In addition, the low-level signal of the first clock signal terminal SCK1 is transmitted to the seventh node S7 via the sixth node S6 through the turned-on sixth scan transistor ST6 and the seventh scan transistor ST7, the ninth scan transistor ST9 and the eleventh scan transistor ST11 are turned on, the high-level signal of the first power supply terminal VGH is transmitted to the fifth node S5, the tenth scan transistor ST10 is turned off, and the turned-on ninth scan transistor ST9 outputs the high-level signal of the first power supply terminal VGH, so that the signal of the output terminal SOUT is a high-level signal.

In a third stage C3, the signal of the third clock signal terminal SCK3 is a low-level signal, and the signal of the first clock signal terminal SCK1 is a high-level signal. The signal of the first clock signal terminal SCK1 is the high-level signal, and the seventh scan transistor ST7 is turned off. Under an action of the first scan capacitor SC1, the fourth node S4 maintains a low-level signal, the sixth scan transistor ST6 is turned on, the high-level signal of the first clock signal terminal SCK1 is transmitted to the sixth node S6, and the eleventh scan transistor ST11 is turned off. The signal of the third clock signal terminal SCK3 is the low-level signal, and the first scan transistor ST1 and the third scan transistor ST3 are turned on. The turned-on first scan transistor ST1 transmits a high-level signal of the input SIN to the first node S1, thus, a level of the first node S1 becomes a high-level, the turned-on thirteenth scan transistor ST13 transmits the high-level signal of the first node S1 to the third node S3, and the second scan transistor ST2, the fourth scan transistor ST4, the fifth scan transistor ST5, and the eighth scan transistor ST8 are turned off. Under an action of the third scan capacitor SC3, the ninth scan transistor ST9 maintains a turned-on state, and the turned-on ninth scan transistor ST9 outputs the high-level signal of the first power supply terminal VGH, so the signal of the output terminal SOUT is still a high-level signal.

In a fourth stage C4, the signal of the first clock signal terminal SCK1 is a low-level signal, and the signal of the third clock signal terminal SCK3 is a high-level signal. The signal of the third clock signal terminal SCK3 is the high-level signal, and the first scan transistor ST1 and the third scan transistor ST3 are turned off. The signal of the first clock signal terminal SCK1 is at a low level, and the seventh scan transistor ST7 is turned on. Due to a storage effect of the third scan capacitor SC3, levels of the first node S1 and the third node S3 are kept at the high levels of the previous stage, so that the scan transistor ST2, the fourth scan transistor ST4, the fifth scan transistor ST5, and the eighth scan transistor ST8 are turned off. Due to a storage effect of the first scan capacitor SC1, the fourth node S4 continues to maintain a low level of the previous stage, so that the sixth scan transistor ST6 is turned on. In addition, the low-level signal of the first clock signal terminal SCK1 is transmitted to the seventh node S7 via the sixth node S6 through the turned-on sixth scan transistor ST6 and the seventh scan transistor ST7, the ninth scan transistor ST9 and the eleventh scan transistor ST11 are turned on, the high-level signal of the first power supply terminal VGH is transmitted to the fifth node S5, the tenth scan transistor ST10 is turned off, and the turned-on ninth scan transistor ST9 outputs the high-level signal of the first power supply terminal VGH, so that the signal of the output terminal SOUT is still a high-level signal.

In a fifth stage C5, the signal of the first clock signal terminal SCK1 is a high-level signal, and the signal of the third clock signal terminal SCK3 is a low-level signal. The signal of the third clock signal terminal SCK3 is the low-level signal, and the first scan transistor ST1 and the third scan transistor ST3 are turned on. The signal of the first clock signal terminal SCK1 is the high-level signal, and the seventh scan transistor ST7 is turned off. The turned-on first scan transistor ST1 transmits a low-level signal of the input terminal SIN to the first node S1, so that a level of the first node S1 becomes a low level, the turned-on twelfth scan transistor ST12 transmits the low-level signal of the first node S1 to the third node S3, so that a level of the third node S3 becomes a low level, and the second scan transistor ST2, the fourth scan transistor ST4, the fifth scan transistor ST5, the eighth scan transistor ST8, and the tenth scan transistor ST10 are turned on. The turned-on second scan transistor ST2 transmits the low-level signal of the third clock signal terminal SCK3 to the second node S2, thus a level of the second node S2 may be further lowered, so the second node S2 and the fourth node S4 continue keeping a low level of a previous stage, so that the sixth scan transistor ST6 is turned on. The signal of the first clock signal terminal SCK1 is the high-level signal, and the seventh scan transistor ST7 is turned off In addition, the turned-on eighth scan transistor ST8 transmits the high-level signal of the first power supply terminal VGH to the seventh node S7, and the ninth scan transistor ST9 is turned off. The turned-on tenth scan transistor ST10 outputs a low-level signal of the second power supply terminal VGL, so the signal of the output terminal SOUT turns to be at a low level.

In an exemplary embodiment, the display substrate may further include a scan initial signal line, a first scan clock signal line to a third scan clock signal line, a second high-level power supply line, and a second low-level power supply line which extend along a first direction. Among them, two first scan clock signal lines and two third scan clock signal lines are provided.

An input terminal of a scan shift register of the first stage is electrically connected with the scan initial signal line, an output terminal of an i-th stage scan shift register is electrically connected with an input terminal of an (i+1)-th stage scan shift register. The i-th stage scan shift register has a first clock signal terminal electrically connected with the first scan clock signal line, a second clock signal terminal electrically connected with the second scan clock signal line, a third clock signal terminal electrically connected with the third scan clock signal line. A first power supply terminal of the i-th stage scan shift register is electrically connected with the second high-level power supply line, and a second power supply terminal of the i-th stage scan shift register is electrically connected with the second low-level power supply line.

Figure 8A:
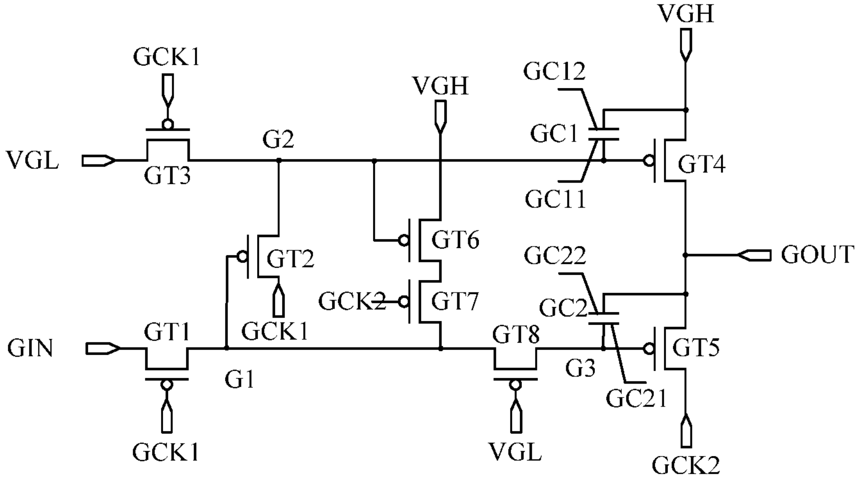
FIG. 8A is an equivalent circuit diagram of a control shift register according to an exemplary embodiment.
Figure 8B:
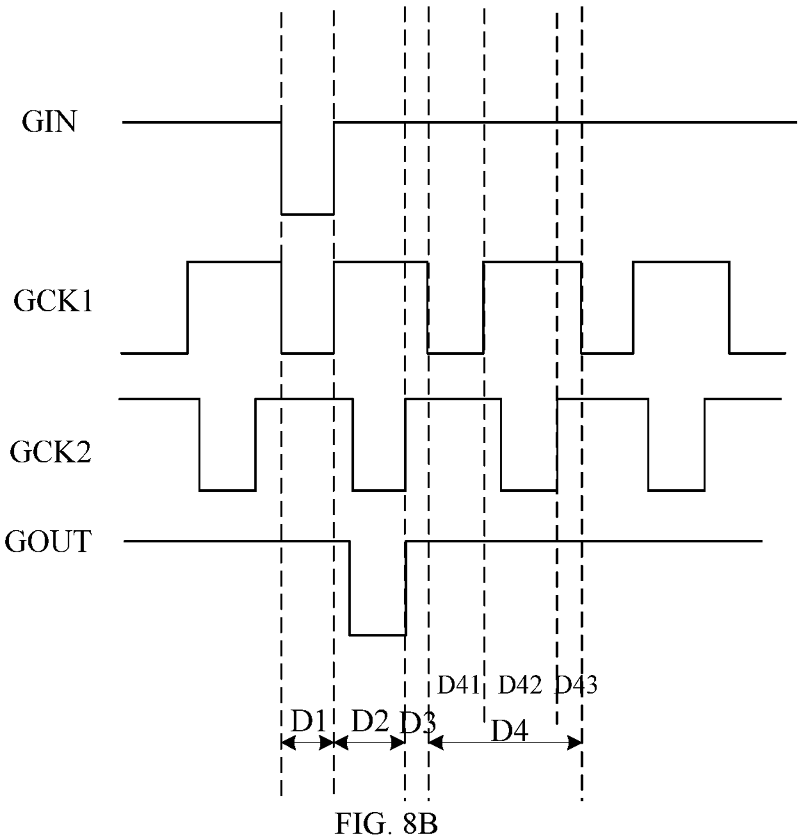
FIG. 8B is a timing diagram of the control shift register according to in FIG. 8A.

FIG. 8A is an equivalent circuit diagram of a control shift register according to an exemplary embodiment, and FIG. 8B is a timing diagram of the control shift register according to FIG. 8A. As shown in FIG. 8A, the control shift register includes a first control transistor GT1 to an eighth control transistor GT8, a first control capacitor GC1, and a second control capacitor GC2.

In an exemplary embodiment, a control electrode of the first control transistor GT1 is electrically connected with a first clock signal terminal CK, a first electrode of the first control transistor GT1 is electrically connected with an input terminal GIN, and a second electrode of the first control transistor GT1 is electrically connected with a first node G1. A control electrode of the second control transistor GT2 is electrically connected with the first node G1, a first electrode of the second control transistor GT2 is electrically connected with the first clock signal terminal CK, and a second electrode of the second control transistor GT2 is electrically connected with a second node G2. A control electrode of the third control transistor GT3 is electrically connected with the first clock signal terminal GCK1, a first electrode of the third control transistor GT3 is electrically connected with a second power supply terminal VGL, and a second electrode of the third control transistor GT3 is electrically connected with the second node G2. A control electrode of the fourth control transistor GT4 is electrically connected with the second node G2, a first electrode of the fourth control transistor GT4 is electrically connected with a first power supply terminal VGH, and a second electrode of the fourth control transistor GT4 is electrically connected with an output terminal GOUT. A control electrode of the fifth control transistor GT5 is electrically connected with a third node G3, a first electrode of the fifth control transistor GT5 is electrically connected with a second clock signal terminal GCK2, and a second electrode of the fifth control transistor GT5 is electrically connected with the output terminal GOUT. A control electrode of the sixth control transistor GT6 is electrically connected with the second node G2, a first electrode of the sixth control transistor GT6 is electrically connected with the first power supply terminal VGH, and a second electrode of the sixth control transistor GT6 is electrically connected with a first electrode of the seventh control transistor GT7. A control electrode of the seventh control transistor GT7 is electrically connected with a second clock signal terminal GCK2, and a second electrode of the seventh control transistor GT7 is electrically connected with the first node G1. A control electrode of the eighth control transistor GT8 is electrically connected with the second power supply terminal VGL, a first electrode of the eighth control transistor GT8 is electrically connected with the first node G1, and a second electrode of the eighth control transistor GT8 is electrically connected with the third node G3. A first plate GC11 of the first control capacitor GC1 is electrically connected with the first power supply terminal VGH, and a second plate GC12 of the first control capacitor GC1 is electrically connected with the second node G2. A first plate GC21 of the second control capacitor GC2 is electrically connected with the output terminal GOUT, and a second plate GC22 of the second control capacitor GC2 is electrically connected with the third node G3.

In an exemplary embodiment, the first control transistor GT1 to the eighth control transistor GT8 may be P-type transistors or may be N-type transistors.

In an exemplary embodiment, the first power supply terminal VGH continuously provides a high-level signal, and the second power supply terminal VGL continuously provides a low-level signal.

Taking the first control transistor GT1 to the eighth control transistor GT8 being P-type transistors as an example, as shown in FIG. 8B, an operating process of a control shift register according to an exemplary embodiment includes following stages.

In an input stage D1, signals of the first clock signal terminal GCK1 and the input terminal GIN are low-level signals, and a signal of the second clock signal terminal GCK2 is a high-level signal. Since the signal of the first clock signal terminal GCK1 is a low-level signal, the first control transistor GT1 is turned on, and the signal of the input terminal GIN is transmitted to the first node G1 through the first control transistor GT1. Since a signal of the eighth control transistor GT8 receives a low-level signal of the second power supply terminal VGL, the eighth control transistor GT8 is in a turned-on state. A level of the third node G3 may control the fifth control transistor GT5 to be turned on, and the signal of the second clock signal terminal GCK2 is transmitted to the output terminal GOUT through the fifth control transistor GT5, that is, in the input stage D1, the output terminal GOUT has the signal of the second clock signal terminal GCK2 which is a high-level signal. In addition, since the signal of the first clock signal terminal GCK1 is the low-level signal, the third control transistor GT3 is turned on, and the low-level signal of the second power supply terminal VGL is transmitted to the second node G2 via the third control transistor GT3. At this point, both the fourth control transistor GT4 and the sixth control transistor GT6 are turned on. Since the signal of the second clock signal terminal GCK2 is the high-level signal, the seventh control transistor GT7 is turned off.

In an output stage D2, the signal of the first clock signal terminal GCK1 is a high-level signal, the signal of the second clock signal terminal GCK2 is a low-level signal, and the signal of the input terminal GIN is a high-level signal. The fifth control transistor GT5 is turned on, and the signal of the second clock signal terminal GCK2 is used as a signal of the output terminal GOUT via the fifth control transistor GT5. In the output stage D2, a level of one terminal of the second control capacitor GC2 connected with the output terminal OUT becomes a signal of the second power supply terminal VGL. Due to a bootstrap effect of the second control capacitor GC2, the eighth control transistor GT8 is turned off, the fifth control transistor GT5 may be turned on more easily, and the signal of the output terminal GOUT is a low-level signal. In addition, the signal of the first clock signal terminal GCK1 is the high-level signal, so that both the first control transistor GT1 and the third control transistor GT3 are turned off. The second control transistor GT2 is turned on, and the high-level signal of the first clock signal terminal GCK1 is transmitted to the second node G2 via the second control transistor GT2, so that both the fourth control transistor GT4 and the sixth control transistor GT6 are turned off. Since the signal of the second clock signal terminal GCK2 is the low-level signal, the seventh control transistor GT7 is turned on.

In a buffering stage D3, the signals of the first clock signal terminal GCK1 and the second clock signal terminal GCK2 are both high-level signals, the signal of the input terminal GIN is a high-level signal, the fifth control transistor GT5 is turned on, and the second clock signal terminal GCK2 is used as an output terminal GOUT via the fifth control transistor GT5. Due to the bootstrap effect of the second control capacitor C2, a level of the first node G1 is changed to VGL−VthN1. In addition, the signal of the first clock signal terminal GCK1 is the high-level signal, so that the first control transistor GT1 and the third control transistor GT3 are both turned off, the eighth control transistor GT8 is turned on, the second control transistor GT2 is turned on, and the high-level signal of the first clock signal terminal GCK1 is transmitted to the second node G2 via the second control transistor GT2, and thus both the fourth control transistor GT4 and the sixth control transistor GT6 are turned off. Since the signal of the second clock signal terminal GCK2 is the high-level signal, the seventh control transistor GT7 is turned off.

In a first sub-stage D41 of a stabilization stage D4, the signal of the first clock signal terminal GCK1 is a low-level signal, and the signals of the second clock signal terminal GCK2 and the input terminal GIN are high-level signals. Since the signal of the first clock signal terminal GCK1 is the low-level signal, the first control transistor GT1 is turned on, and the signal of the input terminal GIN is transmitted to the first node G1 through the first control transistor GT1, and the second scan transistor GT2 is turned off. Since the eighth control transistor GT8 is in a turned-on state, the fifth control transistor GT5 is turned off. Since the signal of the first clock signal terminal GCK1 is at a low level, the third control transistor GT3 is turned on, the fourth control transistor GT4 and the sixth control transistor GT6 are both turned on, and the high-level signal of the first power supply terminal VGH is transmitted to the output terminal GOUT through the fourth control transistor GT4, that is, the signal of the output terminal GOUT is a high-level signal.

In a second sub-stage D42 of the stabilization stage D4, the signal of the first clock signal terminal GCK1 is a high-level signal, the signal of the second clock signal terminal GCK2 is a low-level signal, and the signal of the input terminal GIN is a high-level signal. Both the fifth control transistor GT5 and the second control transistor GT2 are turned off. The signal of the first clock signal terminal GCK1 is the high-level signal, so that the first control transistor GT1 and the third control transistor GT3 are both turned off. Under a holding effect of the first control capacitor GC1, the fourth control transistor GT4 and the sixth control transistor GT6 are both turned on, and a high-level signal is transmitted to the output terminal GOUT via the fourth control transistor GT4, that is, the signal of the output terminal GOUT is a high-level signal.

In the second sub-stage D42, since the signal of the second clock signal terminal GCK2 is the low-level signal, the seventh control transistor GT7 is turned on, so that a high-level signal is transmitted to the third node G3 and the first node G1 via the sixth control transistor GT6 and the seventh control transistor GT7, so that signals of the third node G3 and the first node G1 are kept as high-level signals.

In a third sub-stage D43, the signals of the first clock signal terminal GCK1 and the second clock signal terminal GCK2 are both high-level signals, and the signal of the input terminal GIN is a high-level signal. The fifth control transistor GT5 and the second control transistor GT2 are turned off. The signal of the first clock signal terminal GCK1 is the high-level signal, so that the first control transistor GT1 and the third control transistor GT3 are both turned off, and the fourth control transistor GT4 and the sixth control transistor GT6 are both turned on. The high-level signal is transmitted to the output terminal GOUT via the fourth control transistor GT4, that is, the signal of the output terminal GOUT is a high-level signal.

In an exemplary embodiment, the display substrate may further include a control initial signal line, a first control clock signal line, a second control clock signal line, a third high-level power supply line, and a third low-level power supply line which extend along a first direction.

An input terminal of a control shift register of a first stage is electrically connected with the control initial signal line, and an output terminal of a j-th stage control shift register is electrically connected with an input terminal of a (j+1)-th stage control shift register. the j-th stage control shift register has a first clock signal terminal electrically connected with the first control clock signal line, and a second clock signal terminal electrically connected with the second control clock signal line. The (j+1)-th stage control shift register has a first clock signal terminal electrically connected with the second control clock signal line, and a second clock signal terminal electrically connected with the first control clock signal line. A first power supply terminal of the j-th stage control shift register is electrically connected with the third high-level power supply line, and a second power supply terminal of the j-th stage control shift register is electrically connected with the third low-level power supply line.

In an exemplary embodiment, a boundary of the display region AA includes at least one arc boundary. In an exemplary embodiment, a shape of a boundary of the display region may be a rounded rectangle.

The display substrate according to the present disclosure may achieve a function of bending four sides at a large angle, improving a wrinkling problem of module attaching, and improving a product yield.

In an exemplary embodiment, the display substrate may further include another film layer, such as a post spacer, which is not limited in the present disclosure.

A "patterning process" mentioned in the present disclosure includes coating with a photoresist, mask exposure, development, etching, photoresist stripping, and other treatments for a metal material, an inorganic material, or a transparent conductive material, and includes coating with an organic material, mask exposure, development, and other treatments for an organic material. Deposition may be any one or more of sputtering, evaporation, and chemical vapor deposition. Coating may be any one or more of spray coating, spin coating, and ink-jet printing. Etching may be any one or more of dry etching and wet etching, which is not limited in present disclosure. A "thin film" refers to a layer of thin film made of a material on a base substrate through a process such as deposition, coating, etc. If the "thin film" does not need a patterning process in an entire manufacturing process, the "thin film" may also be called a "layer". If the "thin film" needs a patterning process in an entire manufacturing process, it is called a "thin film" before the patterning process, and called a "layer" after the patterning process. The "layer" after the patterning process includes at least one "pattern". "A and B being disposed on a same layer" mentioned in the present disclosure means that A and B are formed simultaneously through a same patterning process, and a "thickness" of a film layer is a dimension of the film layer in a direction perpendicular to a display substrate. In an exemplary embodiment of the present disclosure, "an orthographic projection of B is within a range of an orthographic projection of A" refers to that a boundary of the orthographic projection of B falls within a range of a boundary of the orthographic projection of A, or a boundary of the orthographic projection of A is overlapped with a boundary of the orthographic projection of B.

A display substrate according to an exemplary embodiment is described below through a manufacturing process of the display substrate, by taking a case where a scan output line includes a first scan output part to a fourth scan output part and a circuit structure layer includes four conductive layers as an example.

Figure 9:
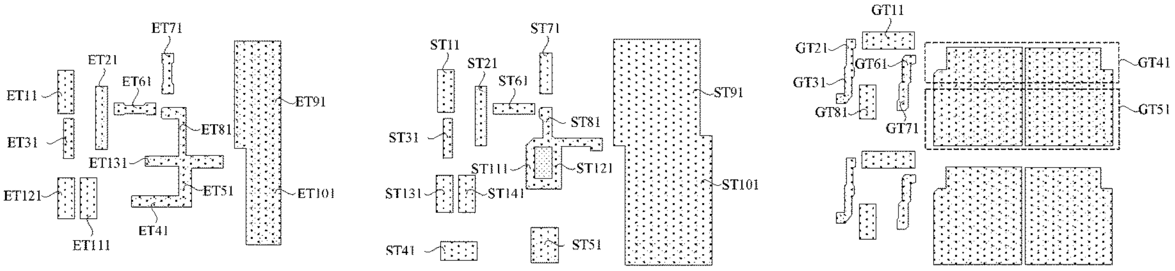
FIG. 9 is a schematic diagram after a semiconductor layer is formed.

(1) A semiconductor layer is formed on a base substrate, which includes: a semiconductor thin film is deposited on the base substrate, and the semiconductor thin film is patterned through a patterning process to form the semiconductor layer. As show in FIG. 9, FIG. 9 is a schematic diagram after the semiconductor layer is formed.

In an exemplary embodiment, the semiconductor layer includes an active layer ET11 of a first light emitting transistor to an active layer ET131 of a thirteenth light emitting transistor, an active layer ST11 of a first scan transistor to an active layer ST141 of a fourteenth scan transistor, and an active layer GT11 of a first control transistor to an active layer GT81 of an eighth control transistor.

In an exemplary embodiment, the active layer ET11 of the first light emitting transistor, the active layer ET21 of the second light emitting transistor, the active layer ET31 of the third light emitting transistor, an active layer ET51 of a fifth light emitting transistor, the active layer ET71 of the seventh light emitting transistor, the active layer ET81 of the eighth light emitting transistor, the active layer ET91 of the ninth light emitting transistor, the active layer ET101 of the tenth light emitting transistor, the active layer ET11 of the eleventh light emitting transistor, and the active layer ET121 of the twelfth light emitting transistor extend along a first direction, the active layer ET41 of the fourth light emitting transistor, the active layer ET61 of the sixth light emitting transistor, and the active layer ET131 of the thirteenth light emitting transistor extend along a second direction. Among them, the active layer ET91 of the ninth light emitting transistor and the active layer ET101 of the tenth light emitting transistor have an integrally formed structure, and the active layer ET41 of the fourth light emitting transistor, the active layer ET51 of the fifth light emitting transistor, the active layer ET81 of the eighth light emitting transistor, and the active layer ET131 of the thirteenth light emitting transistor have an integrally formed structure.

In an exemplary embodiment, the active layer ST11 of the first scan transistor, the active layer ST21 of the second scan transistor, the active layer ST31 of the third scan transistor, the active layer ST51 of the fifth scan transistor, the active layer ST71 of the seventh scan transistor, the active layer ST81 of the eighth scan transistor, the active layer ST91 of the ninth scan transistor, the active layer ST101 of the tenth scan transistor, the active layer ST111 of the eleventh scan transistor, the active layer ST121 of the twelfth scan transistor, the active layer ST131 of the thirteenth scan transistor, and the active layer ST141 of the fourteenth scan transistor extend along the first direction. The active layer ST41 of the fourth scan transistor and the active layer ST61 of the sixth scan transistor extend along the second direction. Among them, the active layer ST81 of the eighth scan transistor, the active layer ST111 of the eleventh scan transistor, and the active layer ST121 of the twelfth scan transistor have an integrally formed structure, and the active layer ST91 of the ninth scan transistor and the active layer ST101 of the tenth scan transistor have an integrally formed structure.

In an exemplary embodiment, the active layer GT21 of the second control transistor, the active layer GT31 of the third control transistor, the active layer GT61 of the sixth control transistor, the active layer GT71 of the seventh control transistor, and the active layer GT81 of the eighth control transistor extend along the first direction, and the active layer GT11 of the first control transistor extends along the second direction. Among them, the active layer GT21 of the second control transistor and the active layer GT31 of the third control transistor have an integrally formed structure, the active layer GT61 of the sixth control transistor and the active layer GT71 of the seventh control transistor have an integrally formed structure, and the active layer GT41 of the fourth control transistor and the active layer GT51 of the fifth control transistor have an integrally formed structure.

Figure 10:
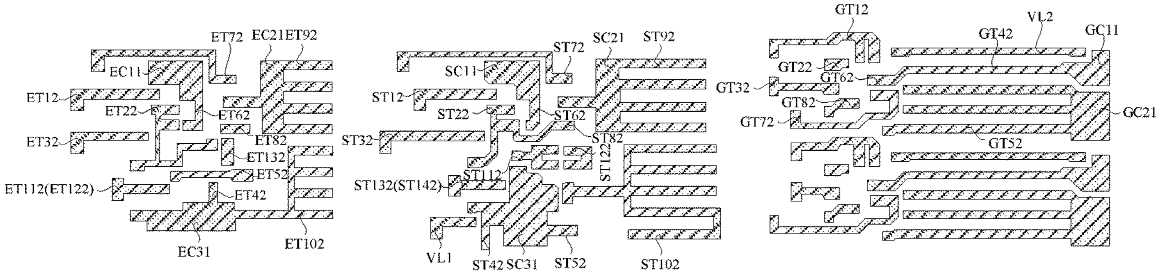
FIG. 10 is a first schematic diagram of a first conductive layer.
Figure 11:
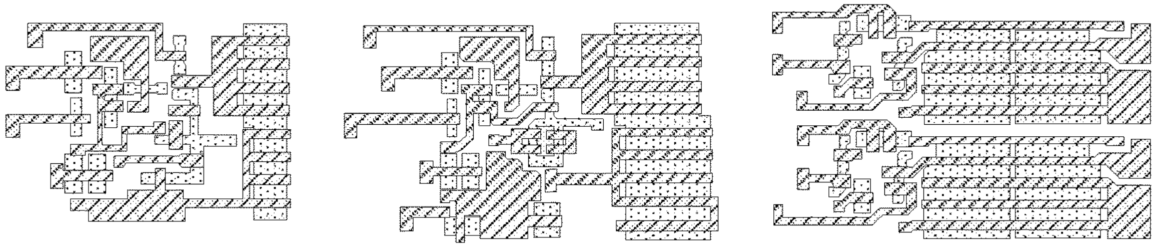
FIG. 11 is a first schematic diagram after a first conductive layer is formed.

(2) A first conductive layer is formed, which includes: a second insulation thin film is deposited on the base substrate on which an active layer is formed, the second insulation thin film is patterned through a patterning process to form a first insulation layer, a first conductive thin film is deposited on the first insulation layer, and the first conductive thin film is patterned through a patterning process to form the first conductive layer, as shown in FIG. 10 and FIG. 11, FIG. 10 is a first schematic diagram of the first conductive layer, and FIG. 11 is a first schematic diagram after the first conductive layer is formed.

In an exemplary embodiment, the first conductive layer may include: a control electrode ET12 of the first light emitting transistor to a control electrode ET132 of the thirteenth light emitting transistor, a first plate EC11 of a first light emitting capacitor to a first plate EC31 of a third light emitting capacitor, a control electrode ST12 of the first scan transistor to a control electrode ST142 of the fourteenth scan transistor, a first plate SC11 of a first scan capacitor to a first plate SC31 of the third scan capacitor, a control electrode GT12 of the first control transistor to a control electrode GT82 of the eighth control transistor, a first plate GC11 of a first control capacitor and a first plate GC21 of a second control capacitor, a first connection electrode VL1 and a second connection electrode VL2.

In an exemplary embodiment, the control electrode ET12 of the first light emitting transistor to the control electrode ET82 of the eighth light emitting transistor and the control electrode ET112 of the eleventh light emitting transistor to the control electrode ET132 of the thirteenth light emitting transistor are located on a side of the control electrode ET92 of the ninth light emitting transistor and the control electrode ET102 of the tenth light emitting transistor away from a display region. The control electrode ET92 of the ninth light emitting transistor and the control electrode ET102 of the tenth light emitting transistor are arranged along the first direction. Among them, the control electrode ET112 of the eleventh light emitting transistor and the control electrode ET122 of the twelfth light emitting transistor have an integrally formed structure, the control electrode ET62 of the sixth light emitting transistor and the first plate EC11 of the first light emitting capacitor have an integrally formed structure, the control electrode ET42 of the fourth light emitting transistor, the first plate EC31 of the third light emitting capacitor and the control electrode ET102 of the tenth light emitting transistor have an integrally formed structure, and the control electrode ET92 of the ninth light emitting transistor and the first plate EC21 of the second light emitting capacitor have an integrally formed structure.

In an exemplary embodiment, the control electrode ST12 of the first scan transistor to the control electrode ST82 of the eighth scan transistor, the control electrode ST112 of the eleventh scan transistor to the control electrode ST142 of the fourteenth scan transistor, and the first connection electrode VL1 are located on a side of the control electrode ST92 of the ninth scan transistor and the control electrode ST102 of the tenth scan transistor away from the display region. The control electrode ST92 of the ninth scan transistor and the control electrode ST102 of the tenth scan transistor are arranged along the first direction. Among them, the control electrode ST22 of the second scan transistor and the control electrode ST82 of the eighth scan transistor have an integrally formed structure, the control electrode ST132 of the thirteenth scan transistor and the control electrode ST142 of the fourteenth scan transistor have an integrally formed structure, the control electrode ST62 of the sixth scan transistor and the first plate SC11 of the first scan capacitor have an integrally formed structure, the control electrode ST42 of the fourth scan transistor, the first plate SC31 of the third scan capacitor and the control electrode ST52 of the fifth scan transistor have an integrally formed structure, and the control electrode ST92 of the ninth scan transistor and the first plate SC21 of the second scan capacitor have an integrally formed structure.

In an exemplary embodiment, the control electrode GT12 of the first control transistor to the control electrode GT32 of the third control transistor and the control electrode GT62 of the sixth control transistor to the control electrode GT82 of the eighth control transistor are located on a side of the control electrode GT42 of the fourth control transistor and the control electrode GT52 of the fifth control transistor away from the display region. The control electrode GT42 of the fourth control transistor and the control electrode GT52 of the fifth control transistor are arranged along the first direction. The second connection electrode VL2 is located on a side of the control electrode GT42 of the fourth control transistor away from the control electrode GT52 of the fifth control transistor and extends along the second direction. Among them, the control electrode GT42 of the fourth control transistor, the control electrode GT62 of the sixth control transistor, and the first plate GC11 of the first control capacitor have an integrally formed structure, and the control electrode GT52 of the fifth control transistor and the first plate GC21 of the second control capacitor have an integrally formed structure.

Figure 12:
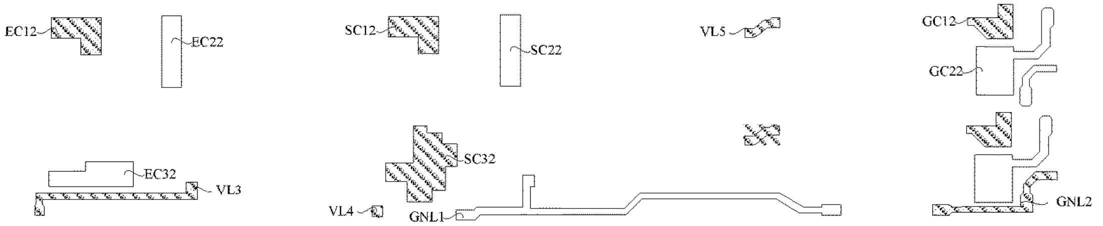
FIG. 12 is a schematic diagram of a second conductive layer.
Figure 13:
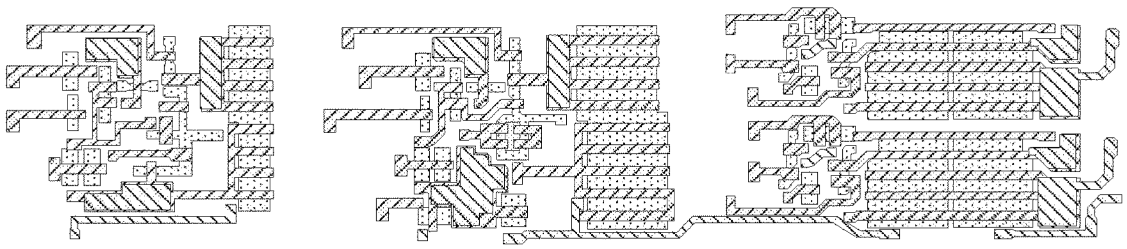
FIG. 13 is a first schematic diagram after a second conductive layer is formed.

(3) A second conductive layer is formed, which includes: a second insulation thin film is deposited on the base substrate on which the first conductive layer is formed, and the second insulation thin film is patterned through a patterning process to form a second insulation layer. A second conductive thin film is deposited on the base substrate on which the second insulation layer is formed, and the second conductive thin film is patterned through a patterning process to form the second conductive layer. As shown in FIG. 12 and FIG. 13, FIG. 12 is a schematic diagram of the second conductive layer, and FIG. 13 is a first schematic diagram after the second conductive layer is formed.

In an exemplary embodiment, the second conductive layer includes: a second plate EC12 of the first light emitting capacitor to a second plate EC32 of the third light emitting capacitor, a third connection electrode VL3, a second plate SC12 of the first scan capacitor to a second plate SC32 of the third scan capacitor, a fourth connection electrode VL4, a first scan output part GNL1, a second scan output part GNL2, a second plate GC12 of the first control capacitor, a second plate GC22 of the second control capacitor, and a fifth connection electrode VL5.

In an exemplary embodiment, the second plate EC12 of the first light emitting capacitor and the second plate EC22 of the second light emitting capacitor are arranged along the second direction, and the second plate EC12 of the first light emitting capacitor is located on a side of the second plate EC22 of the second light emitting capacitor away from the display region. The second plate EC22 of the second light emitting capacitor and the second plate EC32 of the third light emitting capacitor are arranged along the first direction, and the third connection electrode VL3 is located on a side of the second plate EC32 of the third light emitting capacitor away from the second plate EC22 of the second light emitting capacitor and extends along the second direction.

In an exemplary embodiment, the second plate SC12 of the first scan capacitor and the second plate SC22 of the second scan capacitor are arranged along the second direction, and the second plate SC12 of the first scan capacitor is located on a side of the second plate SC22 of the second scan capacitor away from the display region. The second plate SC22 of the second scan capacitor and the second plate SC32 of the third scan capacitor are arranged along the first direction, and the fourth connection electrode VL4 is located on a side of the second plate SC32 of the third scan capacitor away from the second plate SC22 of the second scan capacitor and extends along the second direction. The first scan output part GNL1 and the second scan output part GNL2 are located on a side of the second plate SC32 of the third scan capacitor away from the second plate SC22 of the second scan capacitor and extend along the second direction. The first scan output part GNL1 and the second scan output part GNL2 are arranged along the second direction.

In an exemplary embodiment, the second plate GC12 of the first control capacitor and the second plate GC22 of the second control capacitor are arranged along the first direction. The second plate GC12 of the first control capacitor and the fifth connection electrode VL5 are arranged along the first direction, and the fifth connection electrode VL5 is located on a side of the second plate GC12 of the first control capacitor away from the display region.

Figure 14:
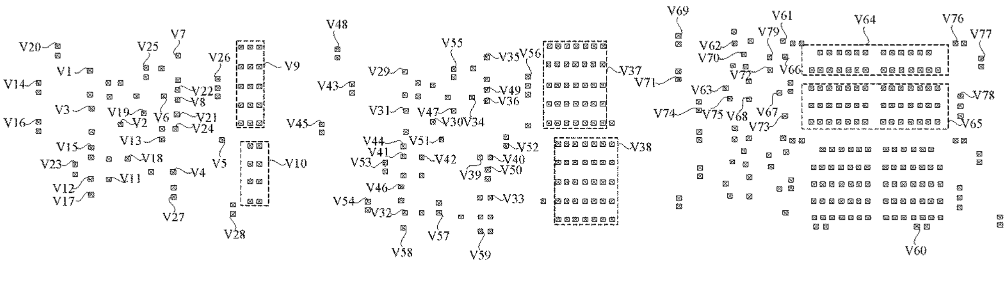
FIG. 14 is a first schematic diagram of a third insulation layer.
Figure 15:
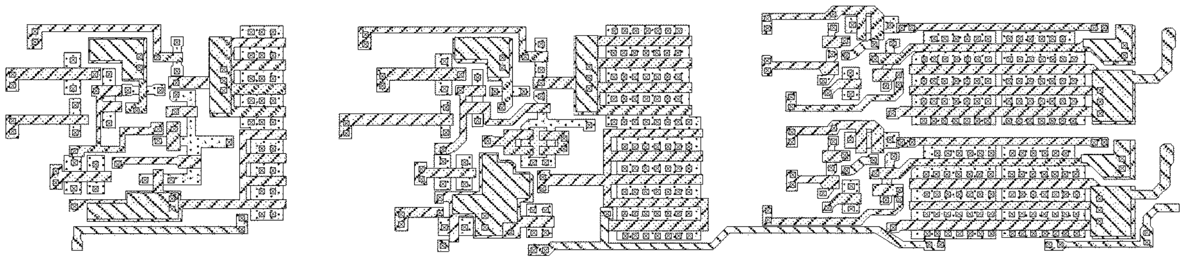
FIG. 15 is a first schematic diagram after a third insulation layer is formed.

(4) A third insulation layer is formed, which includes: a third insulation thin film is deposited on the base substrate on which the second conductive layer is formed, and the third insulation thin film is patterned through a patterning process to form the third insulation layer. As shown in FIG. 14 and FIG. 15, FIG. 14 is a first schematic diagram of the third insulation layer, and FIG. 15 is a first schematic diagram after the third insulation layer is formed.

In an exemplary embodiment, the third insulation layer may include multiple via patterns. The multiple via patterns may include a first via V1 to a thirteenth via V13 penetrating through the first insulation layer, the second insulation layer, and the third insulation layer, a fourteenth via V14 to a twenty-fourth via V24 penetrating through the second insulation layer and the third insulation layer, and a twenty-fifth via V25 to a twenty-eighth via V28 penetrating through the third insulation layer.

In an exemplary embodiment, the first via V1 exposes the active layer of the first light emitting transistor, the second via V2 exposes the active layer of the second light emitting transistor, the third via V3 exposes the active layer of the third light emitting transistor, the fourth via V4 exposes the active layer of the fourth light emitting transistor, the fifth via V5 exposes the active layer of the fifth light emitting transistor, the sixth via V6 exposes the active layer of the sixth light emitting transistor, the seventh via V7 exposes the active layer of the seventh light emitting transistor, the eighth via V8 exposes the active layer of the eighth light emitting transistor, the ninth via V9 exposes the active layer of the ninth light emitting transistor, the tenth via V10 exposes the active layer of the tenth light emitting transistor, the eleventh via V11 exposes the active layer of the eleventh light emitting transistor, the twelfth via V12 exposes the active layer of the twelfth light emitting transistor, the thirteenth via V13 exposes the active layer of the thirteenth light emitting transistor, the fourteenth via V14 exposes the control electrode of the first light emitting transistor, the fifteenth via V15 exposes the control electrode of the second light emitting transistor, the sixteenth via V16 exposes the control electrode of the third light emitting transistor, the seventeenth via V17 exposes the control electrode of the fourth light emitting transistor, the eighteenth via V18 exposes the control electrode of the fifth light emitting transistor, the nineteenth via V19 exposes the control electrode of the sixth light emitting transistor, the twentieth via V20 exposes the control electrode of the seventh light emitting transistor, the twenty-first via V21 exposes the control electrode of the eighth light emitting transistor, the twenty-second via V22 exposes the control electrode of the ninth light emitting transistor, the twenty-third via V23 exposes the control electrode of the eleventh light emitting transistor, the twenty-fourth via V24 exposes the control electrode of the thirteenth light emitting transistor, the twenty-fifth via V25 exposes the second plate of the first light emitting capacitor, the twenty-sixth via V26 exposes the second plate of the second light emitting capacitor, the twenty-seventh via V27 exposes the second plate of the third light emitting capacitor, and the twenty-eighth via V28 exposes the third connection electrode.

In an exemplary embodiment, the multiple via patterns may further include a twenty-ninth via V29 to a forty-second via V42 penetrating through the first insulation layer, the second insulation layer, and the third insulation layer, a forty-third via V43 to a fifty-fourth via V54 penetrating through the second insulation layer and the third insulation layer, and a fifty-fifth via V55 to a sixtieth via V60 penetrating through the third insulation layer.

In an exemplary embodiment, the twenty-ninth via V29 exposes the active layer of the first scan transistor, the thirtieth via V30 exposes the active layer of the second scan transistor, the thirty-first via V31 exposes the active layer of the third scan transistor, the thirty-second via V32 exposes the active layer of the fourth scan transistor, the thirty-third via V33 exposes the active layer of the fifth scan transistor, and the thirty-fourth via V34 exposes the active layer of the sixth scan transistor, the thirty-fifth via V35 exposes the active layer of the seventh scan transistor, the thirty-sixth via V36 exposes the active layer of the eighth scan transistor, the thirty-seventh via V37 exposes the active layer of the ninth scan transistor, the thirty-eighth via V38 exposes the active layer of the tenth scan transistor, the thirty-ninth via V39 exposes the active layer of the eleventh scan transistor, the fortieth via V40 exposes the active layer of the twelfth scan transistor, the forty-first via V41 exposes the active layer of the thirteenth scan transistor, the forty-second via V42 exposes the active layer of the fourteenth scan transistor, the forty-third via V43 exposes the control electrode of the first scan transistor, the forty-fourth via V44 exposes the control electrode of the second scan transistor, the forty-fifth via V45 exposes the control electrode of the third scan transistor, and the forty-sixth via V46 exposes the control electrode of the fourth scan transistor, the forty-seventh via V47 exposes the control electrode of the sixth scan transistor, the forty-eighth via V48 exposes the control electrode of the seventh scan transistor, the forty-ninth via V49 exposes the control electrode of the ninth scan transistor, the fiftieth via V50 exposes the control electrode of the tenth scan transistor, the fifty-first via V51 exposes the control electrode of the eleventh scan transistor, the fifty-second via V52 exposes the control electrode of the twelfth scan transistor, the fifty-third via V53 exposes the control electrode of the thirteenth scan transistor, the fifty-fourth via V54 exposes the first connection electrode, the fifty-fifth via V55 exposes the first plate of the first scan capacitor, the fifty-sixth via V56 exposes the first plate of the second scan capacitor, the fifty-seventh via V57 exposes the first plate of the third scan capacitor, the fifty-eighth via V58 exposes the fourth connection electrode VL3, the fifty-ninth via V59 exposes the first scan output part, and the sixtieth via V60 exposes the second scan output part.

In an exemplary embodiment, the multiple via patterns may further include a sixty-first via V61 to a sixty-eighth via V68 penetrating through the first insulation layer, the second insulation layer, and the third insulation layer, a sixty-ninth via V69 to a seventy-sixth via V76 penetrating through the second insulation layer and the third insulation layer, and a seventy-seventh via V77 to a seventy-ninth via V79 penetrating through the third insulation layer.

In an exemplary embodiment, the sixty-first via V61 exposes the active layer of the first control transistor, the sixty-second via V62 exposes the active layer of the second control transistor, the sixty-third via V63 exposes the active layer of the third control transistor, the sixty-fourth via V64 exposes the active layer of the fourth control transistor, the sixty-fifth via V65 exposes the active layer of the fifth control transistor, the sixty-sixth via V66 exposes the active layer of the sixth control transistor, the sixty-seventh via V67 exposes the active layer of the seventh control transistor, the sixty-eighth via V68 exposes the active layer of the eighth control transistor, the sixty-ninth via V69 exposes the control electrode of the first control transistor, the seventieth via V70 exposes the control electrode of the second control transistor, the seventy-first via V71 exposes the control electrode of the third control transistor, the seventy-second via V72 exposes the control electrode of the fourth control transistor, the seventy-third via V73 exposes the control electrode of the fifth control transistor, the seventy-fourth via V74 exposes the control electrode of the seventh control transistor, the seventy-fifth via V75 exposes the control electrode of the eighth control transistor, the seventy-sixth via V76 exposes the second connection electrode, the seventy-seventh via V77 exposes the first plate of the first control capacitor, the seventy-eighth via V78 exposes the second plate of the second control capacitor, and the seventy-ninth via V79 exposes the fifth connection electrode.

Figure 16:
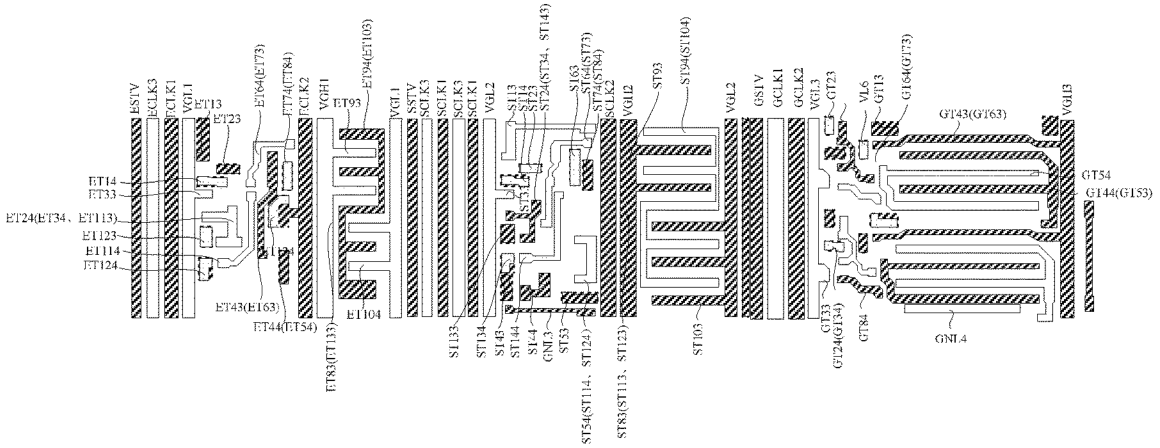
FIG. 16 is a first schematic diagram of a third conductive layer.
Figure 17:
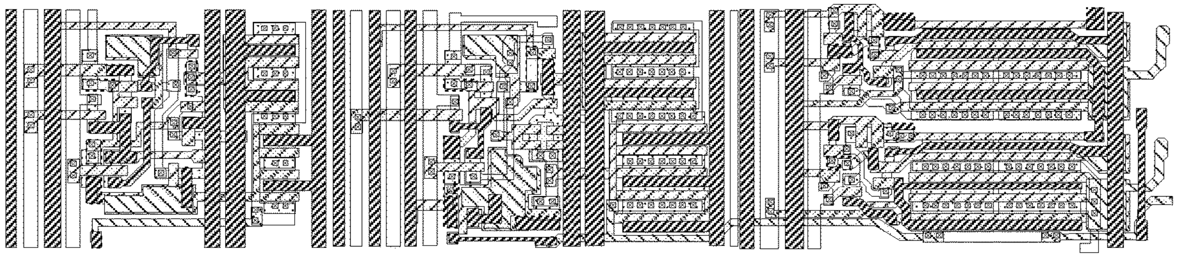
FIG. 17 is a first schematic diagram after a third conductive layer is formed.

(5) A third conductive layer is formed, which includes: a third conductive thin film is deposited on the base substrate on which the third insulation layer is formed, and the third conductive thin film is patterned through a patterning process to form the third conductive layer, as shown in FIGS. 16 and 17, FIG. 16 is a first schematic diagram of the third conductive layer, and FIG. 17 is a first schematic diagram after the third conductive layer is formed.

In an exemplary embodiment, the third conductive layer may include: a light emitting initial signal line ESTV, a first high-level power supply line VGH1, a first low-level power supply line VGL1, a first light emitting clock signal line ECLK1 to a third light emitting clock signal line ECLK3, a first electrode ET13 and a second electrode ET14 of a first light emitting transistor to a first electrode ET133 and a second electrode ET134 of a thirteenth light emitting transistor, a scan initial signal line SSTV, a second high-level power supply line VGH2, a second low-level power supply line VGL2, a first scan clock signal line SCLK1 to a third scan clock signal line SCLK3, a first electrode ST13 and a second electrode ST14 of a first scan transistor to a first electrode ST143 and a second electrode ST144 of a fourteenth scan transistor, a control initial signal line GSTV, a third high-level power supply line VGH3, a third low-level power supply line VGL3, a first control clock signal line GCLK1, a second control clock signal line GCLK2, a first electrodes GT13 and a second electrode GT14 of a first control transistor to a first electrode GT83 and a second electrode GT84 of an eighth control transistor, a third scan output part GNL3, a sixth connection electrode VL6, and a fourth scan output part GNL4.

In an exemplary embodiment, the display substrate includes two first low-level power supply lines VGL1.

In an exemplary embodiment, the light emitting initial signal line ESTV, the first high-level power supply line VGH1, the first low-level power supply line VGL1, the first light emitting clock signal line ECLK1 to the third light emitting clock signal line ECLK3 extend along the first direction. The third scan clock signal line SCLK3 is located on a side of the light emitting initial signal line ESTV close to the display region, the first scan clock signal line SCLK1 is located on a side of the third scan clock signal line SCLK3 close to the display region. A first one of the first low-level power supply lines VGL1 is located on a side of the first scan clock signal line SCLK1 close to the display region, the first electrode ET13 and the second electrode ET14 of the first light emitting transistor to the first electrode ET83 and the second electrode ET84 of the eighth light emitting transistor and the first electrode ET113 and the second electrode ET114 of the eleventh light emitting transistor to the first electrode ET133 and the second electrode ET134 of the thirteenth light emitting transistor are located between the first one of the first low-level power supply lines VGL1 and the second scan clock signal line SCLK2. The second scan clock signal line SCLK2 is located on a side of the first one of the first low-level power supply lines VGL1 close to the display region, the first high-level power supply line VGH1 is located on a side of the second scan clock signal line SCLK2 close to the display region. The first electrode ET93 and the second electrode ET94 of the ninth light emitting transistor to the first electrode ET103 and the second electrode ET104 of the tenth light emitting transistor are located between the first high-level power supply line VGH1 and a second one of the first low-level power supply lines VGL1, and the second one of the first low-level power supply lines VGL1 is located on a side of the first high-level power supply line VGH1 close to the display region.

In an exemplary embodiment, the first one of the first low-level power supply lines VGL1 and the first electrode ET33 of the third light emitting transistor have an integrally formed structure. The second one of the first low-level power supply lines VGL1 and the first electrode E104 of the tenth light emitting transistor have an integrally formed structure. The first high-level power supply line VGH1, the first electrode ET83 of the eighth light emitting transistor, and the first electrode ET133 of the thirteenth light emitting transistor have an integrally formed structure. The second electrode ET24 of the second light emitting transistor, the second electrode ET34 of the third light emitting transistor, and the first electrode ET113 of the eleventh light emitting transistor have an integrally formed structure. The first electrode ET43 of the fourth light emitting transistor and the first electrode ET63 of the sixth light emitting transistor have an integrally formed structure. The second electrode ET44 of the fourth light emitting transistor and the second electrode ET54 of the fifth light emitting transistor have an integrally formed structure. The first electrode ET83 of the eighth light emitting transistor and the first electrode ET133 of the thirteenth light emitting transistor have an integrally formed structure. The second electrode ET94 of the ninth light emitting transistor and the first electrode ET10 of the tenth light emitting transistor have an integrally formed structure. The second electrode ET74 of the seventh light emitting transistor and the second electrode ET84 of the eighth light emitting transistor have an integrally formed structure. The second electrode ET64 of the sixth light emitting transistor and the first electrode ET73 of the seventh light emitting transistor have an integrally formed structure.

In an exemplary embodiment, for an odd-stage light emitting shift register, the first electrode ET13 and the second electrode ET14 of the first light emitting transistor are electrically connected with the active layer of the first light emitting transistor through the first via, the second electrode ET14 of the first light emitting transistor is connected with the control electrode of the second light emitting transistor through the fifteenth via, and the control electrode of the first light emitting transistor is connected with the third light emitting clock signal line ECLK3 and a first electrode ET23 of the second light emitting transistor through the fourteenth via, respectively. The first electrode ET23 of the second light emitting transistor is connected with the active layer of the second light emitting transistor through the second via. The first electrode ET33 and the second electrode ET34 of the third light emitting transistor are connected with the active layer of the third light emitting transistor through the third via, and the control electrode of the third light emitting transistor is connected with the third light emitting clock signal line ECLK3 through the sixteenth via. The first electrode ET43 and the second electrode ET44 of the fourth light emitting transistor are connected with the active layer of the fourth light emitting transistor through the fourth via, and the second electrode ET44 of the fourth light emitting transistor is connected with the second plate of the third light emitting capacitor through the twenty-seventh via. A first electrode ET53 and a second electrode ET54 of the fifth light emitting transistor are connected with the active layer of the fifth light emitting transistor through the fifth via. The first electrode ET63 and the second electrode ET64 of the sixth light emitting transistor are connected with the active layer of the sixth light emitting transistor through the sixth via, and the second electrode ET64 of the sixth light emitting transistor is connected with the second plate of the first light emitting capacitor through the twenty-fifth via. The first electrode ET73 and the second electrode ET74 of the seventh light emitting transistor are connected with the active layer of the seventh light emitting transistor through the seventh via, and the control electrode of the seventh light emitting transistor is connected with the first light emitting clock signal line ECLK1 and the first electrode ET43 of the fourth light emitting transistor through the twentieth via. The first electrode ET83 and the second electrode ET84 of the eighth light emitting transistor are connected with the active layer of the eighth light emitting transistor through the eighth via, and the control electrode of the eighth light emitting transistor is connected with the second electrode ET134 of the thirteenth light emitting transistor through the twenty-first via. The first electrode ET93 and the second electrode ET94 of the ninth light emitting transistor are connected with the active layer of the ninth light emitting transistor through the ninth via, the first electrode ET93 of the ninth light emitting transistor is connected with the second plate of the second light emitting capacitor through the twenty-sixth via, and the control electrode of the ninth light emitting transistor is connected with the second electrode T74 of the seventh light emitting transistor through the twenty-second via. The first electrode ET103 and the second electrode ET104 of the tenth light emitting transistor are connected with the active layer of the tenth light emitting transistor through the tenth via, and the first electrode ET103 of the tenth light emitting transistor is connected with the third connection electrode VL3 through the twenty-eighth via. The first electrode ET113 and the second electrode ET114 of the eleventh light emitting transistor are connected with the active layer of the eleventh light emitting transistor through the eleventh via, the second electrode ET114 of the eleventh light emitting transistor is connected with the control electrode of the fifth light emitting transistor through the eighteenth via, and is connected with the control electrode of the sixth light emitting transistor through the nineteenth via, and the control electrode of the eleventh light emitting transistor is connected with the first low-level power supply line VGL1 through the twenty-third via. A first electrode ET123 and a second electrode ET124 of the twelfth light emitting transistor are connected with the active layer of the twelfth light emitting transistor through the twelfth via, the first electrode ET123 of the twelfth light emitting transistor is connected with the control electrode of the second light emitting transistor through the fifteenth via, the second electrode ET124 of the twelfth light emitting transistor is connected with the active layer of the twelfth light emitting transistor through the twelfth via, and is connected with the first plate of the third light emitting capacitor through the seventeenth via. The first electrode ET133 and the second electrode ET134 of the thirteenth light emitting transistor are connected with the active layer of the thirteenth light emitting transistor through the thirteenth via, the second electrode ET134 of the thirteenth light emitting transistor is connected with the control electrode of the second light emitting transistor through the fifteenth via, and the control electrode of the thirteenth light emitting transistor is connected with the second light emitting clock signal line ECLK2 through the twenty-fourth via. FIG. 17 is illustrated by taking an odd-stage light emitting shift register as an example.

In an exemplary embodiment, for an even-stage light emitting shift register, the first electrode ET13 and the second electrode ET14 of the first light emitting transistor are electrically connected with the active layer of the first light emitting transistor through the first via, the second electrode ET14 of the first light emitting transistor is connected with the control electrode of the second light emitting transistor through the fifteenth via, and the control electrode of the first light emitting transistor is connected with the first light emitting clock signal line ECLK1 and the first electrode ET23 of the second light emitting transistor through the fourteenth via, respectively. The first electrode ET23 of the second light emitting transistor is connected with the active layer of the second light emitting transistor through the second via. The first electrode ET33 and the second electrode ET34 of the third light emitting transistor are connected with the active layer of the third light emitting transistor through the third via, and the control electrode of the third light emitting transistor is connected with the first light emitting clock signal line ECLK1 through the sixteenth via. The first electrode ET43 and the second electrode ET44 of the fourth light emitting transistor are connected with the active layer of the fourth light emitting transistor through the fourth via, and the second electrode ET44 of the fourth light emitting transistor is connected with the second plate of the third light emitting capacitor through the twenty-seventh via. The first electrode ET53 and the second electrode ET54 of the fifth light emitting transistor are connected with the active layer of the fifth light emitting transistor through the fifth via. The first electrode ET63 and the second electrode ET64 of the sixth light emitting transistor are connected with the active layer of the sixth light emitting transistor through the sixth via, and the second electrode ET64 of the sixth light emitting transistor is connected with the second plate of the first light emitting capacitor through the twenty-fifth via. The first electrode ET73 and the second electrode ET74 of the seventh light emitting transistor are connected with the active layer of the seventh light emitting transistor through the seventh via, and the control electrode of the seventh light emitting transistor is connected with the third light emitting clock signal line ECLK3 and the first electrode ET43 of the fourth light emitting transistor through the twentieth via. The first electrode ET83 and the second electrode ET84 of the eighth light emitting transistor are connected with the active layer of the eighth light emitting transistor through the eighth via, and the control electrode of the eighth light emitting transistor is connected with the second electrode ET134 of the thirteenth light emitting transistor through the twenty-first via. The first electrode ET93 and the second electrode ET94 of the ninth light emitting transistor are connected with the active layer of the ninth light emitting transistor through the ninth via, the first electrode ET93 of the ninth light emitting transistor is connected with the second plate of the second light emitting capacitor through the twenty-sixth via, and the control electrode of the ninth light emitting transistor is connected with the second electrode T74 of the seventh light emitting transistor through the twenty-second via. The first electrode ET103 and the second electrode ET104 of the tenth light emitting transistor are connected with the active layer of the tenth light emitting transistor through the tenth via, and the first electrode ET103 of the tenth light emitting transistor is connected with the third connection electrode VL3 through the twenty-eighth via. The first electrode ET113 and the second electrode ET114 of the eleventh light emitting transistor are connected with the active layer of the eleventh light emitting transistor through the eleventh via, the second electrode ET114 of the eleventh light emitting transistor is connected with the control electrode of the fifth light emitting transistor through the eighteenth via, and is connected with the control electrode of the sixth light emitting transistor through the nineteenth via, and the control electrode of the eleventh light emitting transistor is connected with the first one of the first low-level power supply lines VGL1 through the twenty-third via. The first electrode ET123 and the second electrode ET124 of the twelfth light emitting transistor are connected with the active layer of the twelfth light emitting transistor through the twelfth via, the first electrode ET123 of the twelfth light emitting transistor is connected with the control electrode of the second light emitting transistor through the fifteenth via, the second electrode ET124 of the twelfth light emitting transistor is connected with the active layer of the twelfth light emitting transistor through the twelfth via, and is connected with the first plate of the third light emitting capacitor through the seventeenth via. The first electrode ET133 and the second electrode ET134 of the thirteenth light emitting transistor are connected with the active layer of the thirteenth light emitting transistor through the thirteenth via, the second electrode ET134 of the thirteenth light emitting transistor is connected with the control electrode of the second light emitting transistor through the fifteenth via, and the control electrode of the thirteenth light emitting transistor is connected with the second light emitting clock signal line ECLK2 through the twenty-fourth via.

In an exemplary embodiment, the third connection electrode VL3 is also connected with a first electrode of a first light emitting transistor of a light emitting shift register of a next stage.

In an exemplary embodiment, the display substrate may further include two second low-level power supply lines VGL2, two first scan clock signal lines ECLK1, and two second scan clock signal lines ECLK3.

In an exemplary embodiment, the scan initial signal line SSTV, the second high-level power supply line VGH2, the second low-level power supply line VGL2, the first scan clock signal line SCLK1 to the third scan clock signal line SCLK3 extend along the first direction. Among them, the scan initial signal line SSTV, the first third scan clock signal line SCLK3, the first one of the first scan clock signal lines SCLK1, the second third scan clock signal line SCLK3, the second one of the first scan clock signal lines SCLK1, and the first one of the second low-level power supply lines VGL2 are sequentially arranged along a side of the second one of the first low-level power supply lines close to the display region. The first electrode ST13 and the second electrode ST14 of the first scan transistor to the first electrode ST83 and the second electrode ST84 of the eighth scan transistor, the first electrode ST103 and the second electrode ST104 of the tenth scan transistor to the first electrode ST143 and the second electrode ST144 of the fourteenth scan transistor, and the third scan output part GNL3 are located between the first one of the second low-level power supply lines VGL2 and the second scan clock signal line SCLK2, and the second scan clock signal line SCLK2 is located on a side of the first one of the second low-level power supply lines VGL2 close to the display region. The second high-level power supply line VGH2 is located on a side of the second scan clock signal line SCLK2 close to the display region. The first electrode ST93 and the second electrode ST94 of the ninth scan transistor to the first electrode ST103 and the second electrode ST104 of the tenth scan transistor are located between the second high-level power supply line VGH2 and the second one of the second low-level power supply lines VGL2, and the second one of the second low-level power supply lines VGL2 is located on a side of the second high-level power supply line VGH2 close to the display region.

In an exemplary embodiment, the third scan output part GNL3 and the fourth scan output part GNL4 extend along the second direction. A fourth scan output part GNL4 of an i-th stage scan shift register is located between a 2i-th stage control shift register and a (2i+1)-th stage control shift register.

In an exemplary embodiment, the first one of the second low-level power supply lines VGL2 and the first electrode ST33 of the third scan transistor have an integrally formed structure, the second one of the second low-level power supply lines VGL2 and the first electrode ST103 of the tenth scan transistor have an integrally formed structure, the second high-level power supply line VGH2, the first electrode ST83 of the eighth scan transistor, the first electrode ST113 of the eleventh scan transistor, and the first electrode ST123 of the twelfth scan transistor have an integrally formed structure, the second electrode ST24 of the second scan transistor, the second electrode ST34 of the third scan transistor, and the first electrode ST143 of the fourteenth scan transistor have an integrally formed structure, the second electrode ST54 of the fifth scan transistor, the second electrode ST114 of the eleventh scan transistor, and the second electrode ST124 of the twelfth scan transistor have an integrally formed structure, the second electrode ST64 of the sixth scan transistor and the first electrode ST73 of the seventh scan transistor have an integrally formed structure, and the second electrode ST74 of the seventh scan transistor and the second electrode ST84 of the eighth scan transistor have an integrally formed structure.

In an exemplary embodiment, for an odd-stage scan shift register, the first electrode ST13 and the second electrode ST14 of the first scan transistor are electrically connected with the active layer of the first scan transistor through the twenty-ninth via, the second electrode ST14 of the first scan transistor is connected with the control electrode of the second scan transistor through the forty-fourth via, and the control electrode of the first scan transistor is connected with the second third scan clock signal line SCLK3 and the first electrode ST23 of the second scan transistor through the forty-third via, respectively. The first electrode ST23 and the second electrode ST24 of the second scan transistor are connected with the active layer of the second scan transistor through the thirtieth via. The first electrode ST33 and the second electrode ST34 of the third scan transistor are connected with the active layer of the third scan transistor through the thirty-first via, and the control electrode of the third scan transistor is connected with the first third scan clock signal line SCLK3 through the forty-fifth via. The first electrode ST43 and the second electrode ST44 of the fourth scan transistor are connected with the active layer of the fourth scan transistor through the thirty-second via, the first connection electrode VL1 is connected with the second one of the first scan clock signal lines SCLK1 and the first electrode ST43 of the fourth scan transistor through the fifty-fourth via, and the second electrode ST44 of the fourth scan transistor is connected with the second plate of the third scan capacitor through the fifty-seventh via. The first electrode ST53 and the second electrode ST54 of the fifth scan transistor are connected with the active layer of the fifth scan transistor through the thirty-third via, the first electrode ST53 of the fifth scan transistor is connected with the control electrode of the fourth scan transistor through the forty-sixth via, and the second electrode ST54 of the fifth scan transistor is connected with the control electrode of the tenth scan transistor through the fiftieth via. The first electrode ST63 and the second electrode ST64 of the sixth scan transistor are connected with the active layer of the sixth scan transistor through the thirty-fourth via, the first electrode ST63 of the sixth scan transistor is connected with the control electrode of the seventh scan transistor through the forty-eighth via, the second electrode ST64 of the sixth scan transistor is connected with the second plate of the first scan capacitor through the fifty-fifth via, and is connected with the control electrode of the eleventh scan transistor through the fifty-first via. The first electrode ST73 and the second electrode ST74 of the seventh scan transistor are connected with the active layer of the seventh scan transistor through the seventh via, the second electrode ST74 of the seventh scan transistor is connected with the control electrode of the ninth scan transistor through the forty-ninth via, and the control electrode of the seventh scan transistor is connected with the first one of the first scan clock signal lines SCLK1 through the forty-eighth via. The first electrode ST83 and the second electrode ST84 of the eighth scan transistor is connected with the active layer of the eighth scan transistor through the thirty-sixth via. The first electrode ST93 and the second electrode ST94 of the ninth scan transistor are connected with the active layer of the ninth scan transistor through the thirty-seventh via, and the first electrode ST93 of the ninth scan transistor is connected with the second plate of the second scan capacitor through the fifty-sixth via. The first electrode ST103 and the second electrode ST104 of the tenth scan transistor are connected with the active layer of the tenth scan transistor through the thirty-eighth via, and the second electrode ST104 of the tenth scan transistor is connected with the first scan output part through the fifty-ninth via. The first electrode ST113 and the second electrode ST114 of the eleventh scan transistor are connected with the active layer of the eleventh scan transistor through the fortieth via. The first electrode ST123 and the second electrode ST124 of the twelfth scan transistor are connected with the active layer of the twelfth scan transistor through the fortieth via, and the control electrode of the twelfth scan transistor is connected with the second scan clock signal line SCLK2 through the fifty-second via. The first electrode ST133 and the second electrode ST134 of the thirteenth scan transistor are connected with the active layer of the thirteenth scan transistor through the forty-first via, the first electrode ST133 of the thirteenth scan transistor is connected with the control electrode of the second scan transistor through the forty-fourth via, the second electrode ST134 of the thirteenth scan transistor is connected with the control electrode of the fourth scan transistor through the forty-sixth via, the control electrode of the thirteenth scan transistor is connected with the first one of the second low-level power supply lines VGL2 through the fifty-third via, the first electrode ST143 and the second electrode ST144 of the fourteenth scan transistor are connected with the active layer of the fourteenth scan transistor through the forty-second via, and the second electrode ST144 of the fourteenth scan transistor is connected with the control electrode of the sixth scan transistor through the forty-seventh via. The third scan output part GNL3 is connected with the fourth connection electrode through the fifty-eighth via and is connected with the first scan output part through the fifty-ninth via, and the fourth scan output part GNL4 is connected with the first scan output part through the fifty-ninth via and is connected with the second scan output part through the sixtieth via. FIG. 17 is illustrated by taking an odd-stage scan shift register as an example.

In an exemplary embodiment, for an even-stage scan shift register, the first electrode ST13 and the second electrode ST14 of the first scan transistor are electrically connected with the active layer of the first scan transistor through the twenty-ninth via, the second electrode ST14 of the first scan transistor is connected with the control electrode of the second scan transistor through the forty-fourth via, and the control electrode of the first scan transistor is connected with the first third scan clock signal line SCLK3 and the first electrode ST23 of the second scan transistor through the forty-third via, respectively. The first electrode ST23 and the second electrode ST24 of the second scan transistor are connected with the active layer of the second scan transistor through the thirtieth via. The first electrode ST33 and the second electrode ST34 of the third scan transistor are connected with the active layer of the third scan transistor through the thirty-first via, and the control electrode of the third scan transistor is connected with the second third scan clock signal line SCLK3 through the forty-fifth via. The first electrode ST43 and the second electrode ST44 of the fourth scan transistor are connected with the active layer of the fourth scan transistor through the thirty-second via, the first connection electrode VL1 is connected with the first one of the first scan clock signal lines SCLK1 and the first electrode ST43 of the fourth scan transistor through the fifty-fourth via, and the second electrode ST44 of the fourth scan transistor is connected with the second plate of the third scan capacitor through the fifty-seventh via. The first electrode ST53 and the second electrode ST54 of the fifth scan transistor are connected with the active layer of the fifth scan transistor through the thirty-third via, the first electrode ST53 of the fifth scan transistor is connected with the control electrode of the fourth scan transistor through the forty-sixth via, and the second electrode ST54 of the fifth scan transistor is connected with the control electrode of the tenth scan transistor through the fiftieth via. The first electrode ST63 and the second electrode ST64 of the sixth scan transistor are connected with the active layer of the sixth scan transistor through the thirty-fourth via, the first electrode ST63 of the sixth scan transistor is connected with the control electrode of the seventh scan transistor through the forty-eighth via, the second electrode ST64 of the sixth scan transistor is connected with the second plate of the first scan capacitor through the fifty-fifth via, and is connected with the control electrode of the eleventh scan transistor through the fifty-first via. The first electrode ST73 and the second electrode ST74 of the seventh scan transistor are connected with the active layer of the seventh scan transistor through the seventh via, the second electrode ST74 of the seventh scan transistor is connected with the control electrode of the ninth scan transistor through the forty-ninth via, and the control electrode of the seventh scan transistor is connected with the second one of the first scan clock signal lines SCLK1 through the forty-eighth via. The first electrode ST83 and the second electrode ST84 of the eighth scan transistor is connected with the active layer of the eighth scan transistor through the thirty-sixth via. The first electrode ST93 and the second electrode ST94 of the ninth scan transistor are connected with the active layer of the ninth scan transistor through the thirty-seventh via, and the first electrode ST93 of the ninth scan transistor is connected with the second plate of the second scan capacitor through the fifty-sixth via. The first electrode ST103 and the second electrode ST104 of the tenth scan transistor are connected with the active layer of the tenth scan transistor through the thirty-eighth via, and the second electrode ST104 of the tenth scan transistor is connected with the first scan output part through the fifty-ninth via. The first electrode ST113 and the second electrode ST114 of the eleventh scan transistor are connected with the active layer of the eleventh scan transistor through the fortieth via. The first electrode ST123 and the second electrode ST124 of the twelfth scan transistor are connected with the active layer of the twelfth scan transistor through the fortieth via, and the control electrode of the twelfth scan transistor is connected with the second scan clock signal line SCLK2 through the fifty-second via. The first electrode ST133 and the second electrode ST134 of the thirteenth scan transistor are connected with the active layer of the thirteenth scan transistor through the forty-first via, the first electrode ST133 of the thirteenth scan transistor is connected with the control electrode of the second scan transistor through the forty-fourth via, the second electrode ST134 of the thirteenth scan transistor is connected with the control electrode of the fourth scan transistor through the forty-sixth via, the control electrode of the thirteenth scan transistor is connected with the first one of the second low-level power supply lines VGL2 through the fifty-third via, the first electrode ST143 and the second electrode ST144 of the fourteenth scan transistor are connected with the active layer of the fourteenth scan transistor through the forty-second via, and the second electrode ST144 of the fourteenth scan transistor is connected with the control electrode of the sixth scan transistor through the forty-seventh via. The third scan output part GNL3 is connected with the fourth connection electrode through the fifty-eighth via and is connected with the first scan output part through the fifty-ninth via, and the fourth scan output part GNL4 is connected with the first scan output part through the fifty-ninth via and is connected with the second scan output part through the sixtieth via.

In an exemplary embodiment, the fourth connection electrode VL4 is also connected with a first electrode of a first scan transistor of a next stage scan shift register.

In an exemplary embodiment, the control initial signal line GSTV, the third high-level power supply line VGH3, the third low-level power supply line VGL3, the first control clock signal line GCLK1, and the second control clock signal line GCLK2 extend along the first direction. Among them, the control initial signal line GSTV, the first control clock signal line GCLK1, the second control clock signal line GCLK2, and the third low-level power supply line VGL3 are sequentially arranged along a direction in which the second one of the second low-level power supply lines VGL2 approaches the display region. The first electrode GT13 and the second electrode GT14 of the first control transistor to the first electrode GT83 and the second electrode GT84 of the eighth control transistor and the sixth connection electrode VL6 are located between the third low-level power supply line VGL3 and the third high-level power supply line VGH3, and the third high-level power supply line VGH3 is located on a side of the third low-level power supply line VGL3 close to the display region.

In an exemplary embodiment, the third low-level power supply line VL3 and the first electrode GT33 of the third control transistor have an integrally formed structure. The third high-level power supply line VGH3, a first electrode GT43 of the fourth control transistor, and a first electrode GT63 of the sixth control transistor have an integrally formed structure, the second electrode GT14 of the first control transistor, a second electrode GT74 of the seventh control transistor, and the first electrode GT83 of the eighth control transistor have an integrally formed structure, a second electrode GT24 of the second control transistor and a second electrode GT34 of the third control transistor have an integrally formed structure, and a second electrode GT44 of the fourth control transistor and a first electrode GT53 of the fifth control transistor have an integrally formed structure.

In an exemplary embodiment, conductive active layers of the sixth control transistor and the seventh control transistor are multiplexed into the first electrode GT63 of the sixth control transistor and a first electrode GT73 of the seventh control transistor, and the first electrode GT63 of the sixth control transistor and the first electrode GT73 of the seventh control transistor have an integrally formed structure.

In an exemplary embodiment, for an odd-stage control shift register, the first electrode GT13 and the second electrode GT14 of the first control transistor are electrically connected with the active layer of the first control transistor through the sixty-first via, the first electrode GT13 of the first control transistor is connected with the second connection electrode through the seventy-sixth via, the second electrode GT14 of the first control transistor is connected with the control electrode of the second control transistor through the seventieth via, and the control electrode of the first control transistor is connected with the first control clock signal line GCLK1 and a first electrode GT23 of the second control transistor through the sixty-ninth via, respectively. The first electrode GT23 and the second electrode GT24 of the second control transistor are connected with the active layer of the second control transistor through the sixty-second via, and the second electrode GT24 of the second control transistor is connected with the fifth connection electrode through the seventy-ninth via V79. The first electrode GT33 and the second electrode GT34 of the third control transistor are connected with the active layer of the third control transistor through the sixty-third via, and the control electrode of the third control transistor is connected with the first control clock signal line GCLK1 through the seventy-first via. The first electrode GT43 and the second electrode GT44 of the fourth control transistor are connected with the active layer of the fourth control transistor through the sixty-fourth via, the first electrode GT43 of the fourth control transistor is connected with the first plate of the first control capacitor through the seventy-seventh via, and the second electrode GT44 of the fourth control transistor is connected with the second plate of the second control capacitor through the seventy-eighth via. The first electrode GT53 and the second electrode GT54 of the fifth control transistor are connected with the active layer of the fifth control transistor through the sixty-fifth via, and the second electrode GT54 of the fifth control transistor is connected with the control electrode of the seventh control transistor through the seventy-fourth via. The first electrode GT63 of the sixth control transistor is connected with the active layer of the sixth control transistor through the sixty-sixth via. The second electrode GT74 of the seventh control transistor is connected with the active layer of the seventh control transistor through the sixty-seventh via, and the control electrode of the seventh control transistor is connected with the second control clock signal line GCLK2 and the second electrode GT54 of the fifth control transistor through the seventy-fourth via. The first electrode GT83 and the second electrode GT84 of the eighth control transistor are connected with the active layer of the eighth control transistor through the sixty-eighth via, and the second electrode GT84 and the second electrode GT84 of the eighth control transistor are connected with the control electrode of the fifth control transistor through the seventy-third via. The sixth connection electrode VL6 is connected with the control electrode of the fourth control transistor through the seventy-second via, and is connected with the fifth connection electrode through a seventy-ninth electrode.

In an exemplary embodiment, for an even-stage control shift register, the first electrode GT13 and the second electrode GT14 of the first control transistor are electrically connected with the active layer of the first control transistor through the sixty-first via, the first electrode GT13 of the first control transistor is connected with the second connection electrode through the seventy-sixth via, the second electrode GT14 of the first control transistor is connected with the control electrode of the second control transistor through the seventieth via, and the control electrode of the first control transistor is connected with the second control clock signal line GCLK2 and the first electrode GT23 of the second control transistor through the sixty-ninth via, respectively. The first electrode GT23 and the second electrode GT24 of the second control transistor are connected with the active layer of the second control transistor through the sixty-second via, and the second electrode GT24 of the second control transistor is connected with the fifth connection electrode through the seventy-ninth via V79. The first electrode GT33 and the second electrode GT34 of the third control transistor are connected with the active layer of the third control transistor through the sixty-third via, and the control electrode of the third control transistor is connected with the second control clock signal line GCLK2 through the seventy-first via. The first electrode GT43 and the second electrode GT44 of the fourth control transistor are connected with the active layer of the fourth control transistor through the sixty-fourth via, the first electrode GT43 of the fourth control transistor is connected with the first plate of the first control capacitor through the seventy-seventh via, and the second electrode GT44 of the fourth control transistor is connected with the second plate of the second control capacitor through the seventy-eighth via. The first electrode GT53 and the second electrode GT54 of the fifth control transistor are connected with the active layer of the fifth control transistor through the sixty-fifth via, and the second electrode GT54 of the fifth control transistor is connected with the control electrode of the seventh control transistor through the seventy-fourth via. The first electrode GT63 of the sixth control transistor is connected with the active layer of the sixth control transistor through the sixty-sixth via. The second electrode GT74 of the seventh control transistor is connected with the active layer of the seventh control transistor through the sixty-seventh via, and the control electrode of the seventh control transistor is connected with the first control clock signal line GCLK1 and the second electrode GT54 of the fifth control transistor through the seventy-fourth via. The first electrode GT83 and the second electrode GT84 of the eighth control transistor are connected with the active layer of the eighth control transistor through the sixty-eighth via, and the second electrode GT84 and the second electrode GT84 of the eighth control transistor are connected with the control electrode of the fifth control transistor through the seventy-third via. The sixth connection electrode VL6 is connected with the control electrode of the fourth control transistor through the seventy-second via, and is connected with the fifth connection electrode through the seventy-ninth electrode.

In an exemplary embodiment, the second connection electrode is connected with a second electrode of a fifth control transistor of an upper one stage light emitting shift register through the seventy-sixth via.

Figure 18:
FIG. 18 is a first schematic diagram of a first planarization layer.
Figure 19:
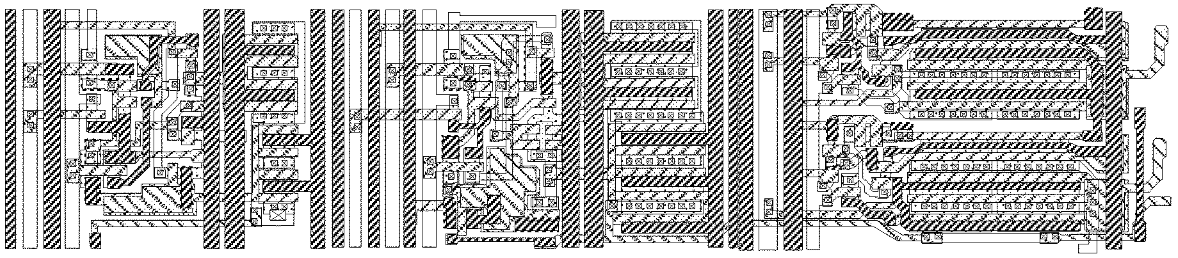
FIG. 19 is a first schematic diagram after a first planarization layer is formed.

(6) A first planarization layer is formed, which includes: on the base substrate on which the third conductive layer is formed, a fourth insulation thin film is deposited, the fourth insulation thin film is patterned through a patterning process to form a fourth insulation layer, a first planarization thin film is coated on the fourth insulation layer, and the first planarization thin film is patterned through a patterning process to form the first planarization layer, as shown in FIG. 18 and FIG. 19, FIG. 18 is a first schematic diagram of the first planarization layer and FIG. 19 is a first schematic diagram after the first planarization layer is formed.

In an exemplary embodiment, the first planarization layer may include a via pattern. Among them, the via pattern includes an eightieth via V80 penetrating the fourth insulation layer and the first planarization layer. Among them, the eightieth via V80 exposes the second electrode of the tenth light emitting transistor.

Figure 20:
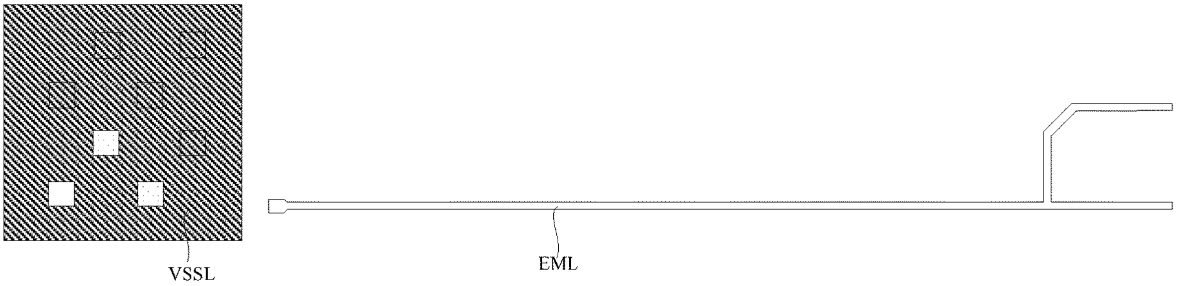
FIG. 20 is a first schematic diagram of a fourth conductive layer.
Figure 21:
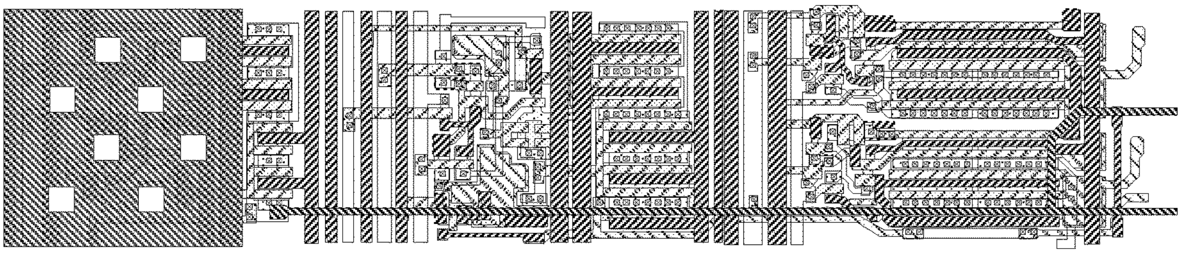
FIG. 21 is a first schematic diagram after a fourth conductive layer is formed.

(7) A fourth conductive layer is formed, which includes: a fourth conductive thin film is deposited on the base substrate on which the first planarization layer is formed, and the fourth conductive thin film is patterned through a patterning process to form the fourth conductive layer, as shown in FIG. 20 and FIG. 21, FIG. 20 is a first schematic diagram of the fourth conductive layer and FIG. 21 is a first schematic diagram after the fourth conductive layer is formed.

In an exemplary embodiment, the fourth conductive layer may include a second power supply line VSSL and a light emitting output line EML.

In an exemplary embodiment, an orthographic projection of the second power supply line VSSL on the base substrate is at least partially overlapped with an orthographic projection of a light emitting drive circuit on the base substrate. Among them, the orthographic projection of the second power supply line VSSL on the base substrate covers orthographic projections of the light emitting initial signal line, the first high-level power supply line, the first one of the first low-level power supply lines, the first light emitting clock signal line ECLK1 to the third light emitting clock signal line ECLK3 on the base substrate, and is not overlapped with an orthographic projection of the first one of the first low-level power supply lines on the base substrate.

In an exemplary embodiment, the light emitting output line EML is connected with the second electrode of the tenth light emitting transistor through the eightieth via.

(8) A light emitting structure layer is formed, which includes: a second planarization thin film is coated on the base substrate on which the fourth conductive layer is formed, the second planarization thin film is patterned through a patterning process to form a second planarization layer, an anode thin film is deposited on the second planarization layer, the anode thin film is patterned through a patterning process to form an anode, a pixel definition thin film is deposited on the anode, the pixel definition thin film is patterned through a patterning process to form a pixel definition layer, an organic emitting thin film is evaporated on the pixel definition layer, the organic emitting thin film is patterned through a patterning process to form an organic emitting layer, a cathode thin film is deposited on the organic emitting layer, and the cathode thin film is patterned through a patterning process to form a cathode.

A display substrate according to an exemplary embodiment will be described below through a manufacturing process of the display substrate by taking a case where a scan output line includes a first scan output part to a fourth scan output part and a light emitting output line includes a first light emitting output part to a third light emitting output part as an example.

(1) A semiconductor layer is formed on a base substrate, which includes: a semiconductor thin film is deposited on the base substrate, and the semiconductor thin film is patterned through a patterning process to form the semiconductor layer. As show in FIG. 5, FIG. 5 is a schematic diagram after the semiconductor layer is formed.

Figure 22:
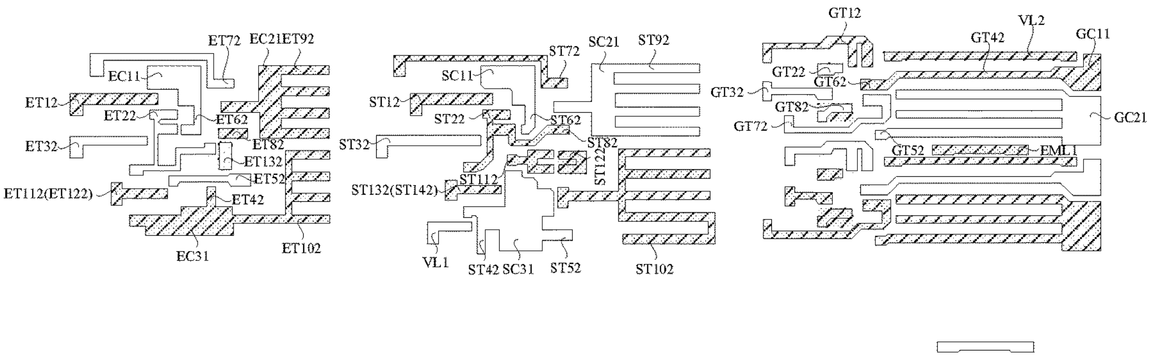
FIG. 22 is a second schematic diagram of a first conductive layer.
Figure 23:
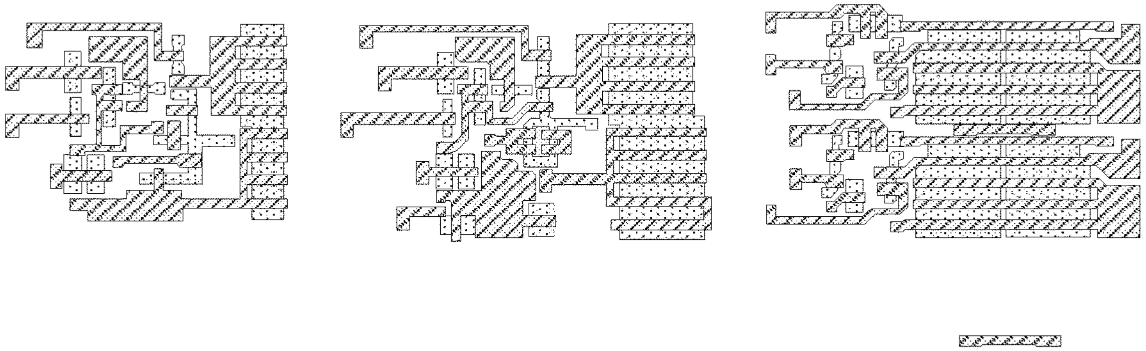
FIG. 23 is a second schematic diagram after a first conductive layer is formed.

(2) A first conductive layer is formed, which includes: a second insulation thin film is deposited on the base substrate on which an active layer is formed, the second insulation thin film is patterned through a patterning process to form a first insulation layer, a first conductive thin film is deposited on the first insulation layer, and the first conductive thin film is patterned through a patterning process to form the first conductive layer, as shown in FIG. 22 and FIG. 23, FIG. 22 is a second schematic diagram of the first conductive layer, and FIG. 23 is a second schematic diagram after the first conductive layer is formed.

FIG. 22 and FIG. 10 are different in that the first conductive layer in FIG. 22 may further include a first light emitting output part EML1.

In an exemplary embodiment, the first light emitting output part EML1 extends along a second direction, and a first light emitting output part EML1 of a light emitting output line of an i-th stage light emitting shift register is located between a first plate GC21 of a second control capacitor of a (2i+1)-th stage control shift register and a first plate GC11 of a first control capacitor of a (2i+2)-th stage control shift register.

Figure 24:
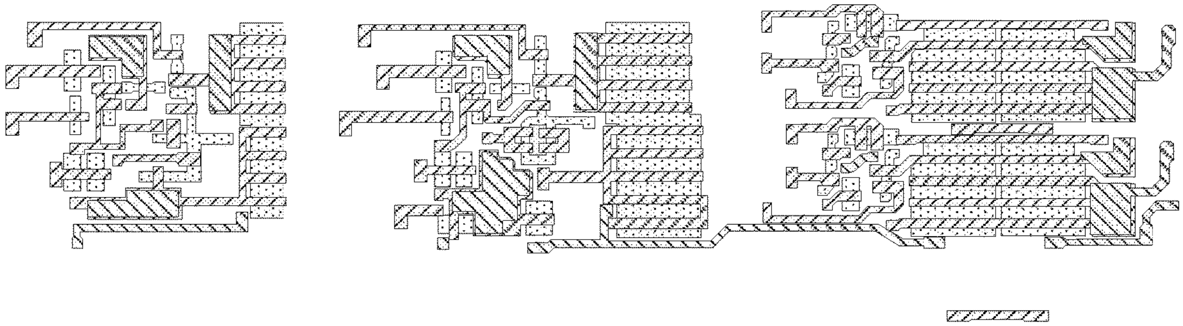
FIG. 24 is a second schematic diagram after a second conductive layer is formed.

(3) A second conductive layer is formed, which includes: a second insulation thin film is deposited on the base substrate on which the first conductive layer is formed, and the second insulation thin film is patterned through a patterning process to form a second insulation layer. A second conductive thin film is deposited on the base substrate on which the second insulation layer is formed, and the second conductive thin film is patterned through a patterning process to form the second conductive layer. As shown in FIGS. 12 and 24, FIG. 24 is a second schematic diagram after the second conductive layer is formed.

Figure 25:
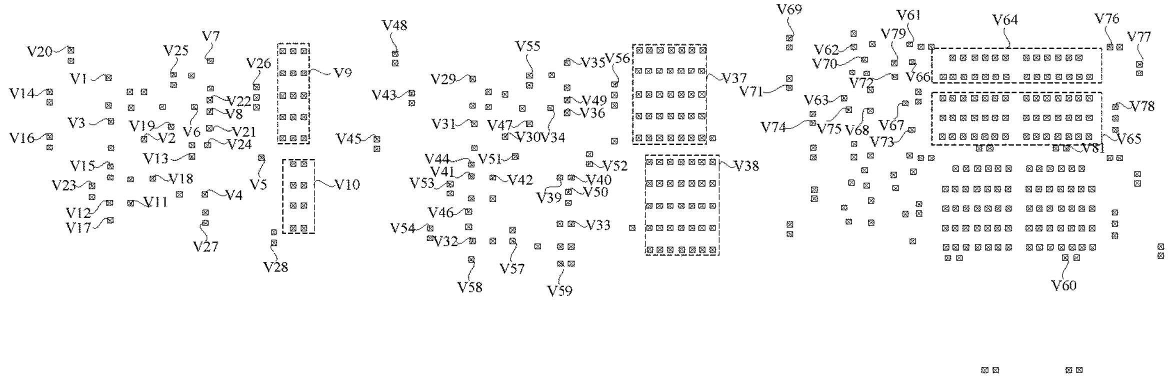
FIG. 25 is a second schematic diagram of a third insulation layer.
Figure 26:
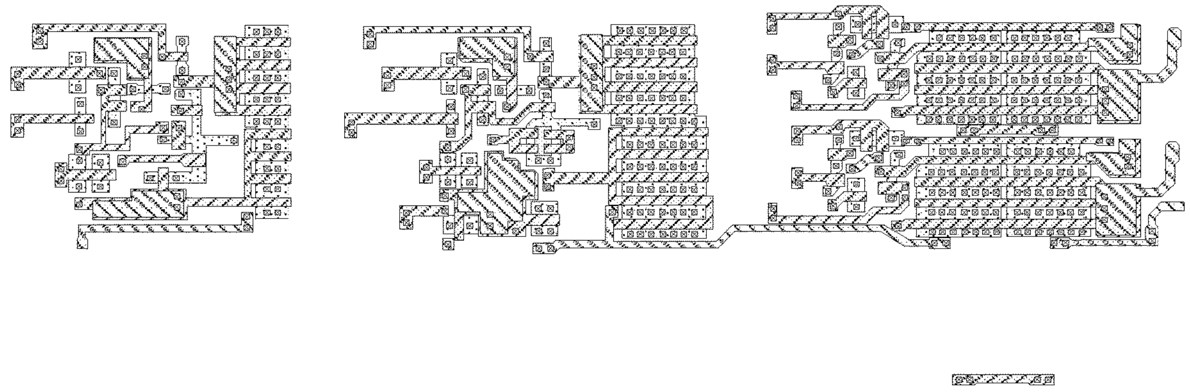
FIG. 26 is a second schematic diagram after a third insulation layer is formed.

(4) A third insulation layer is formed, which includes: a third insulation thin film is deposited on the base substrate on which the second conductive layer is formed, and the third insulation thin film is patterned through a patterning process to form the third insulation layer. As shown in FIG. 25 and FIG. 26, FIG. 25 is a second schematic diagram of the third insulation layer, and FIG. 26 is a second schematic diagram after the third insulation layer is formed.

FIG. 25 and FIG. 14 are different in that the multiple via patterns may further include an eighty-first via V81 penetrating through the second insulation layer and the third insulation layer, and the eighty-first via V81 exposes the first light emitting output part.

Figure 27:
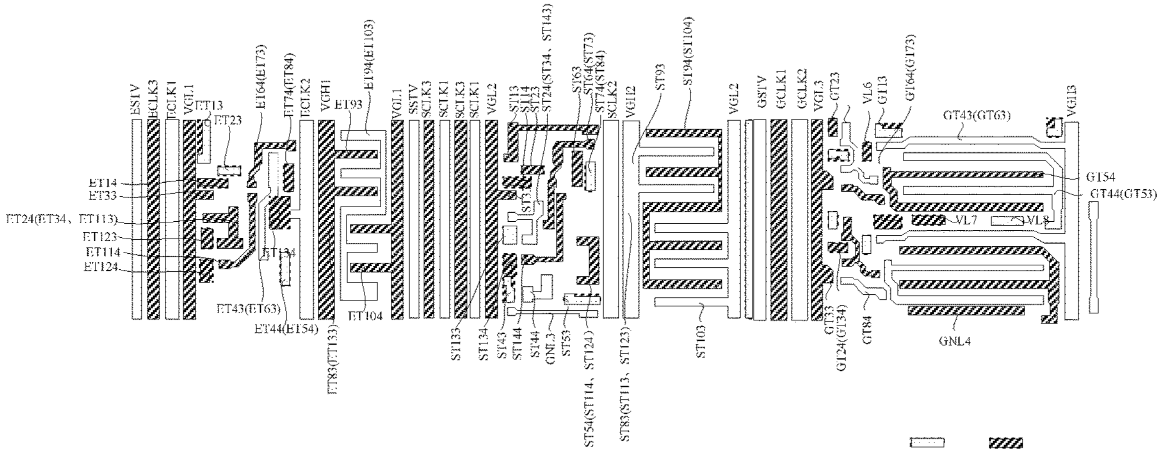
FIG. 27 is a second schematic diagram of a third conductive layer.
Figure 28:
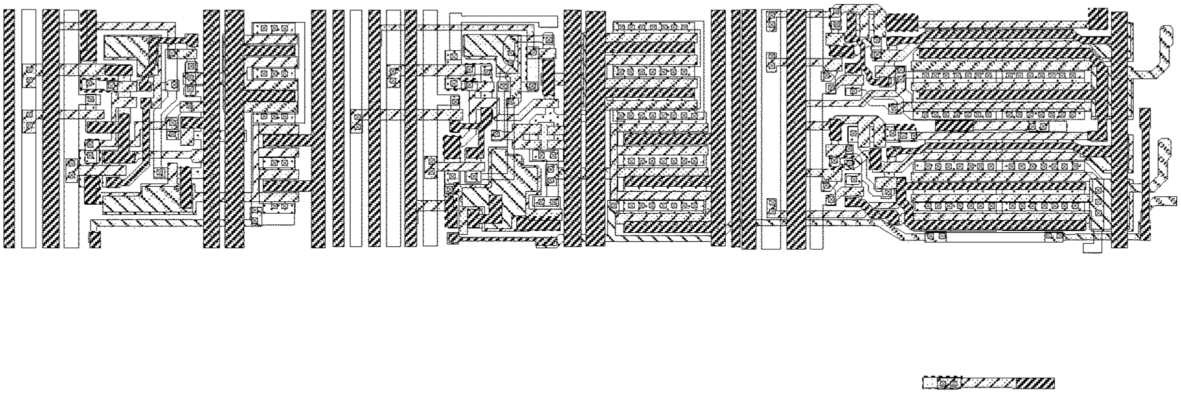
FIG. 28 is a second schematic diagram after a third conductive layer is formed.

(5) A third conductive layer is formed, which includes: a third conductive thin film is deposited on the base substrate on which the third insulation layer is formed, and the third conductive thin film is patterned through a patterning process to form the third conductive layer, as shown in FIGS. 27 and 28, FIG. 27 is a second schematic diagram of the third conductive layer, and FIG. 28 is a second schematic diagram after the third conductive layer is formed.

FIG. 27 and FIG. 16 are different in that the third conductive layer may further include a seventh connection electrode VL7 and an eighth connection electrode VL8.

In an exemplary embodiment, the seventh connection electrode VL7 is connected with the first light emitting output part through the eighty-first via, and the eighth connection electrode VL8 is connected with the first light emitting output part through the eighty-first via.

In an exemplary embodiment, the seventh connection electrode VL7 and the eighth connection electrode VL8 extend along the second direction and are arranged along the second direction.

Figure 29:
FIG. 29 is a second schematic diagram of a first planarization layer.
Figure 30:
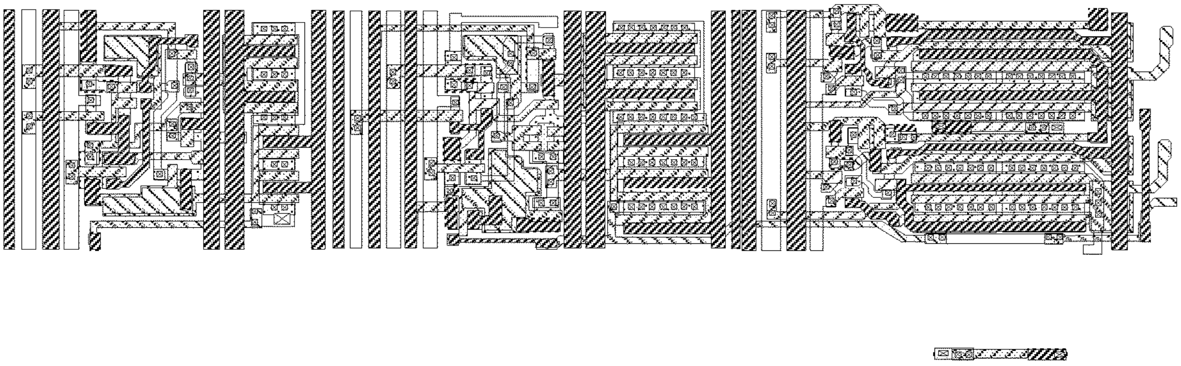
FIG. 30 is a second schematic diagram after a first planarization layer is formed.

(6) A first planarization layer is formed, which includes: on the base substrate on which the third conductive layer is formed, a fourth insulation thin film is deposited, the fourth insulation thin film is patterned through a patterning process to form a fourth insulation layer, a first planarization thin film is coated on the fourth insulation layer, and the first planarization thin film is patterned through a patterning process to form the first planarization layer, as shown in FIG. 29 and FIG. 30, FIG. 29 is a second schematic diagram of the first planarization layer and FIG. 30 is a second schematic diagram after the first planarization layer is formed.

FIG. 28 and FIG. 18 are different in that the via pattern may further include an eighty-second via V82 and an eighty-third via V83 penetrating through the fourth insulation layer and the first planarization layer. Among them, the eighty-second via V82 exposes the seventh connection electrode, and the eighty-third via V83 exposes the eighth connection electrode.

Figure 31:
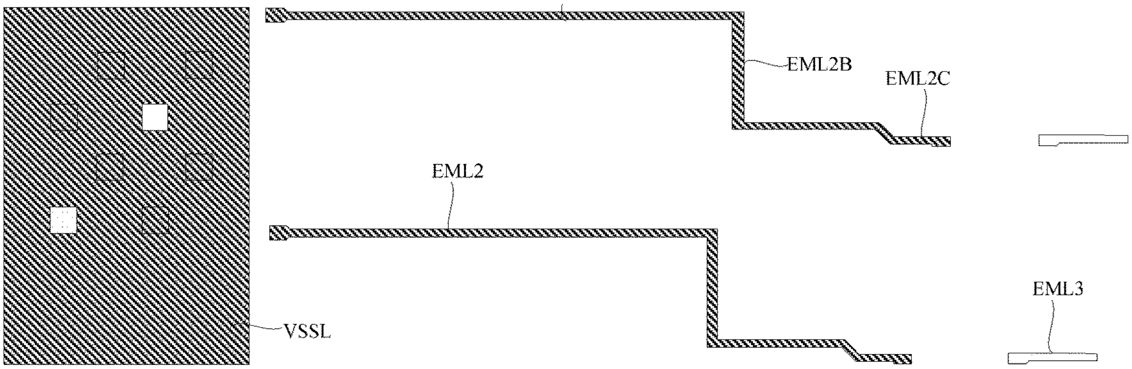
FIG. 31 is a second schematic diagram of a fourth conductive layer.
Figure 32:
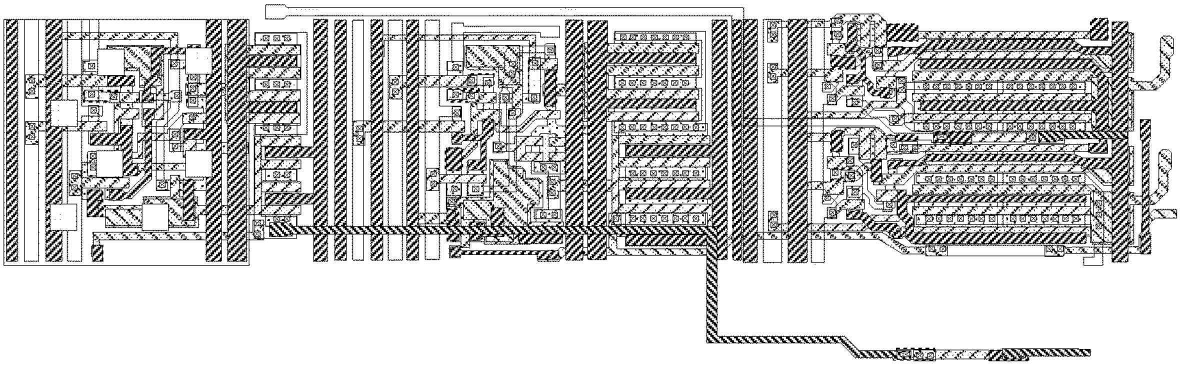
FIG. 32 is a second schematic diagram after a fourth conductive layer is formed.

(7) A fourth conductive layer is formed, which includes: a fourth conductive thin film is deposited on the base substrate on which the first planarization layer is formed, and the fourth conductive thin film is patterned through a patterning process to form the fourth conductive layer, as shown in FIG. 31 and FIG. 32, FIG. 31 is a second schematic diagram of the fourth conductive layer and FIG. 32 is a second schematic diagram after the fourth conductive layer is formed.

FIG. 32 and FIG. 20 are different in that the fourth conductive layer includes a second power supply line VSSL, a second light emitting output part EML2, and a third light emitting output part EML3.

In an exemplary embodiment, an orthographic projection of the second power supply line VSSL on the base substrate is at least partially overlapped with an orthographic projection of a light emitting drive circuit on the base substrate. Among them, the orthographic projection of the second power supply line VSSL on the base substrate covers orthographic projections of the light emitting initial signal line, the first high-level power supply line, the first one of the first low-level power supply lines, the first light emitting clock signal line ECLK1 to the third light emitting clock signal line ECLK3 on the base substrate, and is not overlapped with an orthographic projection of the first one of the first low-level power supply lines on the base substrate.

In an exemplary embodiment, the second light emitting output part EML2 extends along the second direction.

In an exemplary embodiment, the second light emitting output part EML2 is connected with the seventh connection electrode through the eighty-second via, and the third light emitting output part EML3 is connected with the eighth connection electrode through the eighty-third via.

In an exemplary embodiment, the second light emitting output part EML2 includes: a first output connection part EML2A, a second output connection part EML2B, and a third output connection part EML2C, and the second output connection part EML2B is connected with the first output connection part EML2A and the third output connection part EML2C, respectively. Among them, the first output connection part EML2A extends along the second direction, and is located between an i-th stage scan shift register and an (i+1)-th stage scan shift register, the second output connection part EML2B extends along the first direction and is located between the i-th stage scan shift register and a (2i−1)-th stage control shift register, and the third output connection part EML2C extends along the second direction and is located between a (2i+1)-th stage control shift register and a (2i+2)-th stage control shift register.

In an exemplary embodiment, the third light emitting output part EML3 extends along the second direction.

In an exemplary embodiment, a third light emitting output part EML3 of a light emitting output line of an i-th stage light emitting shift register is located between a first plate GC21 of a second control capacitor of a (2i+1)-th stage control shift register and a first plate GC11 of a first control capacitor of a (2i+2)-th stage control shift register.

(8) A light emitting structure layer is formed, which includes: a second planarization thin film is coated on the base substrate on which the fourth conductive layer is formed, the second planarization thin film is patterned through a patterning process to form a second planarization layer, an anode thin film is deposited on the second planarization layer, the anode thin film is patterned through a patterning process to form an anode, a pixel definition thin film is deposited on the anode, the pixel definition thin film is patterned through a patterning process to form a pixel definition layer, an organic emitting thin film is evaporated on the pixel definition layer, the organic emitting thin film is patterned through a patterning process to form an organic emitting layer, a cathode thin film is deposited on the organic emitting layer, and the cathode thin film is patterned through a patterning process to form a cathode.

In an exemplary embodiment, the semiconductor layer may be a metal oxide layer. The metal oxide layer may be made of an oxide containing indium and tin, an oxide containing tungsten and indium, an oxide containing tungsten and indium and zinc, an oxide containing titanium and indium, an oxide containing titanium and indium and tin, an oxide containing indium and zinc, an oxide containing silicon and indium and tin, or an oxide containing indium or gallium and zinc, etc. The metal oxide layer may be a single layer, or a double-layer, or may be a multi-layer. An active layer thin film may be made of an amorphous Indium Gallium Zinc Oxide (a-IGZO), Zinc Oxynitride (ZnON), Indium Zinc Tin Oxide (IZTO), amorphous Silicon (a-Si), polycrystalline Silicon (p-Si), hexathiophene, polythiophene, and other materials, that is, the present disclosure is applicable to transistors manufactured based on an oxide technology, a silicon technology, and an organic matter technology.

In an exemplary embodiment, the first insulation layer, the second insulation layer, the third insulation layer, and the fourth insulation layer may be made of any one or more of Silicon Oxide (SiOx), Silicon Nitride (SiNx), and Silicon Oxynitride (SiON), and may be a single layer, a multi-layer, or a composite layer. The first insulation layer is called a buffer layer, which is configured to improve water and oxygen resistance of the base substrate.

In an exemplary embodiment, the first conductive thin film to the fourth conductive thin film may be made of a metal material, such as any one or more of Argentum (Ag), Copper (Cu), Aluminum (Al), Titanium (Ti), and Molybdenum (Mo), or an alloy material of the abovementioned metals, such as an Aluminum-Neodymium alloy (AlNd) or a Molybdenum-Niobium alloy (MoNb), and may be of a single layer structure, or a multi-layer composite structure such as Ti/Al/Ti.

In an exemplary embodiment, the first planarization layer and the second planarization layer may be made of an organic material.

In an exemplary embodiment, the anode thin film may be made of Indium Tin Oxide (ITO) or Indium Zinc Oxide (IZO).

The display substrate according to the embodiment of the present disclosure may be applied to display products with any resolution.

An embodiment of the present disclosure further provides a display apparatus, including a display substrate.

In an exemplary embodiment, the display apparatus may be any product or component with any display function, such as a display, a television, a mobile phone, a tablet computer, a navigator, a digital photo frame and a wearable display product.

The display substrate is the display substrate according to any of the aforementioned embodiments, and has similar implementation principles and implementation effects, which will not be repeated here.

The accompanying drawings of the present disclosure only involve the structures involved in the embodiments of the present disclosure, and other structures may refer to usual designs.

For the sake of clarity, in the accompanying drawings used for describing the embodiments of the present disclosure, a thickness and dimension of a layer or a micro structure is enlarged. It may be understood that when an element such as a layer, a film, a region, or a substrate is described as being "on" or "under" another element, the element may be "directly" located "on" or "under" the other element, or there may be an intermediate element.

Although the embodiments disclosed in the present disclosure are as above, the described contents are only embodiments used for convenience of understanding the present disclosure and are not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A display substrate, comprising a display region and a non-display region, wherein the display substrate comprises a base substrate and a circuit structure layer disposed on the base substrate, the circuit structure layer comprises a plurality of pixel drive circuits arranged in an array and located in the display region, and a light emitting drive circuit, a scan drive circuit, and a control drive circuit that are located in the non-display region; the light emitting drive circuit and the scan drive circuit are located on a side of the control drive circuit away from the display region, at least one pixel drive circuit comprises: a writing transistor, a compensation reset transistor, and a light emitting transistor, the scan drive circuit is configured to provide a drive signal to the compensation reset transistor, the control drive circuit is configured to provide a drive signal to the writing transistor, the light emitting drive circuit is configured to provide a drive signal to the light emitting transistor;

the display substrate further comprises a plurality of light emitting output lines connected with the light emitting drive circuit and a plurality of scan output lines connected with the scan drive circuit;

at least one of the light emitting output lines comprises at least two light emitting output parts connected with each other, a scan output line has an integrally formed structure, or, a light emitting output line has an integrally formed structure, and at least one of the scan output lines comprises at least two scan output parts connected with each other, or at least one of the light emitting output lines comprises at least two light emitting output parts connected with each other, and at least one of the scan output lines comprises at least two scan output parts connected with each other;

wherein at least two light emitting output parts located on a same light emitting output line are arranged in different layers, and resistivities of the light emitting output parts arranged in the different layers are different, and at least two scan output parts located on a same scan output line are arranged in different layers, and resistivities of the scan output parts arranged in the different layers are different;

a pixel drive circuit comprises: a data signal terminal, a control signal terminal, a scan signal terminal, and a light emitting signal terminal; the display substrate further comprises N data signal lines, 2M control signal lines, 2M light emitting signal lines, and 2M scan signal lines;

the writing transistor is electrically connected with the control signal terminal and the data signal terminal respectively, the compensation reset transistor is electrically connected with the scan signal terminal, and the light emitting transistor is electrically connected with the light emitting signal terminal;

the data signal lines extend along a first direction and the N data signal lines are arranged along a second direction, the 2M control signal lines, the 2M light emitting signal lines, and the 2M scan signal lines extend along the second direction and are arranged along the first direction, wherein the first direction and the second direction intersect;

for a pixel drive circuit of an s-th row and a t-th column, the control signal terminal is electrically connected with an s-th control signal line, the light emitting signal terminal is electrically connected with an s-th light emitting signal line, the scan signal terminal is electrically connected with an s-th scan signal line, the data signal terminal is electrically connected with a t-th data signal line, $1<s\leq 2M$, $1<t<N$;

the light emitting drive circuit comprises: M cascaded light emitting shift registers, a light emitting shift register of at least one stage is electrically connected with two light emitting signal lines, the scan drive circuit comprises M cascaded scan shift registers, a scan shift register of at least one stage is electrically connected with two scan signal lines, the control drive circuit comprises 2M cascaded control shift registers, a control shift register of at least one stage is electrically connected with one control signal line, $1<i<M$; a light emitting shift register, a scan shift register, and a control shift register each comprise an input terminal and an output terminal;

an output terminal of an i-th stage light emitting shift register is electrically connected with a (2i −1)-th light emitting signal line to a 2i-th light emitting signal line respectively through an i-th light emitting output line; an output terminal of an i-th stage scan shift register is electrically connected with a (2i −1)-th scan signal line to a 2i-th scan signal line respectively through an i-th scan output line; an output terminal of an s-th stage control shift register is electrically connected with an s-th control signal line respectively;

the circuit structure layer comprises: a semiconductor layer, a first insulation layer, a first conductive layer, a second insulation layer, a second conductive layer, a third insulation layer, a third conductive layer, a fourth insulation layer, a first planarization layer, and a fourth conductive layer that are sequentially stacked on the base substrate;

when at least one of the light emitting output lines comprises at least two light emitting output parts connected with each other, at least two light emitting output parts located on a same light emitting output line are located in one film layer of the first conductive layer and the second conductive layer and one film layer of the third conductive layer and the fourth conductive layer;

when at least one of the scan output lines comprises at least two scan output parts connected with each other, at least two scan output parts located on a same scan output line are located in one film layer of the first conductive layer and the second conductive layer and one film layer of the third conductive layer and the fourth conductive layer;

when a light emitting output line has an integrally formed structure, the light emitting output line is located in the fourth conductive layer;

when a scan output line has an integrally formed structure, the scan output line is located in the second conductive layer; and a resistivity of the first conductive layer and a resistivity of the second conductive layer are both greater than each of a resistivity of the third conductive layer and a resistivity of the fourth conductive layer.

2. The display substrate according to claim 1, wherein the circuit structure layer comprises: a fifth conductive layer, a sixth insulation layer, a seventh insulation layer, and a sixth conductive layer;

the semiconductor layer, the first insulation layer, the first conductive layer, the second insulation layer, the second conductive layer, the third insulation layer, the fifth conductive layer, the sixth insulation layer, the third conductive layer, the fourth insulation layer, the first planarization layer, the fourth conductive layer, the seventh insulation layer, and the sixth conductive layer are sequentially stacked on the base substrate;

when at least one of the light emitting output lines comprises at least two light emitting output parts connected with each other, at least two light emitting output parts located on a same light emitting output line are located in one film layer of the first conductive layer, the second conductive layer, and the fifth conductive layer and one film layer of the third conductive layer, the fourth conductive layer, and the sixth conductive layer;

when at least one of the scan output lines comprises at least two scan output parts connected with each other, at least two scan output parts located on a same scan output line are located in one film layer of the first conductive layer, the second conductive layer, and the fifth conductive layer and one film layer of the third conductive layer, the fourth conductive layer, and the sixth conductive layer; and a resistivity of the first conductive layer, a resistivity of the second conductive layer, and a resistivity of the fifth conductive layer are all greater than each of a resistivity of the third conductive layer, a resistivity of the fourth conductive layer, and a resistivity of the sixth conductive layer.

3. The display substrate according to claim 1, wherein when at least one of the scan output lines comprises at least two scan output parts connected with each other, a scan output line comprises: a first scan output part, a second scan output part, a third scan output part, and a fourth scan output part which extend along the second direction;

the first scan output part and the second scan output part are arranged in a same layer, the third scan output part and the fourth scan output part are arranged in a same layer, and the third scan output part is located on a side of the first scan output part away from the base substrate;

the third scan output part is located on a side of the first scan output part away from the display region, the fourth scan output part is located on a side of the first scan output part close to the display region, the second scan output part is located on a side of the fourth scan output part close to the display region, the first scan output part is connected with the third scan output part and the fourth scan output part respectively, and the fourth scan output part is connected with the second scan output part; and a first scan output part of an i-th scan output line is connected with an output terminal of an i-th stage scan shift register, a second scan output part of the i-th scan output line is connected with a (2i−1)-th scan signal line and a 2i-th scan signal line, and a third scan output part of the i-th scan output line is connected with an input terminal of an (i+1)-th stage scan shift register.

4. The display substrate according to claim 3, wherein the i-th scan output line is located between the i-th stage scan shift register and the (i+1)-th stage scan shift register.

5. The display substrate according to claim 1, wherein when at least one of the light emitting output lines comprises at least two light emitting output parts connected with each other, a light emitting output line comprises: a first light emitting output part, a second light emitting output part, and a third light emitting output part which extend along the second direction;

the second light emitting output part and the third light emitting output part are arranged in a same layer, and the third light emitting output part is located on a side of the first light emitting output part away from the base substrate;

the second light emitting output part is located on a side of the first light emitting output part away from the display region, the third light emitting output part is located on a side of the first light emitting output part close to the display region, and the first light emitting output part is respectively connected with the second light emitting output part and the third light emitting output part; and a second light emitting output part of an i-th light emitting output line is connected with an output terminal of an i-th stage light emitting shift register, and a third light emitting output part of the i-th light emitting output line is connected with a (2i−1)-th light emitting signal line and a 2i-th light emitting signal line.

6. The display substrate according to claim 5, wherein a first light emitting output part and the third light emitting output part of the i-th light emitting output line are located between a (2i+1)-th stage control shift register and a (2i+2)-th stage control shift register;

the second light emitting output part of the i-th light emitting output line comprises a first output connection part, a second output connection part, and a third output connection part; the first output connection part and the third output connection part extend along the second direction, and the second output connection part extends along the first direction;

the first output connection part is located between an i-th stage scan shift register and an (i+1)-th stage scan shift register, and is connected with the second output connection part and the output terminal of the i-th stage light emitting shift register;

the second output connection part is located between the i-th stage scan shift register and a (2i−1)-th stage control shift register and is connected with the third output connection part; and the third output connection part is located between the (2i+1)-th stage control shift register and the (2i+2)-th stage control shift register, and is connected with the (2i−1)-th light emitting signal line and the 2i-th light emitting signal line.

7. The display substrate according to claim 6, further comprising: a light emitting initial signal line, a first light emitting clock signal line to a third light emitting clock signal line, a first high-level power supply line, first low-level power supply lines, a scan initial signal line, first scan clock signal lines to third scan clock signal lines, a second high-level power supply line, second low-level power supply lines, a control initial signal line, a first control clock signal line, a second control clock signal line, a third high-level power supply line, and a third low-level power supply line which extend along the first direction and are located in the non-display region; wherein two first low-level power supply lines, two second low-level power supply lines, two first scan clock signal lines, and two third scan clock signal lines are provided;

wherein an input terminal of a light emitting shift register of a first stage is electrically connected with the light emitting initial signal line, and the output terminal of the i-th stage light emitting shift register is electrically connected with an input terminal of an (i+1)-th stage light emitting shift register; the i-th stage light emitting shift register has a first clock signal terminal electrically connected with the first light emitting clock signal line, a second clock signal terminal electrically connected with the second light emitting clock signal line, and a third clock signal terminal electrically connected with the third light emitting clock signal line, the (i+1)-th stage light emitting shift register has a first clock signal terminal electrically connected with the third light emitting clock signal line, a second clock signal terminal electrically connected with the second light emitting clock signal line, a third clock signal terminal electrically connected with the first light emitting clock signal line, a first power supply terminal of the i-th stage light emitting shift register is electrically connected with the first high-level power supply line, and a second power supply terminal of the i-th stage light emitting shift register is electrically connected with a first low-level power supply line; an input terminal of a scan shift register of a first stage is electrically connected with the scan initial signal line, an output terminal of the i-th stage scan shift register is electrically connected with an input terminal of the (i+1)-th stage scan shift register, the i-th stage scan shift register has a first clock signal terminal electrically connected with a first scan clock signal line, a second clock signal terminal electrically connected with the second scan clock signal line, and a third clock signal terminal electrically connected with a third scan clock signal line, a first power supply terminal of the i-th stage scan shift register is electrically connected with the second high-level power supply line, and a second power supply terminal of the i-th stage scan shift register is electrically connected with a second low-level power supply line; an input terminal of a control shift register of a first stage is electrically connected with the control initial signal line, and an output terminal of an s-th stage control shift register is electrically connected with an input terminal of an (s+1)-th stage control shift register; the s-th stage control shift register has a first clock signal terminal electrically connected with the first control clock signal line, and a second clock signal terminal electrically connected with the second control clock signal line, the (s+1)-th stage control shift register has a first clock signal terminal electrically connected with the second control clock signal line, and a second clock signal terminal electrically connected with the first control clock signal line, a first power supply terminal of an i-th stage control shift register is electrically connected with the third high-level power supply line, and a second power supply terminal of the s-th stage control shift register is electrically connected with the third low-level power supply line.

8. The display substrate according to claim 7, further comprising: a light emitting structure layer located on a side of the circuit structure layer away from the base substrate, wherein the light emitting structure layer comprises: light emitting elements located in the display region and arranged in an array, a light emitting element comprises an anode, an organic emitting layer, and a cathode, the anode is located on a side of the organic emitting layer close to the base substrate, and the cathode is located on a side of the organic emitting layer away from the base substrate;

the circuit structure layer further comprises a second power supply line located in the non-display region, and the second power supply line is electrically connected with the cathode of the light emitting element.

9. The display substrate according to claim 8, wherein a light emitting shift register comprises: a plurality of light emitting transistors and a plurality of light emitting capacitors, and the scan shift register comprises a plurality of scan transistors and a plurality of scan capacitors; a control shift register comprises a plurality of control transistors and a plurality of control capacitors; a light emitting capacitor, a scan capacitor, and a control capacitor each comprises a first plate and a second plate;

the semiconductor layer comprises: active layers of the plurality of light emitting transistors, active layers of the plurality of scan transistors, and active layers of the plurality of control transistors;

the first conductive layer comprises: control electrodes of the plurality of light emitting transistors, first plates of the plurality of light emitting capacitors, control electrodes of the plurality of scan transistors, first plates of the plurality of scan capacitors, control electrodes of the plurality of control transistors, first plates of the plurality of first control capacitors, a first connection electrode, and a second connection electrode;

the second conductive layer comprises: second plates of a plurality of first light emitting capacitors, second plates of the plurality of scan capacitors, second plates of the plurality of control capacitors, and a third connection electrode to a fifth connection electrode;

the third conductive layer comprises: the light emitting initial signal line, the first high-level power supply line, the first low-level power supply lines, the first light emitting clock signal line to the third light emitting clock signal line, first electrodes and second electrodes of the plurality of light emitting transistors, the scan initial signal line, the second high-level power supply line, the second low-level power supply lines, the first scan clock signal lines to the third scan clock signal lines, first electrodes and second electrodes of the plurality of scan transistors, the control initial signal line, the third high-level power supply line, the third low-level power supply line, the first control clock signal line, the second control clock signal line, first electrodes and second electrodes of the plurality of control transistors, and a sixth connection electrode; and the fourth conductive layer comprises a second power supply line.

10. The display substrate according to claim 9, wherein the light emitting shift register comprises: thirteen light emitting transistors and three light emitting capacitors, and the scan shift register comprises: fourteen scan transistors and three scan capacitors; the control shift register comprises: eight control transistors and two control capacitors; a second electrode of a tenth light emitting transistor is multiplexed as an output terminal of the light emitting shift register, and a second electrode of a tenth scan transistor is multiplexed as an output terminal of the scan shift register;

a control electrode of a first light emitting transistor to a control electrode of an eighth light emitting transistor and a control electrode of an eleventh light emitting transistor to a control electrode of a thirteenth light emitting transistor are located on a side of a control electrode of a ninth light emitting transistor and a control electrode of the tenth light emitting transistor away from the display region; the control electrode of the ninth light emitting transistor and the control electrode of the tenth light emitting transistor are arranged along the first direction;

a control electrode of a first scan transistor to a control electrode of an eighth scan transistor and a control electrode of an eleventh scan transistor to a control electrode of a fourteenth scan transistor are located on a side of a control electrode of a ninth scan transistor and a control electrode of the tenth scan transistor away from the display region; the control electrode of the ninth scan transistor and the control electrode of the tenth scan transistor are arranged along the first direction;

a control electrode of a first control transistor to a control electrode of a third control transistor and a control electrode of a sixth control transistor to a control electrode of an eighth control transistor are located on a side of a control electrode of a fourth control transistor and a control electrode of a fifth control transistor away from the display region; the control electrode of the fourth control transistor and the control electrode of the fifth control transistor are arranged along the first direction;

the first connection electrode is located on the side of the control electrode of the ninth scan transistor and the control electrode of the tenth scan transistor away from the display region and extends along the second direction, and the second connection electrode is connected with a first electrode of the fourth scan transistor;

the second connection electrode is located on a side of the control electrode of the fourth control transistor away from the control electrode of the fifth control transistor and extends along the second direction; and the second connection electrode is connected with a second electrode of a fifth control transistor of a light emitting shift register of a previous stage.

11. The display substrate according to claim 10, wherein a second plate of a first light emitting capacitor and a second plate of a second light emitting capacitor are arranged along the second direction, the second plate of the first light emitting capacitor is located on a side of the second plate of the second light emitting capacitor away from the display region, and the second plate of the second light emitting capacitor and a second plate of a third light emitting capacitor are arranged along the first direction;

a second plate of a first scan capacitor and a second plate of a second scan capacitor are arranged along the second direction, and the second plate of the first scan capacitor is located on a side of the second plate of the second scan capacitor away from the display region, and the second plate of the second scan capacitor and a second plate of a third scan capacitor are arranged along the first direction;

a second plate of a first control capacitor and a second plate of a second control capacitor are arranged along the first direction;

the third connection electrode is located on a side of the second plate of the third light emitting capacitor away from the second plate of the second light emitting capacitor and extends along the second direction, and the third connection electrode is respectively connected with a second electrode of the tenth light emitting transistor and a first electrode of a first light emitting transistor of a light emitting shift register of a next stage;

the fourth connection electrode is located on a side of the second plate of the third scan capacitor away from the second plate of the second scan capacitor and extends along the second direction, and the fourth connection electrode is connected with a first electrode of a first scan transistor of a scan shift register of a next stage; and the fifth connection electrode and the second plate of the first control capacitor are arranged along the first direction, and the fifth connection electrode is located on a side of the second plate of the first control capacitor away from the display region, and the fifth connection electrode is connected with a second electrode of a second control transistor.

12. The display substrate according to claim 10, wherein the light emitting initial signal line, the third scan clock signal lines, the first scan clock signal lines, a first one of the first low-level power supply lines, and the first scan clock signal line are sequentially arranged along a direction close to the display region, a first electrode and a second electrode of the first light emitting transistor to a first electrode and a second electrode of the eighth light emitting transistor and a first electrode and a second electrode of the eleventh light emitting transistor to a first electrode and a second electrode of the thirteenth light emitting transistor are located between the first one of the first low-level power supply lines and the second scan clock signal line, and the second scan clock signal line is located on a side of the first one of the first low-level power supply lines close to the display region, the first high-level power supply line is located on a side of the second scan clock signal line close to the display region, a first electrode and a second electrode of the ninth light emitting transistor to a first electrode and a second electrode of the tenth light emitting transistor are located between the first high-level power supply line and a second one of the first low-level power supply lines, and the second one of the first low-level power supply lines is located on a side of the first high-level power supply line close to the display region;

the scan initial signal line, a first one of the third scan clock signal lines, a first one of the first scan clock signal lines, a second third scan clock signal line, a second one of the first scan clock signal lines, and a first one of the second low-level power supply lines are sequentially arranged along a side of the second one of the first low-level power supply lines close to the display region, a first electrode and a second electrode of the first scan transistor to a first electrode and a second electrode of the eighth scan transistor, a first electrode and a second electrode of the tenth scan transistor to a first electrode and a second electrode of the fourteenth scan transistor, and a third scan output part are located between the first one of the second low-level power supply lines and the second scan clock signal line, and the second scan clock signal line is located on a side of the first one of the second low-level power supply lines close to the display region, the second high-level power supply line is located on the side of the second scan clock signal line close to the display region, a first electrode and a second electrode of the ninth scan transistor to a first electrode and a second electrode of the tenth scan transistor are located between the second high-level power supply line and a second one of the second low-level power supply lines, and the second one of the second low-level power supply lines is located on a side of the second high-level power supply line close to the display region;

the control initial signal line, the first control clock signal line, the second control clock signal line, and the third low-level power supply line are sequentially arranged along a direction of the second one of the second low-level power supply lines close to the display region, a first electrode and a second electrode of the first control transistor to a first electrode and a second electrode of the eighth control transistor and the sixth connection electrode are located between the third low-level power supply line and the third high-level power supply line, the third high-level power supply line is located on a side of the third low-level power supply line close to the display region; and the sixth connection electrode is connected with the fifth connection electrode and the control electrode of the fourth control transistor respectively.

13. The display substrate according to claim 9, wherein an orthographic projection of the second power supply line on the base substrate is at least partially overlapped with an orthographic projection of the light emitting drive circuit on the base substrate; and the orthographic projection of the second power supply line on the base substrate covers orthographic projections of the light emitting initial signal line, the first high-level power supply line, a first one of the first low-level power supply lines, and the first light emitting clock signal line to the third light emitting clock signal line on the base substrate, and is not overlapped with an orthographic projection of a second one of the first low-level power supply lines on the base substrate.

14. The display substrate according to claim 10, wherein the second conductive layer further comprises a first scan output part and a second scan output part.

15. The display substrate according to claim 14, wherein the third conductive layer further comprises a third scan output part and a fourth scan output part.

16. The display substrate according to claim 10, wherein the first conductive layer further comprises the first light emitting output part.

17. The display substrate according to claim 16, wherein the fourth conductive layer comprises the second light emitting output part and the third light emitting output part; and the third conductive layer further comprises: a seventh connection electrode and an eighth connection electrode;

the seventh connection electrode is respectively connected with the first light emitting output part and the second light emitting output part, and the eighth connection electrode is respectively connected with the first light emitting output part and the third light emitting output part.

18. A display apparatus, comprising the display substrate according to claim 1.

* * * * *